US010440257B2

(12) United States Patent
Kobayashi et al.

(10) Patent No.: US 10,440,257 B2
(45) Date of Patent: Oct. 8, 2019

(54) ELECTRONIC DEVICE, IMAGING CONTROL APPARATUS AND CONTROL METHOD THEREOF

(71) Applicant: CANON KABUSHIKI KAISHA, Tokyo (JP)

(72) Inventors: Seiji Kobayashi, Chiba (JP); Yuko Izaki, Kawasaki (JP); Makoto Kameyama, Yokohama (JP); Kazutaka Kondo, Tokyo (JP); Tomoaki Takahashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/013,670

(22) Filed: Feb. 2, 2016

(65) Prior Publication Data

US 2016/0227105 A1   Aug. 4, 2016

(30) Foreign Application Priority Data

Feb. 4, 2015 (JP) .................................. 2015-020609
Feb. 4, 2015 (JP) .................................. 2015-020610

(Continued)

(51) Int. Cl.
*G06F 17/00* (2019.01)
*H04N 5/232* (2006.01)
(Continued)

(52) U.S. Cl.
CPC ....... *H04N 5/23216* (2013.01); *G06F 3/0482* (2013.01); *G06F 3/04842* (2013.01); *G06F 3/04847* (2013.01); *H04N 5/23293* (2013.01)

(58) Field of Classification Search
CPC .................................................. G06F 3/0481
(Continued)

(56) References Cited

U.S. PATENT DOCUMENTS 9,916,082 B2 * 3/2018 Sakaguchi .............. G06F 3/041
10,015,308 B2 * 7/2018 Cho ...................... G06F 3/0488
(Continued)

FOREIGN PATENT DOCUMENTS

JP  06-083537 A  3/1994
JP  07-168256 A  7/1995
(Continued)

OTHER PUBLICATIONS

Canon 7D Tips, 'Problems focusing? Customizing the AF', Available Dec. 7, 2009, photoframd.com.*

(Continued)

*Primary Examiner* — Stephen S Hong
*Assistant Examiner* — Matthew J Ludwig
(74) *Attorney, Agent, or Firm* — Cowan, Liebowitz, & Latman, P.C.

(57) ABSTRACT

An electronic device sets, in accordance with a use operation, which one of a plurality of objects is to be used to display a specific setting item on a setting screen. The plurality of objects include a first object and a second object whose display size, information amount to be displayed, and number of types of operable setting values are larger than the first object. In case where the first object is displayed on the setting screen, the electronic device changes a first setting value concerning the specific setting item in accordance with an operation on one of a first or second operation member. In case where the second object is displayed on the setting screen, the electronic device changes the first and second setting values in accordance with the operations on the first and second operation members, respectively.

13 Claims, 32 Drawing Sheets

(30) Foreign Application Priority Data

| Feb. 4, 2015 | (JP) | ................................ | 2015-020636 |
| Feb. 4, 2015 | (JP) | ................................ | 2015-020637 |
| Feb. 4, 2015 | (JP) | ................................ | 2015-020638 |
| Feb. 4, 2015 | (JP) | ................................ | 2015-020639 |

(51) Int. Cl.
   *G06F 3/0484*     (2013.01)
   *G06F 3/0482*     (2013.01)

(58) Field of Classification Search
   USPC .................. 715/204, 762, 788, 810, 825
   See application file for complete search history.

(56) References Cited

U.S. PATENT DOCUMENTS

| 2002/0174202 | A1* | 11/2002 | Kohyama | G06F 3/0483 |
| | | | | 709/220 |
| 2009/0254842 | A1* | 10/2009 | Leacock | H04L 12/1827 |
| | | | | 715/757 |
| 2012/0110509 | A1* | 5/2012 | Isozu | G06F 3/0482 |
| | | | | 715/830 |
| 2012/0137236 | A1* | 5/2012 | Abe | G06F 3/0482 |
| | | | | 715/763 |
| 2013/0083219 | A1 | 4/2013 | Heo et al. | |

FOREIGN PATENT DOCUMENTS

| JP | 09-305360 | A | 11/1997 |
| JP | 11-052447 | A | 2/1999 |
| JP | 2005-204720 | A | 8/2005 |
| JP | 2005-348196 | A | 12/2005 |
| JP | 2006-023384 | A | 1/2006 |
| JP | 2007-110434 | A | 4/2007 |
| JP | 2009-177365 | A | 8/2009 |
| JP | 2010-045425 | A | 2/2010 |
| JP | 2011-159180 | A | 8/2011 |
| JP | 2012-129963 | A | 7/2012 |
| JP | 5153512 | B | 2/2013 |
| JP | 2015-115841 | A | 6/2015 |

OTHER PUBLICATIONS

Canon 7D User Guide, published 2010, KenRockwell.com.*
Canon 7D Tips, 'Auto Exposure Bracketing 6 Images or more', available Nov. 17, 2010, photoframd.com.*
Apr. 24, 2018 Chinese Patent Office Action, which is enclosed, with translation, that issued in Chinese Patent Application No. 201610070018.8.
Sep. 18, 2018 Chinese Patent Office Action, which is enclosed, with translation, that issued in Chinese Patent Application No. 2015020637.
Nov. 27, 2018 Japanese Office Action, which is enclosed without an English Translation, that issued in Japanese Patent Application No. 2015-020638.
Dec. 4, 2018 Japanese Office Action, which is enclosed without an English Translation, that issued in Japanese Patent Application No. 2015020636.

* cited by examiner

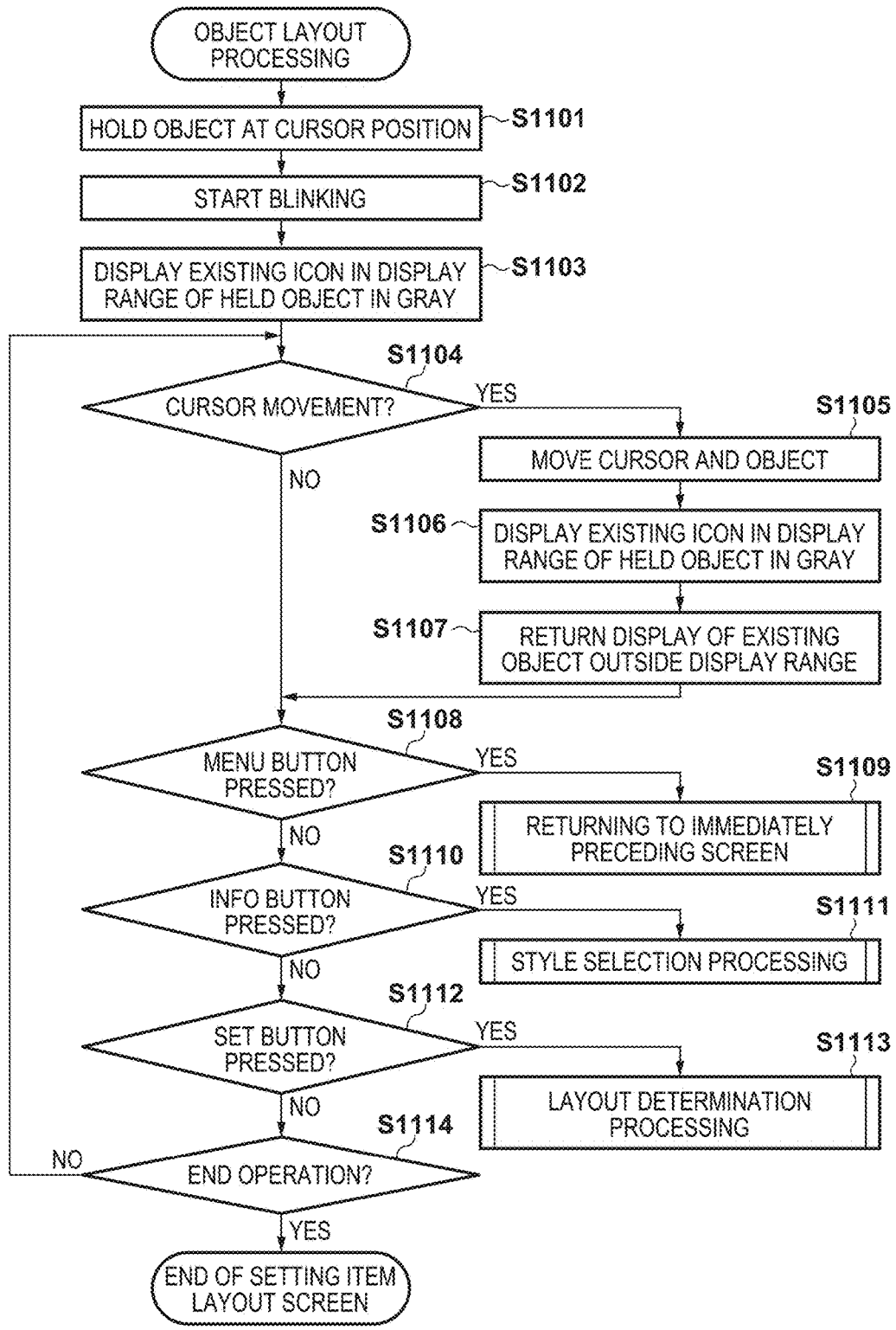

FIG. 17A

|   |   |   |   |   |   |
|---|---|---|---|---|---|
| AE1 | Un kown | Un kown | Un kown | Un kown | Un kown |
| Un kown | Un kown | Un kown | Un kown | Un kown | Un kown |
| Un kown | Av1 | Un kown | Un kown | Un kown | Un kown |
| Un kown | Un kown | Un kown | Af Mode1 | Af Mode1 | Un kown |

|   |   |   |   |   |   |
|---|---|---|---|---|---|
| AE1 | Un kown | Un kown | Un kown | Un kown | Un kown |
| Un kown | Un kown | Un kown | Un kown | Un kown | Un kown |
| Un kown | Un kown | Un kown | Un kown | Un kown | Un kown |
| Un kown | Un kown | Un kown | Un kown | Un kown | Un kown |

|   |   |   |   |   |   |
|---|---|---|---|---|---|
| AE1 | Un kown | Un kown | Un kown | Un kown | Un kown |
| Un kown | Un kown | Un kown | Un kown | Un kown | Un kown |
| Area Date1 | Area Date1 | Area Date1 | Area Date1 | Un kown | Un kown |
| Area Date1 | Area Date1 | Area Date1 | Area Date1 | Un kown | Un kown |

1701

FIG. 29A    FIG. 29B
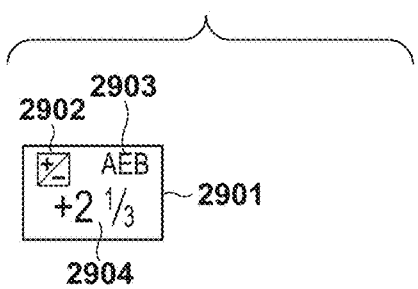
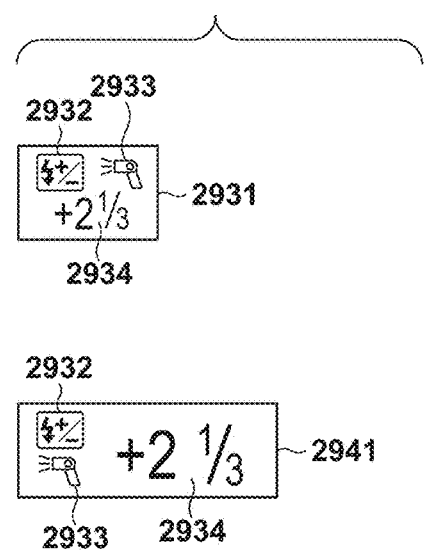
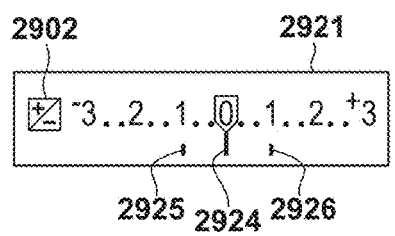
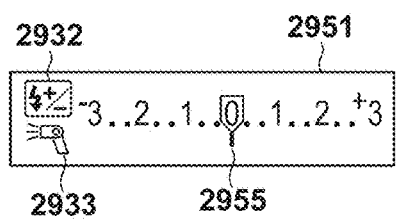

ELECTRONIC DEVICE, IMAGING CONTROL APPARATUS AND CONTROL METHOD THEREOF

BACKGROUND OF THE INVENTION

Field of the Invention

The present invention relates to an electronic device and imaging control apparatus that include a user interface configured to do various kinds of settings and a control method thereof.

Description of the Related Art

In general, there is known an electronic device that provides, as a user interface, a setting screen configured to do various kinds of settings using a display device. Such an electronic device has various contrivances to improve user operability. For example, a digital camera contrives a user interface that allows a user to more easily make settings such as a shutter speed, f-number, auto focus mode, white balance, and ISO at the time of shooting.

Japanese Patent Laid-Open No. 2009-177365 (to be referred to as literature 1 hereinafter) describes a function of displaying a list of the contents of a plurality of setting items as characters. Literature 1 explicitly describes that when a setting item is selected from the displayed list, a sub screen is displayed to allow the user to change the setting. In addition, when the display returns from the sub screen to the list display, the setting item of the changed setting is highlighted for a predetermined period in the list display. Japanese Patent Laid-Open No. 2007-110434 (to be referred to as literature 2 hereinafter) describes a user interface using a screen in which pieces of information about the items of shooting conditions are arranged in a matrix on an item basis. According to literature 2, the user is caused to select a desired setting item on such a screen by operating an XY-direction operation unit, and after selection of the desired setting item, set the condition by a rotation operation of a dial.

Japanese Patent Laid-Open No. 2011-159180 (to be referred to as literature 3 hereinafter) proposes an imaging apparatus capable of laying out a GUI (Graphical User Interface) button selected by the user out of a plurality of GUI buttons indicating various kinds of setting items at a position designated by the user. Japanese Patent Laid-Open No. 06-083537 (to be referred to as literature 4 hereinafter) proposes changing the size of an input enable area (a so-called touch button that is a kind of GUI button) displayed on a touch panel such that it fits to the size of the finger of the user who operates the touch panel. Japanese Patent No. 5153512 (to be referred to as literature 5 hereinafter) proposes an imaging apparatus that displays setting values, which can be set in a case in which a shooting condition compensation function and an auto bracketing function are used in combination, in association with a scale. Japanese Patent Laid-Open No. 9-305360 (to be referred to as literature 6 hereinafter) proposes a customized menu method for a hierarchical menu and a television system using this method.

Japanese Patent Laid-Open No. 7-168256 (to be referred to as literature 7 hereinafter) proposes a camera which, after the user selects a distance measuring point or sets an automatic selection state of the distance measuring point, always displays the set distance measuring point or the automatic selection state, thereby allowing the photographer to confirm distance measuring point information even if the camera is let stand after the setting of the distance measuring point.

In literature 1, according to selection of a setting item, a transition to the sub screen configured to change the setting state of the selected setting item occurs. The user changes the setting state on the sub screen. On the other hand, literature 2 describes an arrangement that enables a setting state to be changed by rotating a dial when the user selects a desired setting item on a screen on which a plurality of setting items are displayed as a list. Hence, according to literature 2, the setting state of a desired setting item can be changed without causing a transition to a sub screen. Additionally, in literature 2, if a specific button is operated in a state in which the desired setting item is selected, a transition to a sub screen that displays a list of setting states settable for the selected setting item occurs, and the setting can be changed on the screen.

However, both literatures 1 and 2 only describe selecting a desired setting state from a plurality of setting states arranged in one layer. However, some setting items have setting states in a plurality of layers. For example, white balance has a layer of first setting values (setting modes) for specifying a type (one of auto (AWB), sunlight, shade, color temperature, and the like) and a layer of second setting values (Kelvin values) that represent specific values of the color temperature when the first setting value is the color temperature. In a user interface that selects one of setting states arranged in one layer, as in literatures 1 and 2, a screen used to select the first setting value and a screen used to set the second setting value need to be prepared for one setting item "white balance". In this case, when setting the white balance, screen switching occurs, resulting in a cumbersome operation.

If the number of types of setting values to be displayed increases, the display size of the setting item also increases probably. When displaying a list of setting items, as in literature 1, if the display size of a setting item is large, the area to display other setting items becomes tight. Hence, concerning the white balance, a user who rarely sets a color temperature and normally only needs to change the setting state of the first setting value probably wants a setting item that enables the first setting value to be changed easily and has a small display size. On the other hand, a user who often sets a color temperature for the white balance probably wants a setting item that enables the setting state of the second setting value to be changed easily even if the display size becomes large.

The contents of information display that the user expects of a display item may change between a case in which a setting is done to display the display item large and a case in which a setting is done to display the display item small. For example, the setting to display the display item small is assumed to be done considering that the information amount of the setting item corresponding to the display item can be small. On the other hand, the setting to display the display item large may be done in expectation of detailed information easy to understand about the setting contents of the setting item corresponding to the display item. For example, the user is assumed to expect information display that needs a large display area using a scale, as in literature 5. However, in the conventional technique as described in literature 4, even when the size of a display item is changed, the display contents do not change, and contents of information display expected by the user for each size of the display item are not obtained.

There is an execution method of, upon receiving an instruction to execute a function, displaying a confirmation screen to ask whether to do execution and executing the function in accordance with an execution confirmation operation. This can prevent the user from erroneously executing the function. However, since the confirmation operation is necessary, the number of operations increases. In a customized screen for which the user selects items to be displayed, as described in literatures 3 and 6, the user knows the functions of the displayed functions well, and attention call such as the confirmation screen may be unnecessary.

When displaying an item concerning a focus position such as a distance measuring point in accordance with user selection, as in literature 3, the size of an item to display one item is fixed in the method of literature 3. It is therefore difficult to adjust the information amount of the item concerning the focus position in accordance with the application purpose of the user. Especially in a setting associated with the focus position, when the user wants to only confirm the setting value about the focus adjustment area, a display area of a small area suffices. However, to confirm a plurality of positions selectable as a focus adjustment position and a selected focus position, a display area of a large area is needed. In addition, the value that should undergo setting change is different.

SUMMARY OF THE INVENTION

A preferred embodiment of the present invention discloses an electronic device that provides an operation environment according to needs of a user on a customizable setting screen used to change the settings of the electronic device.

Also, according to the preferred embodiment of the present invention, there are provided an electronic device capable of displaying more preferable setting contents according to the display size of a setting item and a control method thereof.

Also, according to the preferred embodiment of the present invention, there are provided an electronic device that reduces the number of operations until execution of a function that the user knows well and a control method thereof.

Furthermore, according to the preferred embodiment of the present invention, there are provided an imaging control apparatus that displays an item concerning focus in a size suitable for the contents of information desired by the user and facilitates confirmation of a setting concerning focus, and a control method thereof.

According to one aspect of the present invention, there is provided an electronic device comprising: a display control unit configured to display, on a display unit, a setting screen on which an object corresponding to a setting item of the electronic device is laid out; a setting unit configured to set, in accordance with a user operation, which one of a plurality of objects is to be used to display a specific setting item on the setting screen, the plurality of objects including a first object and a second object whose display size is larger than the first object and whose information amount to be displayed is larger than the first object, and the number of types of setting values operable by the second object being larger than the number of types of setting values operable by the first object; and a change unit configured to, in a case in which the first object is selected and displayed on the setting screen, change a setting state of a first setting value concerning the specific setting item in accordance with an operation on one of a first operation member and a second operation member, and in a case in which the second object is selected and displayed on the setting screen, change the first setting value in accordance with the operation on the first operation member and change a setting state of a second setting value concerning the specific setting item in accordance with the operation on the second operation member.

According to another aspect of the present invention, there is provided a control method of an electronic device, comprising: displaying, on a display unit, a setting screen on which an object corresponding to a setting item of the electronic device is laid out; setting, in accordance with a user operation, which one of a plurality of objects is to be used to display a specific setting item on the setting screen, the plurality of objects including a first object and a second object whose display size is larger than the first object and whose information amount to be displayed is larger than the first object, and the number of types of setting values operable by the second object being larger than the number of types of setting values operable by the first object; and in a case in which the first object is selected and displayed on the setting screen, changing a setting state of a first setting value concerning the specific setting item in accordance with an operation on one of a first operation member and a second operation member, and in a case in which the second object is selected and displayed on the setting screen, changing the first setting value in accordance with the operation on the first operation member and changing a setting state of a second setting value concerning the specific setting item in accordance with the operation on the second operation member.

According to other aspect of the present invention, there is provided an electronic device comprising: a setting unit configured to set, in accordance with a user operation, which one of a plurality of objects including at least a first object and a second object larger than the first object is to be used to display a specific setting item; and a display control unit configured to control to, in a case in which the setting unit sets to display the specific setting item using the first object, display a value set concerning the specific setting item as the first object, and in a case in which the setting unit sets to display the specific setting item using the second object, display a scale concerning the specific setting item as the second object and perform display indicating a position corresponding to a setting value of the specific setting item on the scale.

According to other aspect of the present invention, there is provided a control method of an electronic device, comprising: setting, in accordance with a user operation, which one of a plurality of objects including at least a first object and a second object larger than the first object is to be used to display a specific setting item; and controlling to, in a case in which it is set to display the specific setting item using the first object, display a value set concerning the specific setting item as the first object, and in a case in which in the setting, it is set to display the specific setting item using the second object, display a scale concerning the specific setting item as the second object and perform display indicating a position corresponding to a setting value of the specific setting item on the scale.

According to other aspect of the present invention, there is provided an imaging control apparatus comprising: a setting unit configured to set, in accordance with a user operation, which one of a plurality of objects including at least a first object and a second object larger than the first object is to be used to display a focus item concerning a focus adjustment position; and a control unit configured to control to, in a case in which the setting unit sets to display the focus item using the first object, perform display concerning the focus item as the first object, and change a setting of a focus adjustment area when a first operation is performed in a state in which the first object is selected, and in a case in which the setting unit sets to display the focus item using the second object, perform display concerning the focus item as the second object, and change the focus adjustment position corresponding to the set focus adjustment area when the first operation is performed in a state in which the second object is selected.

According to other aspect of the present invention, there is provided a control method of an imaging control apparatus, comprising: setting, in accordance with a user operation, which one of a plurality of objects including at least a first object and a second object larger than the first object is to be used to display a focus item concerning a focus adjustment position; and controlling to, in a case in which in the setting, it is set to display the focus item using the first object, perform display concerning the focus item as the first object, and change a setting of a focus adjustment area when a first operation is performed in a state in which the first object is selected, and in a case in which in the setting, it is set to display the focus item using the second object, perform display concerning the focus item as the second object, and change the focus adjustment position corresponding to the set focus adjustment area when the first operation is performed in a state in which the second object is selected.

According to other aspect of an electronic device comprising: a setting unit configured to set an item selected by a user out of a plurality of items as an item to be displayed on a customized screen; a display control unit configured to control to display a predetermined item on a menu screen and display the item set by the setting unit on the customized screen; and a control unit configured to control to, in a case in which a specific item to execute a specific function displayed on the menu screen is selected, and an execution instruction operation is performed, display an execution confirmation screen of the specific function, and when execution is instructed on the execution confirmation screen, execute the specific function, and in a case in which the specific item displayed on the customized screen is selected, and the execution instruction operation is performed, execute the specific function without displaying the execution confirmation screen.

According to other aspect of the present invention, there is provided a control method of an electronic device, comprising: setting an item selected by a user out of a plurality of items as an item to be displayed on a customized screen; controlling to display a predetermined item on a menu screen and display the item set in the setting on the customized screen; and controlling to, in a case in which a specific item to execute a specific function displayed on the menu screen is selected, and an execution instruction operation is performed, display an execution confirmation screen of the specific function, and when execution is instructed on the execution confirmation screen, execute the specific function, and in a case in which the specific item displayed on the customized screen is selected, and the execution instruction operation is performed, execute the specific function without displaying the execution confirmation screen.

Further features of the present invention will become apparent from the following description of exemplary embodiments with reference to the attached drawings.

BRIEF DESCRIPTION OF THE DRAWINGS

FIG. 11 is a flowchart showing object layout processing by the customization setting function;

FIGS. 17A, 17B, and 17C are views showing item IDs added to the layout boxes of the editing screen;

FIGS. 29A and 29B are views showing object examples of an exposure compensation value and an AEB compensation value;

DESCRIPTION OF THE EMBODIMENTS

A preferred embodiment of the present invention will now be described with reference to the accompanying drawings.

Figure 1A:
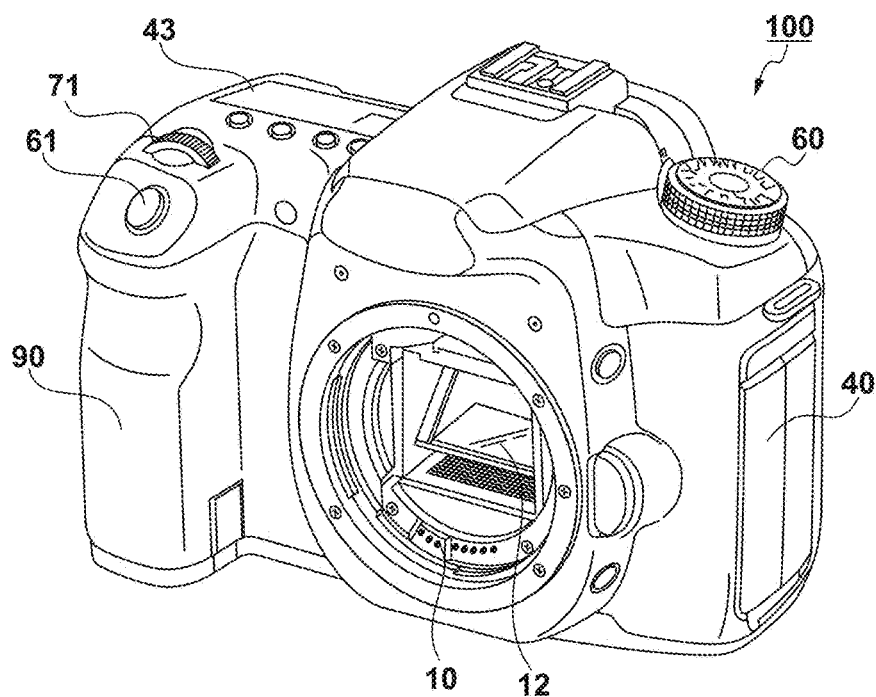
FIGS. 1A and 1B are views showing the outer appearance of a digital camera according to an embodiment.
Figure 1B:
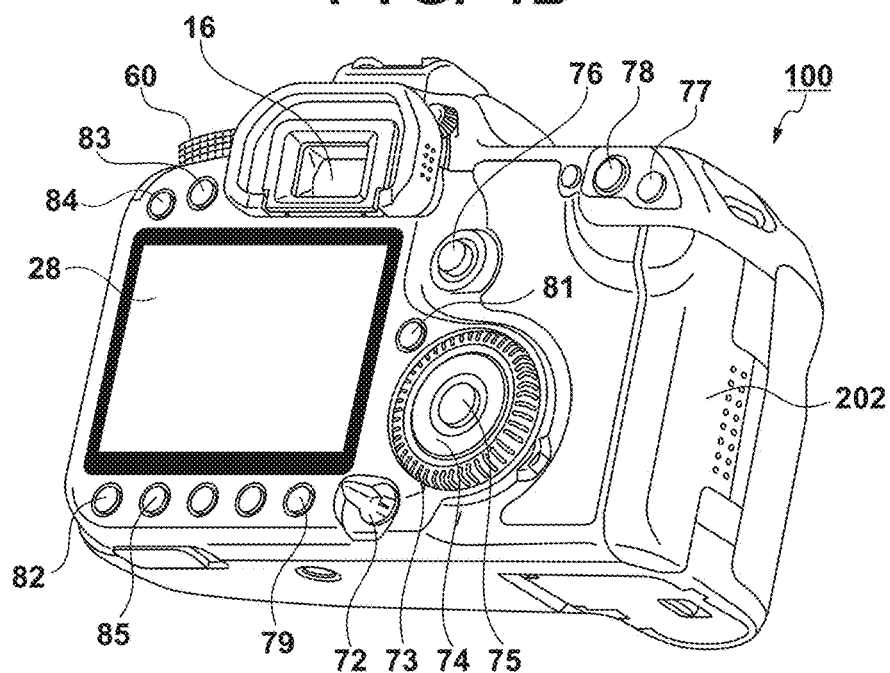

FIGS. 1A and 1B are views showing the outer appearance of a digital camera as an example of an imaging apparatus according to the present invention. FIG. 1A is a perspective front view of a digital camera 100. FIG. 1B is a perspective rear view of the digital camera 100. Referring to FIGS. 1A and 1B, a display unit 28 is a display unit that is provided on the back surface of the camera and displays an image or various kinds of information. An extra-viewfinder display unit 43 is a display unit that is provided on the upper surface of the camera and displays various setting values of the camera including a shutter speed and a stop. A shutter button 61 is an operation unit used to input a shooting instruction. A mode change switch 60 is an operation unit used to change various kinds of modes. A terminal cover 40 is a cover configured to protect a connector (not shown) for, for example, a connection cable that connects an external device and the digital camera 100.

Figure 2:
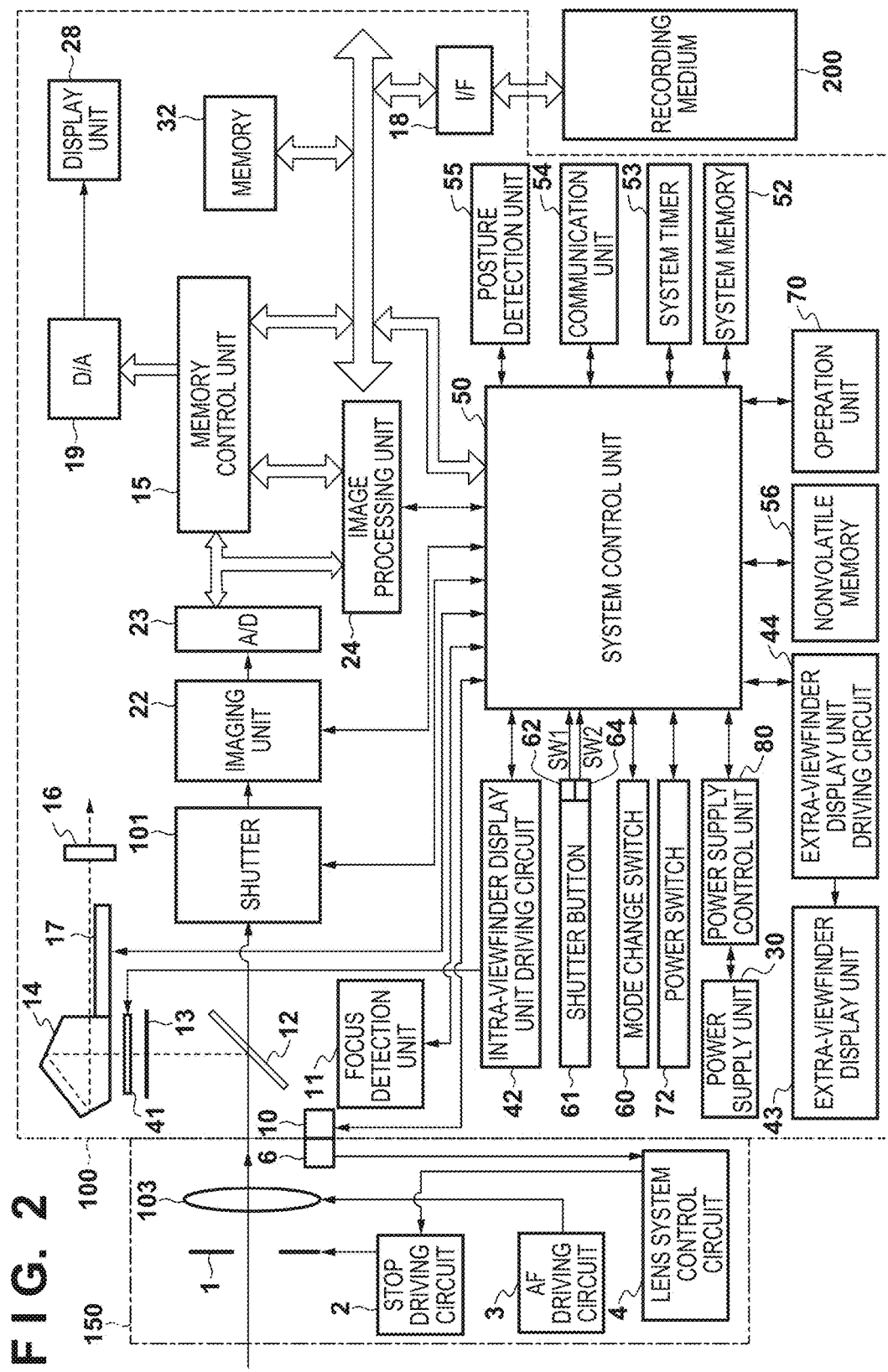
FIG. 2 is a block diagram showing the hardware arrangement of the digital camera according to the embodiment.

A main electronic dial 71 is a rotary operation member included in an operation unit 70 (FIG. 2). A setting value such as a shutter speed or a stop can be changed by rotating the main electronic dial 71. A power switch 72 is an operation member that powers on/off the digital camera 100. A sub electronic dial 73 is a rotary operation member that is included in the operation unit 70 and can, for example, move a selection frame or feed an image. A cross key 74 is a key (4-way selector) that is included in the operation unit 70 and has upper, lower, left, and right portions that can be pressed. An operation corresponding to the pressed portion of the cross key 74 can be performed. Note that a pointing stick may be provided in place of or in addition to the cross key 74. A SET button 75 is a push button that is included in the operation unit 70 and mainly used to, for example, decide a selected item.

An LV button 76 is a button that is included in the operation unit 70 and turns on/off live view (to be referred to as LV hereinafter) in a still image shooting mode. In a moving image shooting mode, the LV button 76 is used to instruct start or stop of moving image shooting (recording). An enlargement button 77 is an operation button that is included in the operation unit 70 and turns on/off an enlargement mode in live view display of the shooting mode or changes the enlargement ratio during the enlargement mode. In a reproduction mode, the enlargement button 77 functions as an enlargement button used to enlarge a reproduced image and increase the enlargement ratio. A reduction button 78 is a button that is included in the operation unit 70 and used to decrease the enlargement ratio of an enlarged reproduced image and reduce the displayed image. A reproduction button 79 is an operation button that is included in the operation unit 70 and switches between the shooting mode and the reproduction mode. When the reproduction button 79 is pressed during the shooting mode, the mode shifts to the reproduction mode, and the latest one of images recorded in a recording medium 200 can be displayed on the display unit 28.

A quick return mirror 12 is moved up/down by an actuator (not shown) based on an instruction from a system control unit 50 (FIG. 2). A communication terminal 10 is a communication terminal used by the digital camera 100 to communicate with the lens side (detachable). An eyepiece viewfinder 16 is a look-in type viewfinder (to be referred to as a viewfinder 16 hereinafter) used to confirm the focus or composition of an optical image of an object obtained through a lens unit 150 (FIG. 2) by observing a focusing screen 13 (FIG. 2). A lid 202 is the lid of a slot used to store the recording medium 200 (FIG. 2). A grip portion 90 is a holding portion of a shape that allows the user to easily hold the digital camera 100 by the right hand.

A Q button 81 is an operation button that is included in the operation unit 70 and accepts a user operation in a customization function (to be described later). A trash button 82 is an operation button that is included in the operation unit 70 and used by the user to instruct deletion of an image file or deletion of an object in a customizable setting screen. An INFO button 83 is an operation button that is included in the operation unit 70 and used to switch the screen displayed on the display unit 28. A MENU button 84 is an operation button used to make display on the display unit 28 transition to a menus screen. Various functions are assigned to a multifunction button 85 in accordance with the operation state of the digital camera 100.

FIG. 2 is a block diagram showing an example of the arrangement of the digital camera 100 according to this embodiment. Referring to FIG. 2, the lens unit 150 is a lens unit including an interchangeable shooting lens. Although a lens 103 normally includes a plurality of lenses, only one lens is simply illustrated here. A communication terminal 6 is a communication terminal used by the lens unit 150 to communicate with the side of the digital camera 100. The communication terminal 10 is a communication terminal used by the digital camera 100 to communicate with the side of the lens unit 150. The lens unit 150 communicates with the system control unit 50 via the communication terminals 6 and 10, controls a stop 1 by an internal lens system control circuit 4 via a stop driving circuit 2, and displaces the position of the lens 103 via an AF driving circuit 3, thereby attaining focus.

An AE sensor 17 measures the brightness of an object via the lens unit 150. A focus detection unit 11 outputs defocus amount information to the system control unit 50. Based on the defocus amount information, the system control unit 50 controls the lens unit 150 and performs phase difference AF. The quick return mirror 12 (to be referred to as the mirror 12 hereinafter) is moved up/down by an actuator (not shown) based on an instruction from the system control unit 50 at the time of exposure, live view shooting, or moving image shooting. The mirror 12 is configured to switch a light beam that has entered from the lens 103 to the side of the viewfinder 16 or the side of an imaging unit 22. In a normal state, the mirror 12 is arranged so as to reflect and guide the light beam to the viewfinder 16. When performing shooting or live view display, the mirror 12 moves up and retracts from the light beam so as to guide the light beam to the imaging unit 22 (mirror up). The mirror 12 includes a half mirror at the center so as to partially pass light. The mirror 12 partially passes the light beam and makes it enter the focus detection unit 11 configured to detect focus.

The photographer can confirm the focus or composition of an optical image of an object obtained through the lens unit 150 by observing the focusing screen 13 via a pentaprism 14 and the viewfinder 16. A shutter 101 is a focal plane shutter capable of freely controlling the exposure time of the imaging unit 22 under the control of the system control unit 50. The imaging unit 22 is an image sensor formed from a CCD or CMOS element that converts an optical image into an electrical signal. An A/D converter 23 converts an analog signal into a digital signal. The A/D converter 23 is used to convert an analog signal output from the imaging unit 22 into a digital signal.

An image processing unit 24 performs resize processing such as predetermined pixel interpolation or reduction or color conversion processing for data from the A/D converter 23 or data from a memory control unit 15. The image processing unit 24 performs predetermined calculation processing using captured image data, and the system control unit 50 performs exposure control or distance measuring control based on the obtained calculation result. AF (Auto Focus) processing, AE (Auto Exposure) processing, and EF (Pre-Light Emission) processing of a TTL (Through The Lens) system are thus performed. The stop driving circuit 2 also performs predetermined calculation processing using the captured image data, and performs AWB (Auto White Balance) processing of the TTL system based on the obtained calculation result.

Output data from the A/D converter 23 is directly written in a memory 32 via the image processing unit 24 and the memory control unit 15 or via the memory control unit 15. The memory 32 stores image data obtained by the imaging unit 22 and converted by the A/D converter 23 into digital data or image data to be displayed on the display unit 28. The memory 32 has a sufficient storage capacity to store a predetermined number of still images or a moving image and audio of a predetermined time. The memory 32 also serves as an image display memory (video memory). A D/A converter 19 converts image display data stored in the memory 32 into an analog signal and supplies it to the display unit 28. The display image data written in the memory 32 is thus displayed on the display unit 28 via the D/A converter 19.

The display unit 28 performs display according to the analog signal from the D/A converter 19 on a display device such as an LCD. A digital signal temporarily A/D-converted by the A/D converter 23 and accumulated in the memory 32 is converted into an analog signal by the D/A converter 19 and sequentially transferred to and displayed on the display unit 28. The display unit 28 can thus function as an electronic viewfinder and perform live image display (live view display).

A frame (AF frame) indicating a distance measuring point at which auto focus is currently being performed, an object indicating the setting state of the camera, or the like is displayed on an intra-viewfinder liquid crystal display unit 41 via an intra-viewfinder display unit driving circuit 42. Various setting values of the camera including a shutter speed and a stop are displayed on the extra-viewfinder display unit 43 via an extra-viewfinder display unit driving circuit 44.

A nonvolatile memory 56 is an electrically erasable/recordable memory, and for example, an EEPROM is used. The nonvolatile memory 56 stores constants, a program, and the like for the operation of the system control unit 50. The program here is a program used to execute various kinds of flowcharts to be described later in the embodiment.

The system control unit 50 controls the entire digital camera 100. The program recorded in the above-described nonvolatile memory 56 is executed, thereby implementing each process of the embodiment to be described later. A RAM is used as a system memory 52. The constants and variables for the operation of the system control unit 50, the program read out from the nonvolatile memory 56, and the like are expanded on the system memory 52. The system control unit 50 also controls the memory 32, the D/A converter 19, the display unit 28, and the like, thereby performing display control. A system timer 53 is a time count unit that measures time used for various kinds of control or the time of an internal clock.

A mode change switch 60, a first shutter switch 62, a second shutter switch 64, and the operation unit 70 are operation units configured to input various kinds of operation instructions to the system control unit 50. The mode change switch 60 changes the operation mode of the system control unit 50 to one of a still image recording mode, a moving image shooting mode, a reproduction mode, and the like. Modes included in the still image recording mode are an auto shooting mode, an auto scene determination mode, a manual mode, a stop priority mode (Av mode), and a shutter speed priority mode (Tv mode). Also included are various scene modes that are shooting settings for shooting scenes, a program AE mode, a custom mode, and the like. The operation mode can directly be changed to one of these modes included in a menu button using the mode change switch 60. Alternatively, after display is temporarily changed to the menu button by the mode change switch 60, the operation may be changed to one of these modes included in the menu button using another operation member. The moving image shooting mode may similarly include a plurality of modes.

The first shutter switch 62 is turned on halfway through the operation of the shutter button 61 provided on the digital camera 100, that is, by a so-called half stroke (shooting preparation instruction), and generates a first shutter switch signal SW1. Operations such as AF (Auto Focus) processing, AE (Auto Exposure) processing, AWB (Auto White Balance) processing, and EF (Pre-Light Emission) processing are started by the first shutter switch signal SW1. The second shutter switch 64 is turned on by completing the operation of the shutter button 61, that is, by a so-called full stroke (shooting instruction), and generates a second shutter switch signal SW2. The system control unit 50 starts a series of operations of shooting processing from signal read from the imaging unit 22 to image data write in the recording medium 200 by the second shutter switch signal SW2.

The operation members of the operation unit 70 are appropriately assigned functions for each scene by selectively operating various kinds of functional objects displayed on the display unit 28, and act as various kinds of function buttons. Examples of the function buttons are an end button, a return button, an image feed button, a jump button, a narrow-down button, and an attribute change button. For example, when the menu button is pressed, various settable menu screens are displayed on the display unit 28. The user can intuitively make various kinds of settings using the menu screens displayed on the display unit 28 and the upper, lower, left, and right buttons of the 4-way selector (cross key 74) or the SET button 75.

The operation unit 70 includes various kinds of operation members each serving as an input unit configured to accept a user operation. The operation unit 70 includes at least the shutter button 61, the main electronic dial 71, the power switch 72, the sub electronic dial 73, the cross key 74, and the SET button 75. The operation unit 70 also includes the LV button 76, the enlargement button 77, the reduction button 78, the reproduction button 79, the Q button 81, the trash button 82, the INFO button 83, the MENU button 84, and the multifunction button 85.

A power supply control unit 80 is formed from a battery detection circuit, a DC/DC converter, a switch circuit that switches a block to be energized, and the like, and detects the presence/absence of attachment of a battery, the type of the battery, and the battery level. The power supply control unit 80 controls the DC/DC converter based on the detection result and an instruction from the system control unit 50 and supplies a necessary voltage to the units including the recording medium 200 for a necessary period.

A power supply unit 30 is formed from a primary battery such as an alkali battery or a lithium battery, a secondary battery such as an NiCd battery, an NiMH battery, or an Li battery, an AC adapter, or the like. A recording medium I/F 18 is an interface to the recording medium 200 such as a memory card or a hard disk. The recording medium 200 is a recording medium such as a memory card for recording a shot image, and is formed from a semiconductor memory, a magnetic disk, or the like.

A communication unit 54 is connected wirelessly or using a cable and transmits/receives a video signal or audio signal. The communication unit 54 can also be connected to a wireless LAN (Local Area Network) or the Internet. The communication unit 54 can transmit an image (including a live image) captured by the imaging unit 22 or an image recorded in the recording medium 200 and receive image data and various kinds of information from an external device.

A posture detection unit 55 detects the posture of the digital camera 100 with respect to the gravitational direction. It can be judged based on the posture detected by the posture detection unit 55 whether an image shot by the imaging unit 22 is an image shot by the digital camera 100 held horizontally or vertically. The system control unit 50 can add direction information according to the posture detected by the posture detection unit 55 to the image file of an image captured by the imaging unit 22 or record a rotated image. As the posture detection unit 55, an acceleration sensor, a gyro sensor, or the like is usable.

A customization setting function of customizing a shooting setting screen (to be referred to as a setting screen hereinafter) used to do various kinds of settings in shooting of the digital camera 100 according to the embodiment with the above-described arrangement and its operation method will be described next. In addition, control and operation when changing various kinds of setting values using the setting screen customized using the customization setting function will be described.

The customization setting function is a function of customizing a setting screen that displays a list of a plurality of setting items used to set parameters such as a shutter speed, exposure compensation, and white balance for shooting or instruct execution of a predetermined function such as sensor cleaning. A plurality of objects corresponding to the setting items are displayed on the setting screen, as will be described later with reference to FIGS. 3A to 3C. The user can grasp the setting state of the digital camera 100 by viewing the objects displayed on the setting screen and also change the setting value of a setting item corresponding to an object selected on the setting screen. Hence, the user can quickly make settings on the setting screen. With the customization setting function, the user can select a setting item to be displayed on the setting screen as an object, select the display size of each object, and select the layout position of each object on the screen. Note that the processing of each flowchart to be described below is implemented by causing the system control unit 50 to execute a program stored in the nonvolatile memory 56 or a program expanded on the system memory 52.

Figure 3A:
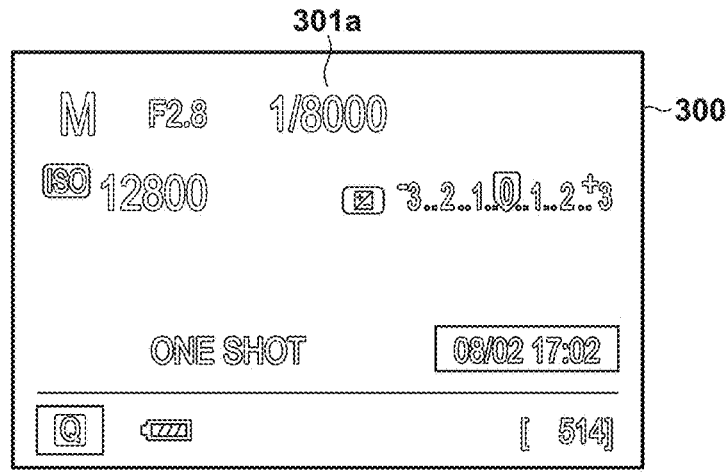
FIGS. 3A, 3B, and 3C are views showing an example of a setting screen capable of making settings at the time of shooting.
Figure 3B:
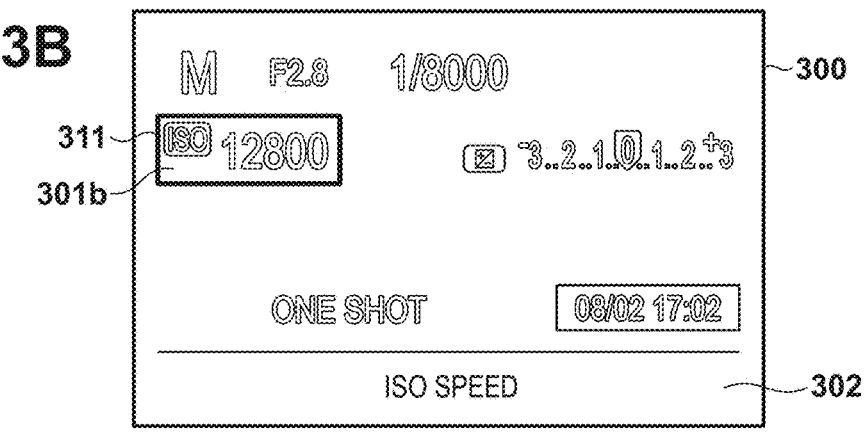
Figure 3C:
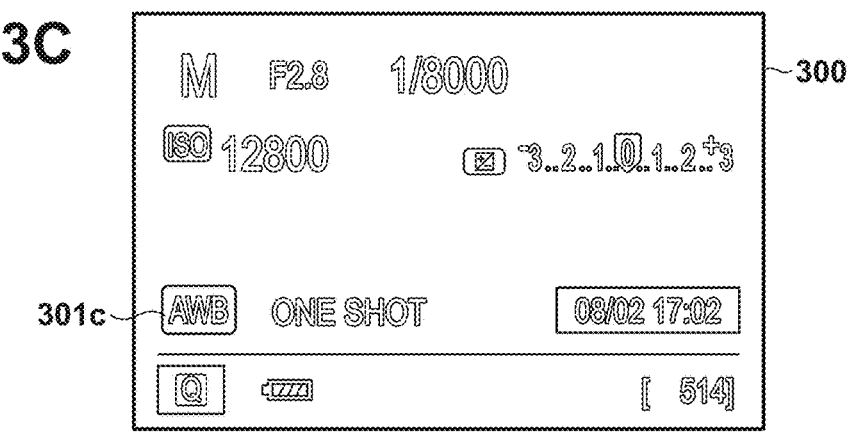

FIGS. 3A to 3C are views showing an example of a setting screen 300 customizable by the user using the customization setting function according to this embodiment. The setting screen 300 is one of screens to be displayed on the display unit 28 by screen switching by the operation of the INFO button 83 (to be described later). On the setting screen 300 shown in FIG. 3A, the objects of setting items such as an f-number, a shutter speed, an ISO value, and an exposure compensation value are displayed. Each object indicates the current setting state of a corresponding setting item. For example, an object 301a is the setting of the shutter speed, and indicates that the shutter speed is set to $\frac{1}{8000}$ sec. Each object has a size (an integer multiple of a layout box) based on a layout box (to be described later) as a unit, and is laid out according to the layout box. The layout of the objects on the setting screen can be changed by the customization function.

FIG. 3B shows an operation state when setting the ISO speed as an example of the setting operation by the user using the setting screen 300. When the Q button 81 is pressed, a cursor 311 movable by the user is displayed. The user can move the cursor 311 to the position of an object 301b corresponding to the setting item of ISO speed and thus change the setting value of the ISO speed using the main electronic dial 71 or the sub electronic dial 73. Note that at this time, a guidance area 302 has an indication for the setting item (in this example, ISO speed) corresponding to the object currently selected by the cursor 311. The cursor 311 moves among the positions where the objects exist in accordance with a user operation. The size of the frame of the cursor 311 changes in accordance with the size of the object. Details of the setting operation will be described later. FIG. 3C shows a state in which an object 301c for setting white balance is added to the setting screen 300 by layout editing (to be described later in detail) of the setting screen 300 by the customization setting function from the state shown in FIG. 3A.

Figure 4A:
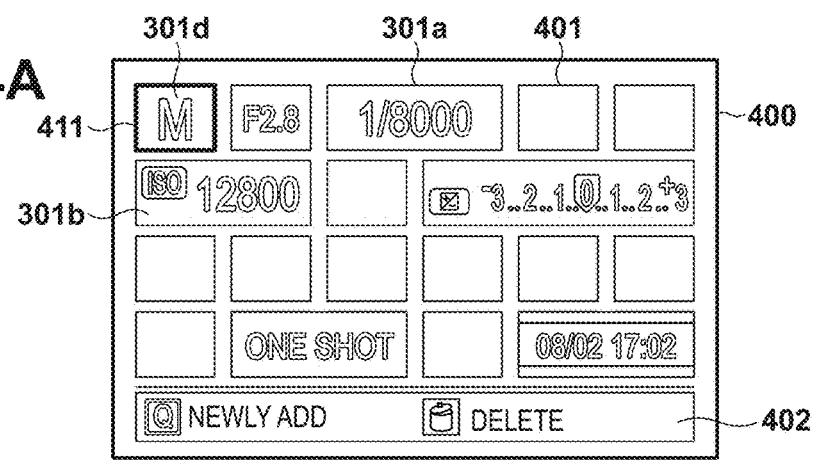
FIGS. 4A, 4B, and 4C are views showing an example of an editing screen by a customization setting function.

FIG. 4A is a view showing an example of an editing screen 400 displayed in layout editing processing of editing the setting screen by the customization setting function as described above. When the customization setting function is activated in accordance with a procedure to be described later, the editing screen 400 is displayed on the display unit 28. The editing screen 400 shown in FIG. 4A corresponds to the setting screen 300 shown in FIG. 3A. Using the customization setting function of the digital camera 100, the user can select a setting item to be added, set the size of an object to be displayed on the setting screen concerning the selected setting item and the way of displaying the object, and decide the layout position. The user can thus display the object of the desired setting item on the setting screen.

A layout box 401 is a unit (unit area) which has a predetermined size and in which an object corresponding to a setting item is laid out. The layout box 401 is displayed at a portion of the editing screen 400 by the customization setting function where no object is laid out. A plurality of layout boxes 401 are arranged on the screen. In the example of FIG. 4A, 4 boxes×6 boxes are arranged in the vertical and horizontal directions. In the example of FIG. 4A, for example, the object 301a as the setting item of shutter speed has a size of 2×1 layout boxes (to be also referred to as 2×1 hereinafter), and is laid out in the third box from the left on the first column out of the plurality of layout boxes on the screen. Note that the layout box 401 is not displayed on the setting screen 300 shown in FIGS. 3A to 3C. The way of arranging the layout boxes and the number of layout boxes are not limited to the above-described arrangement. The smaller the size of the layout box is, the higher the degree of freedom in the layout position or size of an object becomes. The layout box may have the size of one pixel.

Figure 4B:
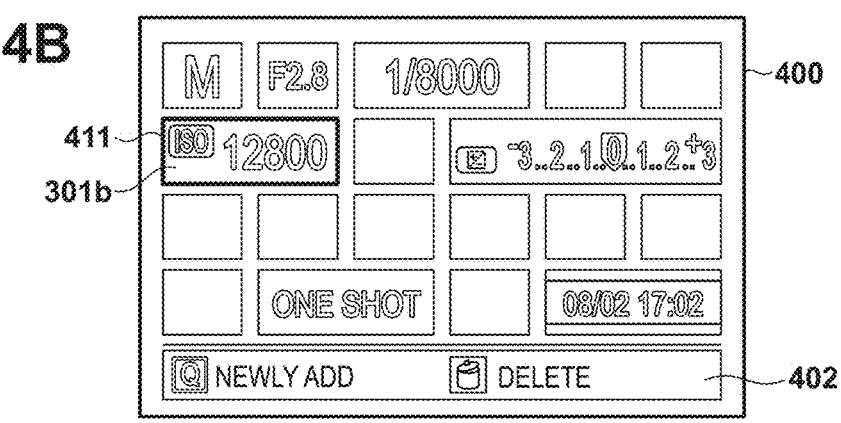
Figure 4C:
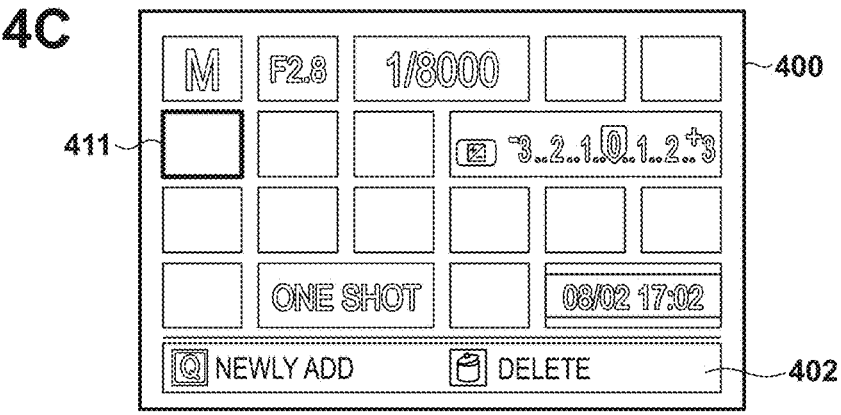

A cursor 411 is a frame indicator surrounding an object or the layout box 401, and indicates the current cursor position. When located on the layout box 401 without an object, the cursor 411 has a size corresponding to one layout box 401. When the cursor 411 is located on the layout box 401 with an object, its size changes depending on the display size of the object. For example, in FIG. 4A, the cursor 411 is located on an object 301d having a size of 1×1, and has a size corresponding to one layout box 401. On the other hand, in FIG. 4B, the cursor 411 is located on the object 301b having a size of 2×1, and has a size of 2×1 (a size corresponding to two layout boxes 401). FIG. 4C shows a state in which the cursor 411 is located on a layout box without an object.

An operation guide for the editing screen 400 is displayed in a guidance area 402. The operation guide displays a set of operation contents enabled in the state and an icon representing an operation member assigned the operation. In the illustrated example, the set of the icon of the Q button 81 and the operation contents (new object addition) and the set of the icon of the trash button 82 and the operation contents (object deletion) are displayed.

Figure 5A:
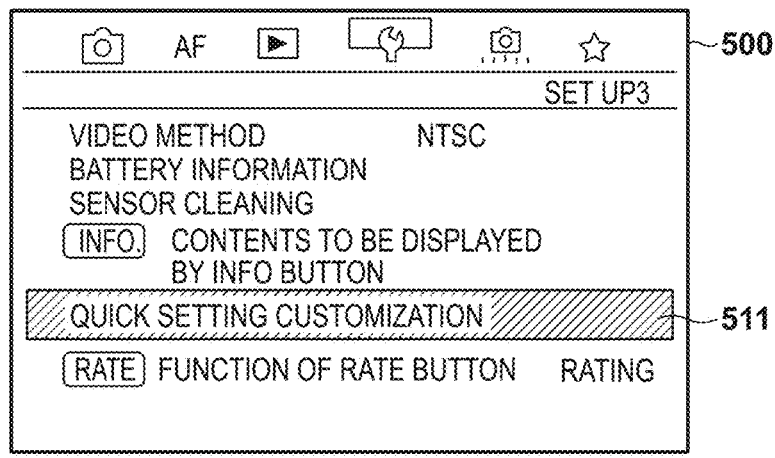
FIGS. 5A, 5B, and 5C are views for explaining menu screens displayed by operating a MENU button.
Figure 5B:
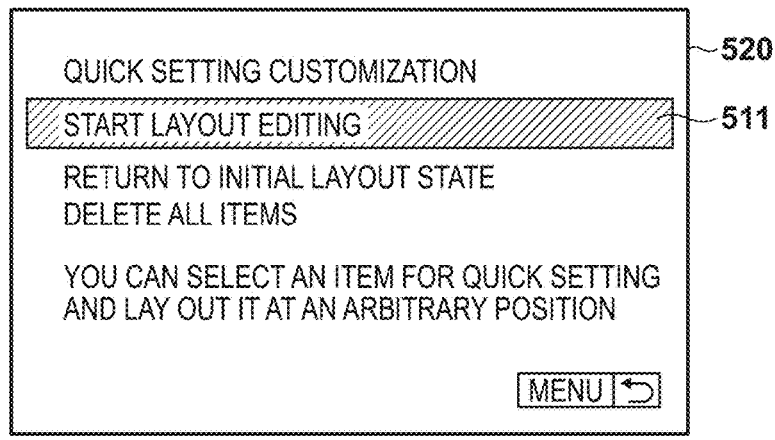
Figure 5C:
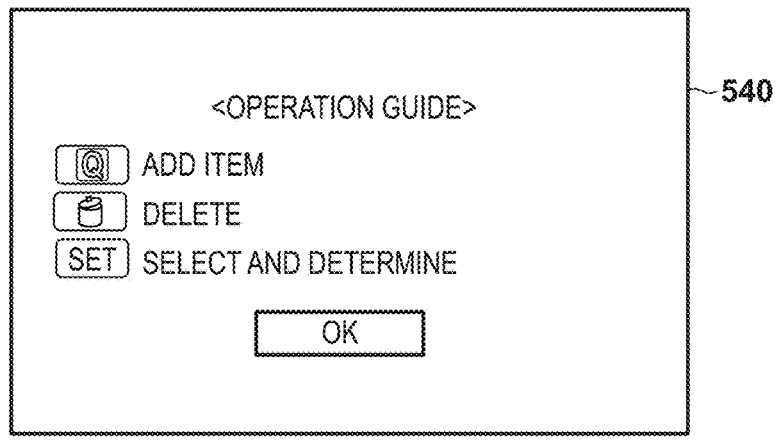

The operation of the customization setting function according to this embodiment will be described next. Note that the customization setting function is activated by, for example, the following operation. First, the system control unit 50 displays a menu screen 500 as shown in FIG. 5A on the display unit 28 in accordance with pressing of the MENU button 84. When the user places a cursor 511 on the menu item "quick setting customization" by operating the cross key 74 and presses the SET button 75, the system control unit 50 activates the customization setting function. When the customization setting function is activated, the system control unit 50 displays a menu screen 520 of quick setting customization as shown in FIG. 5B. When the user places the cursor 511 on the menu item "start layout editing" on the menu screen 520 and presses the SET button 75, the customization setting function displays a guide screen 540 as shown in FIG. 5C. The editing screen 400 as shown in FIG. 4A is displayed in accordance with pressing of the SET button 75, and layout editing processing that allows the user to change the setting items starts. Note that display of the guide screen 540 shown in FIG. 5C may be omitted.

Figure 6:
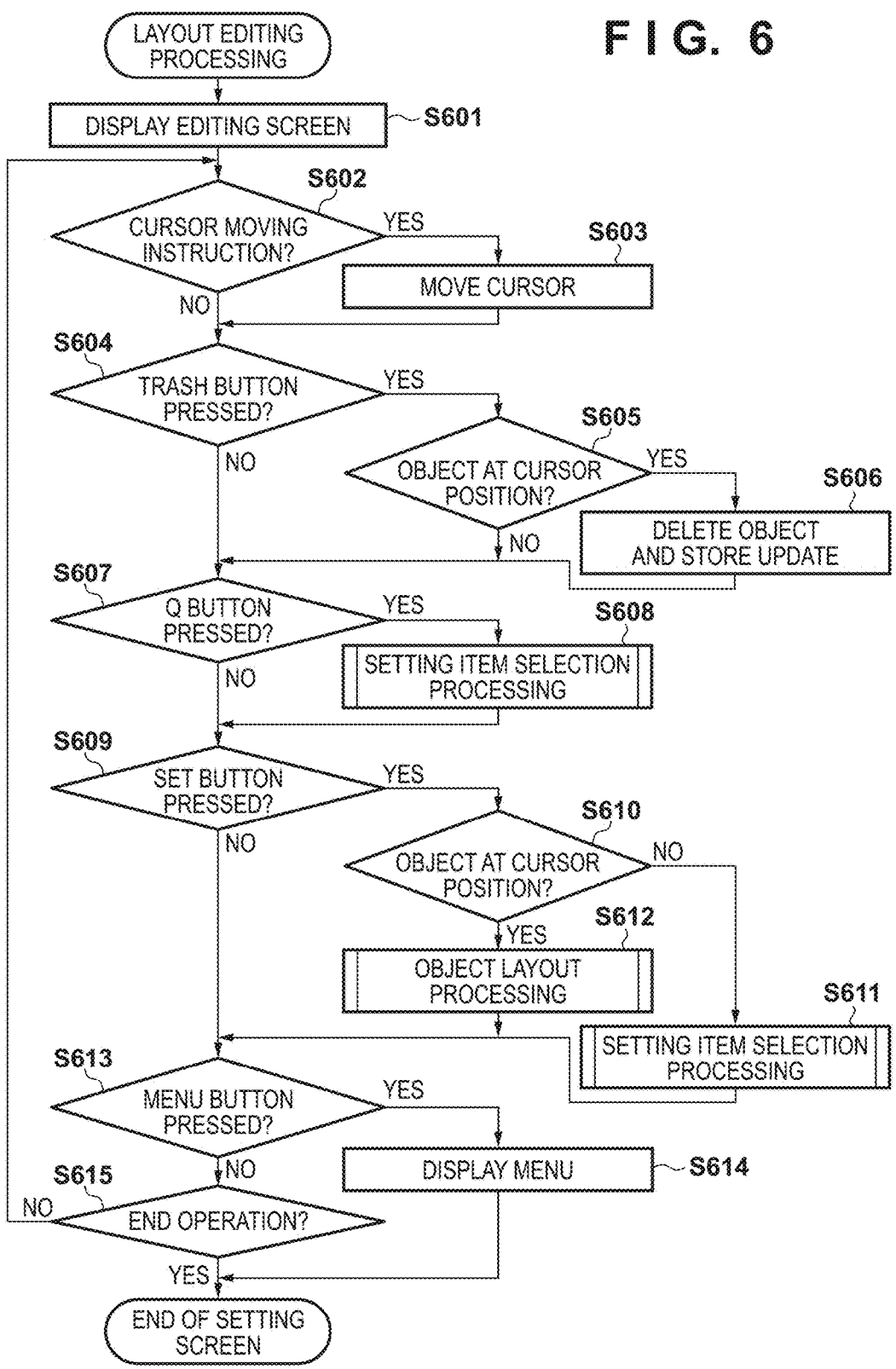
FIG. 6 is a flowchart for explaining layout editing processing by the customization setting function.

FIG. 6 is a flowchart for explaining layout editing processing by the customization setting function, which is activated by the above-described operation (selection of "start layout editing" on the menu screen 500). When layout editing processing starts, the system control unit 50 displays the editing screen 400 used to change the objects to be displayed on the setting screen (step S601). If objects already laid out exist when starting display of the editing screen 400, the system control unit 50 reads out them from the nonvolatile memory 56 and thus forms the editing screen. For example, if the setting screen 300 as shown in FIG. 3A is already formed, the system control unit 50 reads out the objects included in the setting screen 300 and forms the editing screen 400. As a result, the editing screen 400 shown in FIG. 4A is displayed.

Next, the system control unit 50 judges whether a cursor moving instruction (for example, an instruction by the cross key 74) is issued by the operation unit 70 (step S602). If a cursor moving instruction is issued, the system control unit 50 moves the cursor 411 in the direction designated by the cursor moving instruction (step S603). As described above, the cursor 411 moves based on the layout box 401 as a unit if no object is laid out. If an object is laid out, the cursor 411 moves based on the size of the object as a unit. The size of the cursor 411 complies with the size of the layout box or the size of the object.

Upon judging that the trash button 82 of the operation unit 70 is pressed (step S604), the system control unit 50 judges whether an object exists at the position (cursor position) of the cursor 411 (step S605). If an object exists at the cursor position, the display of the object is deleted (step S606). For example, when the user moves the cursor 411 to the object 301b as the setting item of ISO, as shown in FIG. 4B, and presses the trash button 82, the object 301b at the cursor position is deleted, and the state shown in FIG. 4C is obtained. When an object is deleted, the system control unit 50 stores, in the nonvolatile memory 56, the item updating on the screen of customization setting for the setting item at the time of shooting (step S606).

Upon judging that the Q button 81 is pressed (step S607), the system control unit 50 starts setting item selection processing of selecting a setting item to be additionally displayed as an object (step S608). Setting item selection processing in step S608 will be described later with reference to the flowchart of FIG. 7.

Upon judging that the SET button 75 is pressed (step S609), the system control unit 50 judges whether an object exists at the position of the cursor 411 (step S610). Upon judging that no object exists at the position of the cursor 411 (that is, if the cursor 411 is located on a free layout box), setting item selection processing (FIG. 7) of adding an object to the setting screen starts (step S611). On the other hand, if an object exists under the cursor 411, the system control unit 50 starts object layout processing (step S612). In the object layout processing, the user can move the object exiting under the cursor 411 to an arbitrary position and lay out it. The object layout processing will be described later with reference to the flowchart of FIG. 11.

For example, if the SET button 75 is pressed in a state in which the cursor 411 exists on a layout box without an object, as shown in FIG. 4C, setting item selection processing starts (steps S609, S610, and S611). If the SET button 75 is pressed in a state in which an object (in this example, the object 301b representing ISO speed setting) exists at the cursor position, as shown in FIG. 4B, the system control unit 50 starts object layout processing (steps S609, S610, and S612). By executing the object layout processing, the user can change the position of the object 301b.

Upon judging that the MENU button 84 is pressed (step S613), the system control unit 50 ends the layout editing processing and displays the menu screen 520 for shift to layout editing processing shown in FIG. 5B (step S614). Upon detecting an end operation of layout editing processing, the layout editing processing ends (step S615). For example, upon detecting ON of the first shutter switch 62 of the shutter button 61, the system control unit 50 ends the layout editing processing and causes the digital camera 100 to transition to a shooting operation. The camera thus shifts to a shooting standby state. If a shooting function setting screen (custom) (to be described later) was displayed in the shooting standby state before the start of layout editing processing, the shooting function setting screen (custom) is displayed again (for example, display shown in FIG. 3A). Note that when the layout editing processing ends, and the camera shifts to the shooting standby state, the shooting function setting screen (custom) may be displayed independently of the screen displayed in the shooting standby state before the start of layout editing processing. That is, the shooting function setting screen (custom) may be displayed independently of which one of the screens that can selectively be displayed every time the INFO button 83 (to be described later with reference to FIG. 19) is pressed was displayed. This allows the user to confirm how the result of layout editing processing is reflected on the shooting function setting screen (custom).

Figure 7:
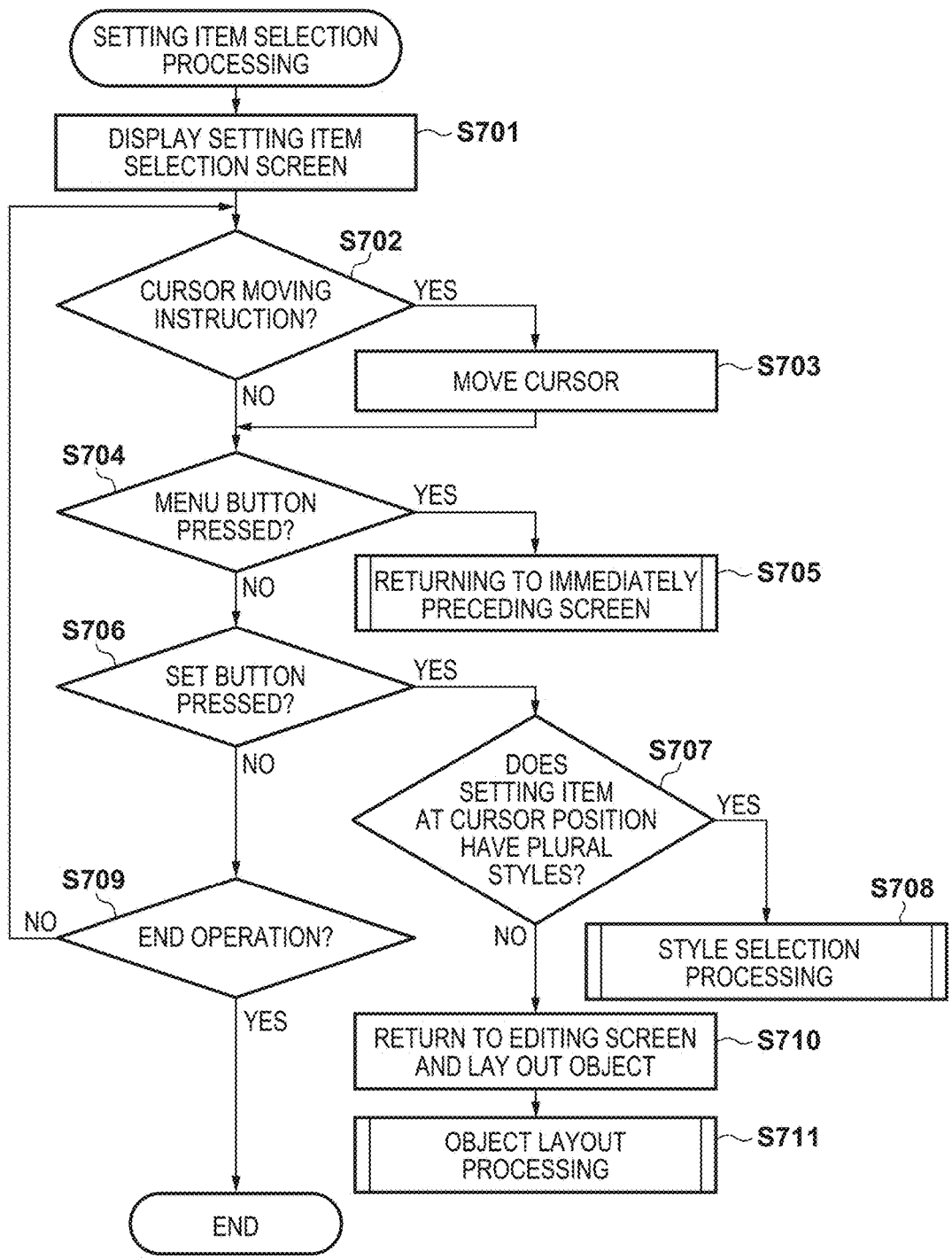
FIG. 7 is a flowchart showing setting item selection processing by the customization setting function.

Setting item selection processing that starts in step S608 or S611 described above will be described next with reference to the flowchart of FIG. 7. In setting item selection processing, the user can select a setting item to be displayed on the setting screen as an object and select the display style of the object corresponding to the selected setting item.

Figure 9A:
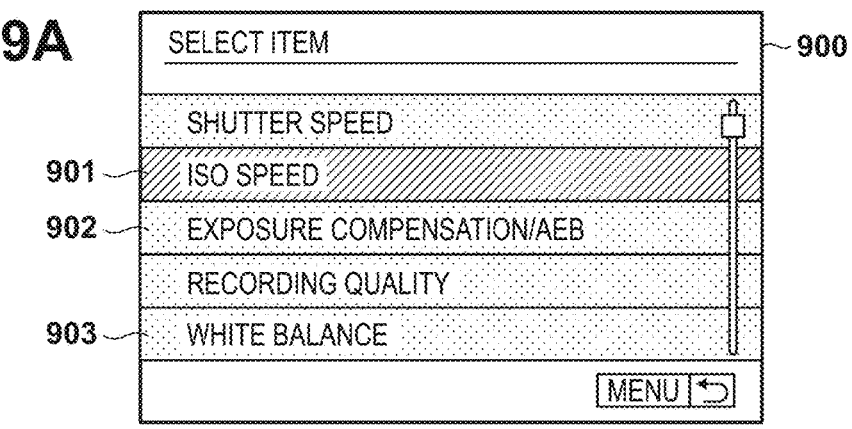
FIGS. 9A, 9B, and 9C are views showing examples of a setting item selection screen and a style selection screen.

First, the system control unit 50 displays, on the display unit 28, a setting item selection screen used to select a setting item to be displayed as an object (step S701). This screen causes the user to select a setting item to be newly laid out as an object on the customizable setting screen. FIG. 9A is a view showing a display example of a setting item selection screen 900 according to this embodiment. On the setting item selection screen 900, the user can move a cursor 901 in the vertical direction by operating the cross key 74 and select a desired setting item. A setting item 902 (exposure compensation/AEB) is an item that is already laid out as an object on the customizable setting screen. Hence, the setting item 902 is grayed out and is therefore unselectable on this screen. However, if a plurality of objects of the same setting item can selectively be laid out on one setting screen, the setting item is not grayed out and is therefore selectable on the setting item selection screen 900. A setting item 903 (white balance) is an item whose corresponding object can newly be laid out on the setting screen. Note that the setting items 902 and 903 are explicitly shown by displaying the names. However, the present invention is not limited to this, and, for example, icon expression using characters may be used.

Upon judging that a cursor moving instruction (for example, a vertical designation operation by the cross key 74) is issued by the operation unit 70 (step S702), the system control unit 50 moves the cursor 901 in the designated direction (step S703). Note that if the setting item of the moving destination is grayed out at this time (if the setting item is unselectable), the cursor may skip the item and move to the next selectable item. For example, if a cursor moving instruction to the lower side is issued in the state shown in FIG. 9A, the cursor 901 may skip the setting item 902 of exposure compensation/AEB and move to the setting item of recording quality. Upon judging that the MENU button 84 is pressed (step S704), the system control unit 50 returns to the immediately preceding screen (step S705). Here, the screen transitions to the screen before the transition to the setting item selection screen, that is, the editing screen (step S601).

Upon judging that the SET button 75 is pressed (step S706), the system control unit 50 judges whether the setting item at the cursor position of the cursor 901 has a plurality of styles (step S707). Upon judging that the setting item does not have a plurality of styles, the system control unit 50 returns the screen to the editing screen 400, and lays out the object corresponding to the setting item at the position of the cursor 411 (step S710). The system control unit 50 then starts object layout processing of laying out and determining the object on the setting screen (step S711). Object layout processing will be described later with reference to the flowchart of FIG. 11. On the other hand, if the setting item has a plurality of styles, the system control unit 50 starts style selection processing (step S708). Style selection processing will be described later with reference to the flowchart of FIG. 8. Upon detecting an end operation of setting item selection processing, the system control unit 50 ends the processing (step S709). For example, when the first shutter switch 62 of the shutter button 61 is turned on, the system control unit 50 ends the setting item selection processing. This processing is the same as that in a case in which step S615 described above results in a "YES".

Style selection processing executed in step S708 described above will be described next with reference to the flowchart of FIG. 8. When style selection processing starts, the system control unit 50 displays a style selection screen first (step S801). FIGS. 9B and 9C show an example of the style selection screen. Here, a style selection screen 920 in a case in which the setting item is white balance is shown. If the cursor 901 is moved to the setting item 903 of white balance on the setting item selection screen 900 shown in FIG. 9A, and the SET button 75 is pressed in this state, the style selection screen 920 concerning the white balance is displayed. On the style selection screen, the user can select the display size of the object to be laid out on the customized setting screen or the way of displaying information in the object (these will generically be referred to a style hereinafter).

On the style selection screen 920, the name of the setting item as the style selection target is displayed in a setting item name display 921. A cursor 922 is moved by, for example, a vertical operation of the cross key 74, whereby the user selects the display size. An object corresponding to the display size currently selected by the cursor 922 is displayed in a style display 923. When the style (display size) selected by the cursor 922 is changed from "1×1" shown in FIG. 9B to "2×1", as shown in FIG. 9C, the object displayed in the style display 923 also changes accordingly. As is apparent from FIGS. 9B and 9C, an object expresses a different information amount depending on the display size. For example, when setting white balance by a color temperature, the object having the display size of 1×1 is too small to display the value of the color temperature, and the temperature value is not displayed. However, when the display size is changed to 2×1, as shown in FIG. 9C, the color temperature setting value of white balance can be displayed simultaneously. Additionally, in the object having the display size of 1×1, the user can set the type of white balance such as auto, preset (fine, cloudy, lamp, or the like), or color temperature designation but cannot change the setting value of the color temperature, as will be described later. On the other hand, in the display size of 2×1, when color temperature designation is selected, the color temperature can be set. The user can select a desired object for one selected item in consideration of the balance between the display size of the object and the information amount handled by the object.

As described above, when style selection processing starts, the system control unit 50 displays the style selection screen 920 as shown in FIG. 9B or 9C, and presents display styles selectable for the object corresponding to the selected setting item. Upon judging that a cursor moving instruction by the vertical operation of the cross key 74 is issued (step S802), the system control unit 50 moves the cursor 922 in the direction of the moving instruction (step S803). Note that the style display 923 shows all pieces of information displayable by the object of the display size. For example, the style display 923 of color temperature shown in FIG. 9C presents the displayable number of digits by displaying the maximum value of settable Kelvin values. Alternatively, for example, as shown in FIG. 29B, when displaying the style of an object 2931 of a light control compensation value, an item 2933 is displayed regardless of the presence/absence of an external flash. A light control compensation value 2934 shows a + or − sign together with its maximum value.

Upon judging that the SET button 75 is pressed (step S804), the system control unit 50 returns the screen to the editing screen described with reference to FIGS. 4A to 4C, and lays out the selected object at the position of the cursor 411 (step S805). The system control unit 50 then starts object layout processing of laying out and determining, on the setting screen, the object of the display size currently selected by the cursor 922 (step S806). Object layout processing will be described later with reference to the flowchart of FIG. 11. Upon detecting pressing of the MENU button 84 (step S807), the system control unit 50 makes a screen transition to return to the immediately preceding screen (step S808). Here, the screen returns to the screen before the transition to the style selection screen 920, that is, the setting item selection screen 900 (step S701). Upon judging that an end operation of style selection processing has occurred (step S809), the system control unit 50 ends the style selection processing. On the other hand, Upon judging that the end operation has not occurred, the process returns to step S802. For example, when the first shutter switch 62 of the shutter button 61 is turned on, the system control unit 50 ends the style selection processing. This processing is the same as that in a case in which step S615 described above results in a "YES".

Figure 9B:
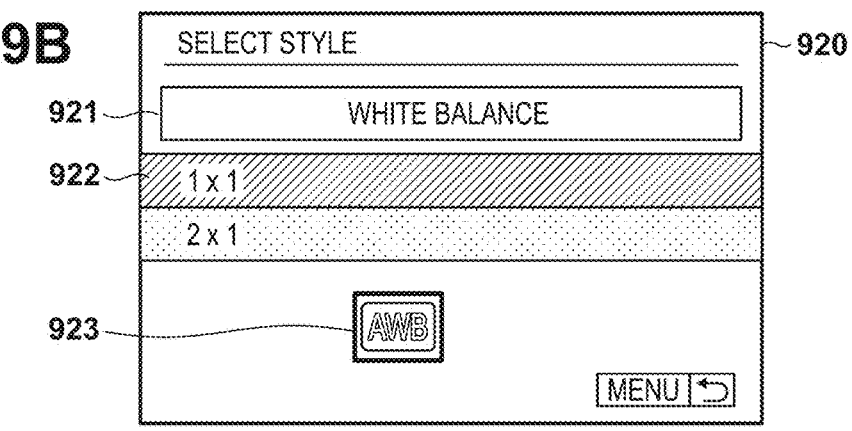
Figure 9C:
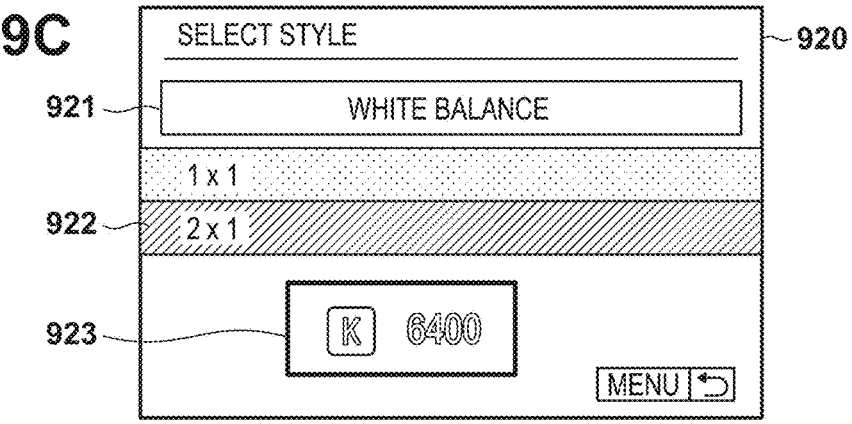
Figure 10A:
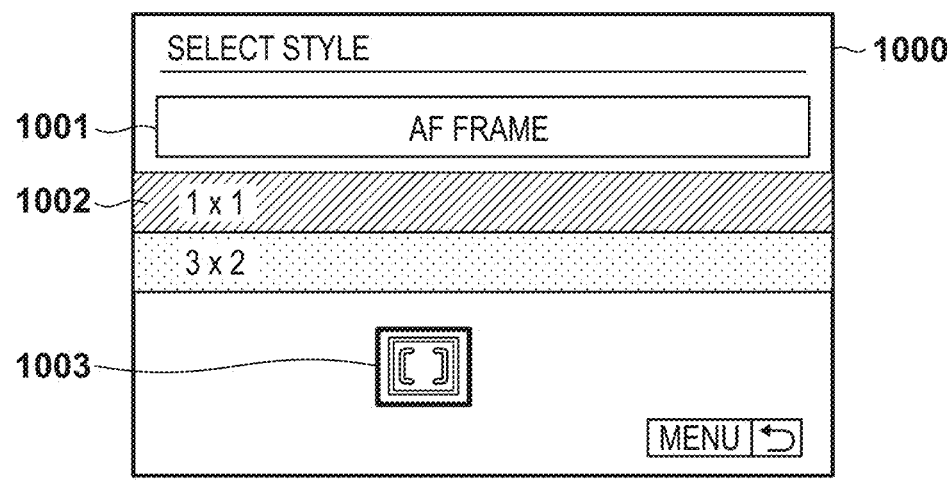
FIGS. 10A and 10B are views showing another example of the style selection screen.
Figure 10B:
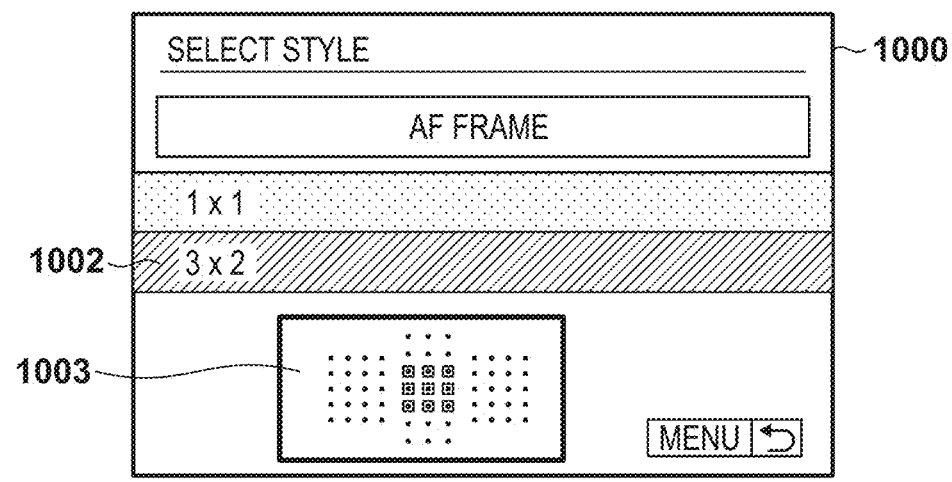

Concerning the style selection, another setting item will be described. FIGS. 10A and 10B are views showing an example of the style selection screen that is displayed when the setting item of AF frame (not illustrated in FIGS. 9A to 9C) is selected on the setting item selection screen 900. When the setting item is AF frame, the corresponding object has two display styles (sizes) "1×1" and "3×2". Referring to FIG. 10A, "AF frame" as the style selection target is displayed in a setting item name display 1001 of a style selection screen 1000. The user can select "1×1" or "3×2" as the display style of the AF frame by moving a cursor 1002. An object corresponding to the display size selected by the cursor 1002 is displayed in a style display 1003. FIG. 10A shows a state in which the cursor 1002 selects the display size "1×1".

When the cursor 1002 is moved to the display size "3×2", as shown in FIG. 10B, an example of the object corresponding to the display size "3×2" is displayed in the style display 1003. The information of the expressed setting value changes depending on the display size. That is, in the display size "1×1", an object representing a setting value by distance measuring area selection of an AF frame is displayed. In the display size "3×2", an object representing a setting value by distance measuring area selection and distance measuring point selection of an AF frame is displayed.

Object layout processing that is started and executed in step S612, S710, or S805 will be described next with reference to the flowchart of FIG. 11. In object layout processing, the user can move the object at the cursor position of the cursor 411 to an arbitrary position by the moving operation of the cursor 411, and lay out the object at the cursor position by pressing the SET button 75. When the object layout processing is activated from the above-described setting item selection processing or style selection processing, an object corresponding to the setting item selected on the setting item selection screen 900 and having the style selected on the style selection screen 920 or 1000 is laid out on the editing screen 400. The object is laid out at an arbitrary position by a user operation, as will be described later.

Figure 12A:
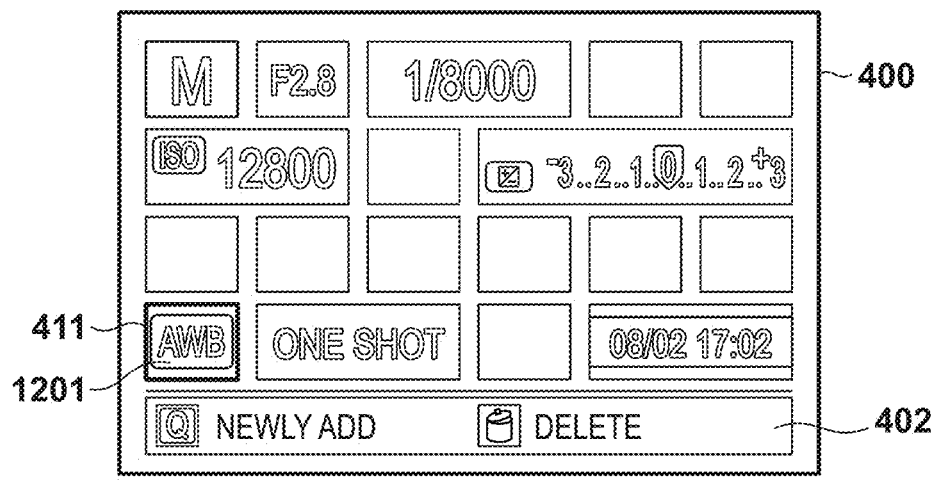
FIGS. 12A and 12B are views for explaining an operation example of object layout processing.
Figure 12B:
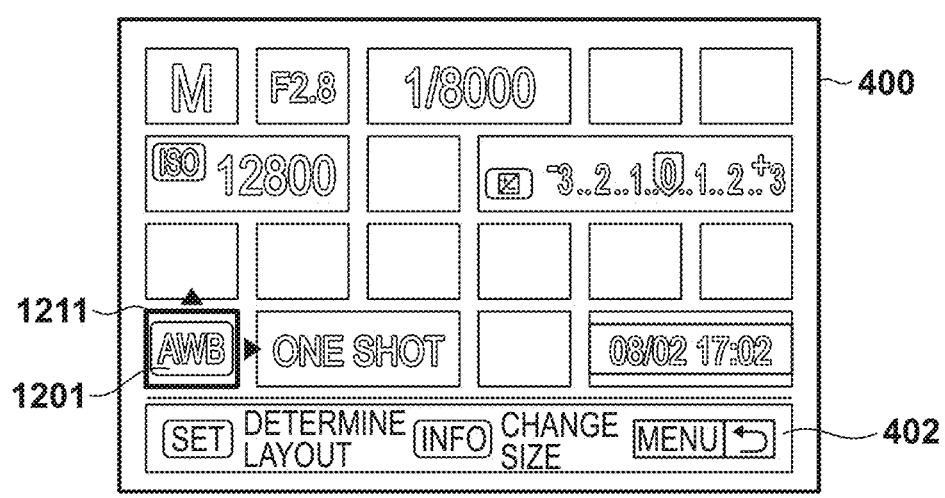

When object layout processing starts, the system control unit 50 sets the object at the position of the cursor 411 on the editing screen 400 in a held state (step S1101), and starts blinking the object in the held state (step S1102). For example, when the SET button 75 is pressed on the editing screen 400 in a state shown in FIG. 12A (steps S609 and S610), an object 1201 at the cursor position on the editing screen 400 is set in the held state. In this embodiment, to indicate the held state, a cursor 1211 having the indicators of movable directions is displayed, as shown in FIG. 12B. The held object is an operation target object of object layout processing.

In a case in which the cursor 411 is moved to the layout box at the lower left corner on the editing screen 400 shown in FIG. 4A, and the object having the display size of 1×1 corresponding to white balance is selected by setting item selection processing as well, the display shown in FIG. 12B is obtained. That is, when "white balance" is selected on the setting item selection screen 900 shown in FIG. 9A, the style "1×1" is selected on the style selection screen 920 shown in FIG. 9B, and the SET button 75 is pressed, the display shown in FIG. 12B is obtained. The display position of the new object is the position of the cursor 411 immediately before the start of setting item selection processing. That is, the object of the setting item selected on the setting item selection screen 900 automatically becomes the operation target object when the object layout processing is activated.

When the object is being held by the cursor 1211 indicating the held state, the system control unit 50 blinks the held object, and changes the display contents of the guidance area 402 as shown in FIG. 12B. The guidance area 402 shows that the layout is determined by the SET button 75 (steps S1112 and S1113), and style selection processing can be started by the INFO button 83 to change the size of the object (steps S1110 and S1111). Note that the cursor 1211 is a cursor frame holding an object. To explicitly indicate that the cursor is holding the object, the cursor has direction indicators to movable directions. The cursor 1211 may also blink at the same time as the blinking of the object.

In this embodiment, if there is an existing object that at least partially overlaps the display range of the object, the display form is changed (step S1103). In this embodiment, the display form is changed to gray display that displays the object in grayscale. When the object in the held state is blinked, and the overlapping existing object is displayed in gray, the object already laid out at the cursor position and its setting item and the object to be deleted by laying out the object in the held state can explicitly be shown to the user. That is, since the object to be newly laid out blinks, the object to be deleted is visible as a whole during the period in which the object to be newly laid out is not showing up. Such display allows the user to immediately grasp the object to be newly laid out and the object to be deleted accordingly. Note that the display form that makes both the object in the held state and the existing object visible is not limited to the above-described blinking. For example, the held object may be displayed in a semitransparent state, or a warning message may be displayed. As the display form to explicitly show the object to be deleted, an example in which the object is displayed in gray has been described. However, the present invention is not limited to this. Discrimination from the normal display state may be attained by, for example, lowering the display brightness.

Figure 13A:
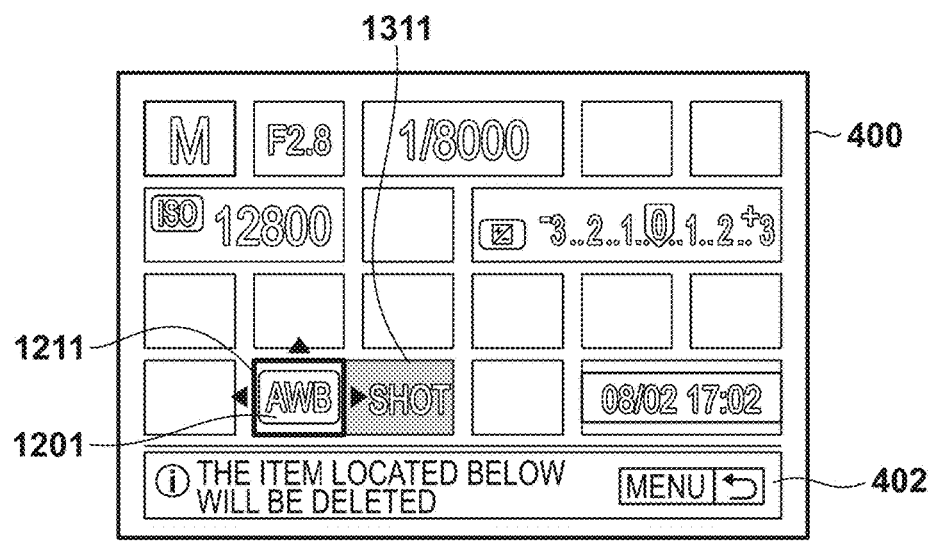
FIGS. 13A and 13B are views for explaining an operation example of object layout processing.

Upon detecting an instruction in the vertical and horizontal directions by the cross key 74 (step S1104), the system control unit 50 moves the cursor 1211 and the object held by it in the direction of the moving instruction (step S1105). That is, the moving instruction for the cursor also serves as the moving instruction for the operation target object. In the object layout processing, the cursor 1211 and the object are moved in accordance with the cursor moving instruction based on the layout box as a unit independently of the presence/absence of an existing object. For example, when an instruction to move rightward is detected in the display state shown in FIG. 12B, the cursor 1211 and the held object 1201 move rightward by one layout box, as shown in FIG. 13A. Note that the cursor moves based on the layout box as a unit on the editing screen. On the setting screen (for example, the setting screen 300 shown in FIGS. 3A to 3C), however, the cursor moves among the objects laid out on the screen.

Next, in a case in which another object is already laid out at the cursor position of the moved cursor 1211, if there is an existing object that at least partially overlaps the display range of the object, the system control unit 50 changes the display form (step S1106). This processing is the same as that in step S1103. As described above, in this embodiment, the system control unit 50 changes the existing object to gray display, and displays a warning message representing that in the guidance area 402. When the object in the held state moves, and the existing object wholly falls outside the display range of the object in the held state, the display form of the object is returned from the changed state (gray display) to the original state (step S1107). As described above, the cursor 1211 and the object held by it blink, and the display form of the already assigned object is changed. When the held object is not showing up, the object that exists under it is visible. For this reason, the user can immediately recognize whether an overlapping object exists at the moving destination, and if so, the contents of the setting item and the object (setting item) to be deleted by laying out the new object.

For example, in the example of FIG. 13A, when the cursor 1211 is moved, an object 1311 corresponding to another setting item ONE SHOT" exists within the display range of the object 1201. Hence, the existing object 1311 is displayed in gray, and a warning message "the item located below will be deleted" is displayed in the guidance area 402. Since the held object 1201 blinks, the user can observe the entire existing object 1311 during the period in which the object 1201 is not showing up. Note that when the cursor 1211 moves leftward from the state shown in FIG. 13A, the state shown in FIG. 12B is obtained. The system control unit 50 returns the display of the object 1311 that has wholly fallen outside the display range of the object 1201 from gray display to normal display.

Upon detecting pressing of the MENU button 84 (step S1108), the system control unit 50 makes a screen transition to return to the immediately preceding screen (step S1109). For example, if the object layout processing has started from the editing screen 400 (step S612 of FIG. 6), the screen returns to the editing screen 400 according to the pressing of the MENU button 84. Alternatively, if the transition to the object layout screen has occurred from the setting item selection screen or the style selection screen (step S710 of FIG. 7 or step S805 of FIG. 8), the screen returns to the setting item selection screen 900 or the style selection screen 920 or 1000.

Figure 8:
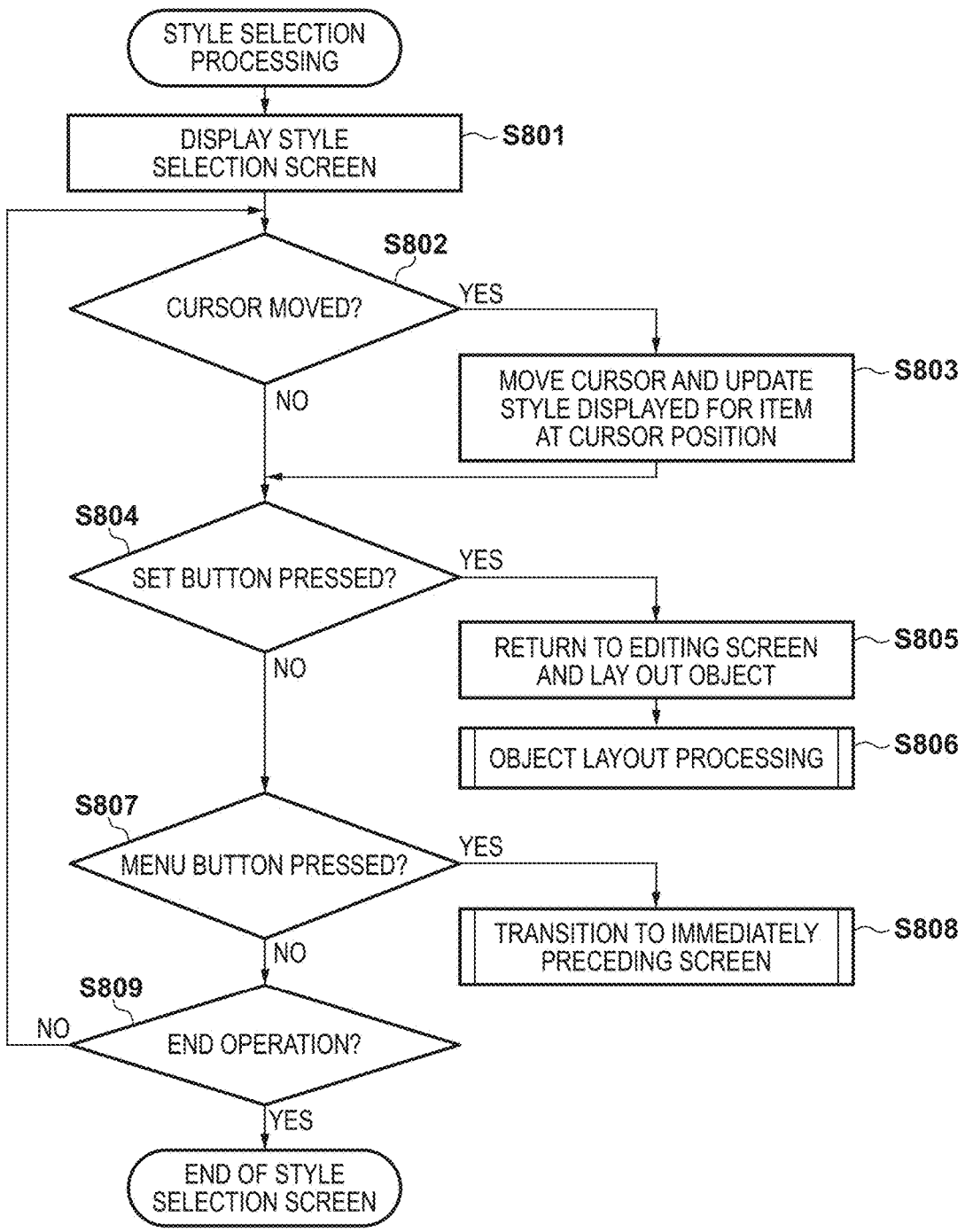
FIG. 8 is a flowchart showing style selection processing by the customization setting function.
Figure 13B:
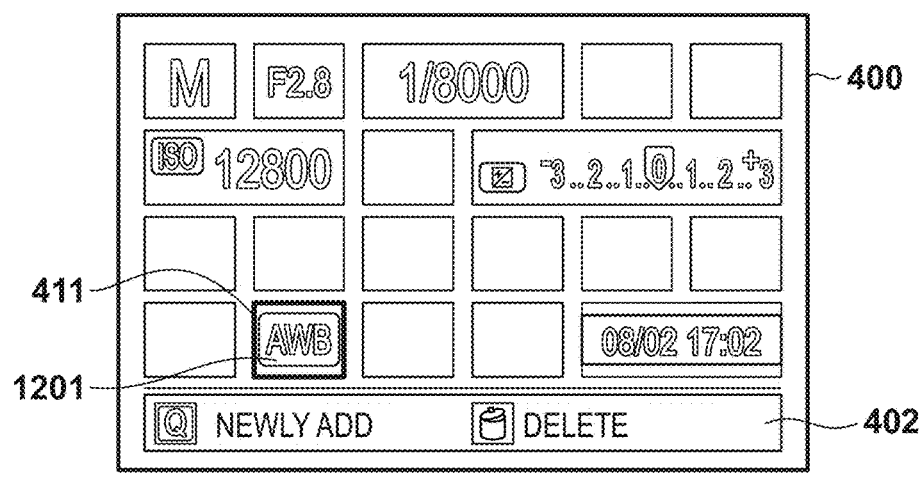

Upon detecting pressing of the INFO button 83 (step S1110), the system control unit 50 makes a screen transition to the style selection screen 920 or 1000 and resumes style selection processing shown in FIG. 8 (step S1111). In this case, the setting item that should undergo the style selection processing is the setting item corresponding to the object currently held by the cursor. For example, when the INFO button 83 is pressed in the state shown in FIG. 12B, the style selection screen 920 (FIG. 9B) for white balance is displayed. Upon detecting pressing of the SET button 75 (step S1112), the system control unit 50 starts processing (layout determination processing) of determining the layout of the selected setting item at the current cursor position (step S1113). That is, the pressing of the SET button 75 is a determination instruction to determine the layout of the held object. Layout determination processing will be described later with reference to FIG. 14. For example, assume that the SET button 75 is pressed in the state shown in FIG. 13A to execute layout determination processing. In this case, the system control unit 50 determines the layout of the object 1201 held by the cursor 1211 at the current cursor position, and returns the cursor to the cursor 411 without direction indicators, as shown in FIG. 13B. In addition, the existing object 1311 laid out while at least partially overlapping the object 1201 newly laid out is deleted from the screen.

Upon detecting an end operation of object layout processing, the system control unit 50 ends the processing (step S1114). If the end operation is not detected, the process returns to step S1104. For example, when the first shutter switch 62 of the shutter button 61 is turned on, the system control unit 50 ends the object layout processing.

Figure 14:
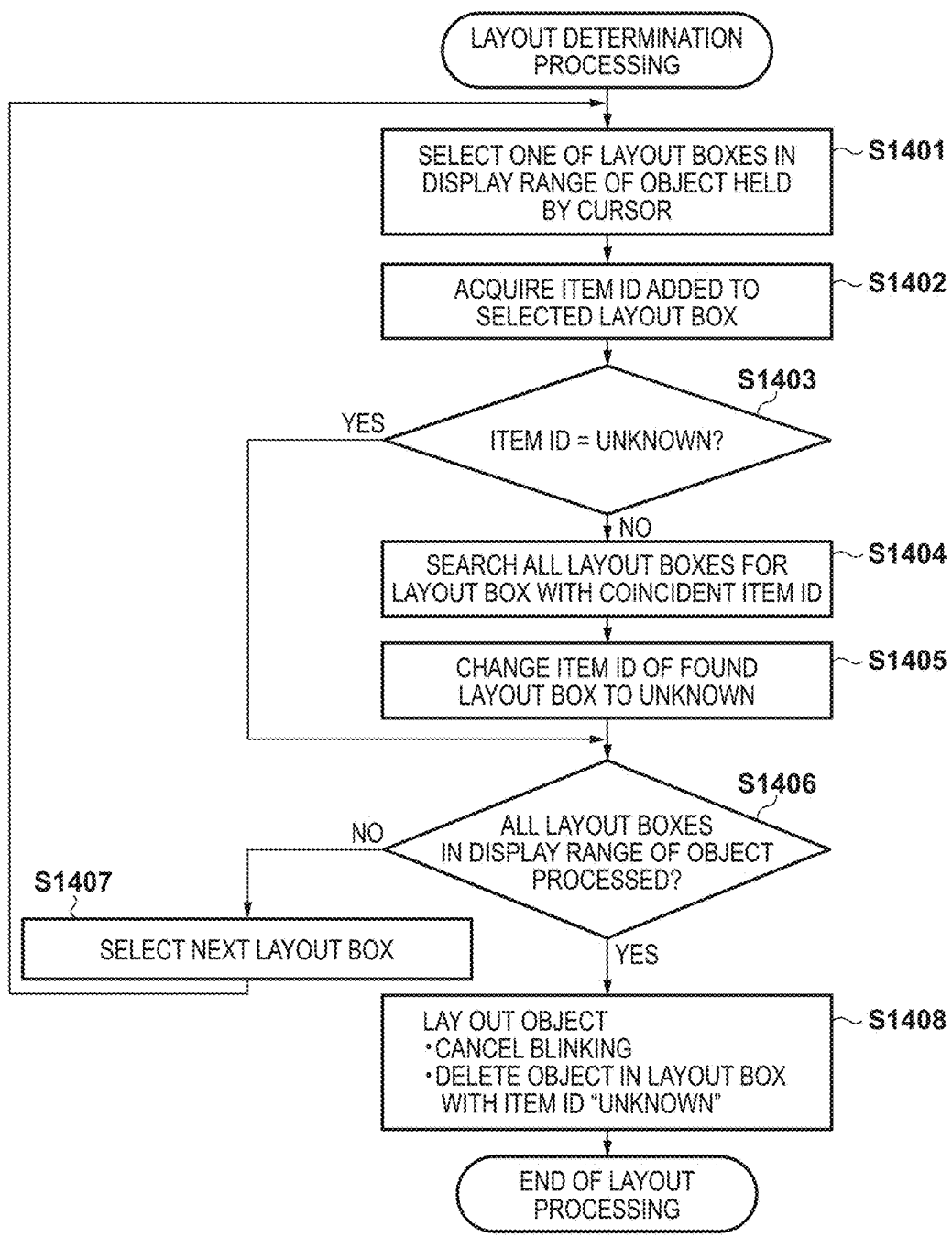
FIG. 14 is a flowchart showing layout determination processing by the customization setting function.

Layout determination processing according to this embodiment will be described next with reference to the flowchart of FIG. 14. In layout determination processing, the object currently held by the cursor 1211 is laid out in the layout box corresponding to the current position of the cursor 1211, and the display position is determined. At this time, as described above, if there is an existing object laid out in the layout box included in the display range of the layout destination of the object, the existing object is overwritten with the new setting item and deleted.

When layout determination processing starts, the system control unit 50 selects one of layout boxes within the display range used by the object currently held by the cursor 1211 (step S1401). In the examples shown in FIGS. 12B and 13A, the display size of the object held by the cursor 1211 is one layout box (1×1), and only one layout box exists in the display range of the object. On the other hand, for an object that uses, for example, 3×1 layout boxes as the display size, three layout boxes exist in the display range of the object.

Figure 15A:
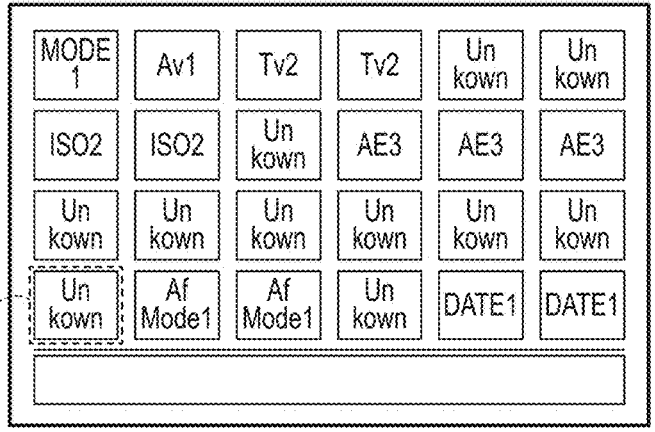
FIGS. 15A, 15B, and 15C are views showing item IDs added to the layout boxes of the editing screen.

Next, to judge whether the selected layout box is used by an existing object, the system control unit 50 acquires the item ID of the layout box from the nonvolatile memory 56 (step S1402). For example, when the objects are laid out as shown in FIG. 12B, an item ID for identifying the setting item of an object laid out is added to each layout box, as shown in FIG. 15A. An item ID "Unknown" is added to a layout box without an object. In FIG. 12B, the cursor 1211 that holds the object 1201 of white balance is located on the layout box at the lower left corner. In FIG. 15A, a display range 1501 is indicated by a broken rectangle.

The system control unit 50 judges whether the item ID of the selected layout box is "Unknown" (step S1403). If the item ID is "Unknown", the system control unit 50 judges whether an unprocessed layout box exists in the display range to be used by the object (the object to be newly laid out) held in the cursor frame (step S1406). If an unprocessed layout box exists, the system control unit 50 selects the next layout box as the processing target (step S1407), and returns the process to step S1402. On the other hand, if the processing has ended for all layout boxes to be used by the setting item to be newly laid out, the system control unit 50 lays out the currently held object at the current cursor position (step S1408). At this time, the system control unit 50 adds an item ID for identifying the setting item (and display style) of the object to each layout box in the display range of the object, and records the item ID in the nonvolatile memory 56. The system control unit 50 then cancels blinking of the object laid out, and deletes the object laid out in the layout boxes with the item ID "Unknown". In this way, an object of a type arbitrarily selected by the user is laid out (located) at a position selected by the user in a size set by the user.

In the example of FIG. 15A, one layout box is included in the display range of the object to be newly laid out, and the item ID of the layout box is "Unknown". Hence, when the SET button 75 is pressed in the state shown in FIG. 12A, "WB1" representing white balance with a display size of 1×1 is immediately added as an item ID to the layout box at the lower left corner, and the layout of the object 1201 is determined. As a result, a setting screen as shown in FIG. 3C is obtained.

Figure 15B:
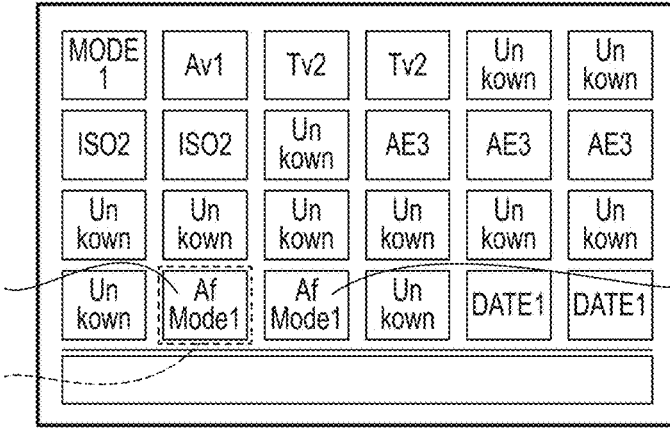

On the other hand, in a case in which the cursor frame is moved to the position shown in FIG. 13A, and the SET button 75 is pressed in this state, a layout box 1511 with an item ID representing AF mode already exists in the display range 1501 of the object to be newly laid out, as shown in FIG. 15B. If the item ID acquired in step S1402 is not "Unknown" (NO in step S1403), the system control unit 50 searches all layout boxes in the editing screen for layout boxes with the item ID acquired in step S1402 (step S1404). The system control unit 50 changes the item ID of the found layout boxes to "Unknown" (step S1405). For example, in the case of FIG. 15B, since an item ID "Af Model" is acquired (step S1402), the system control unit 50 searches all layout boxes for layout boxes with the item ID "Af Model". The system control unit 50 then changes the item ID of the found layout boxes to "Unknown". As a result, the item ID of the layout boxes 1511 and 1512 with the item ID "Af Model" is changed to "Unknown".

Figure 15C:
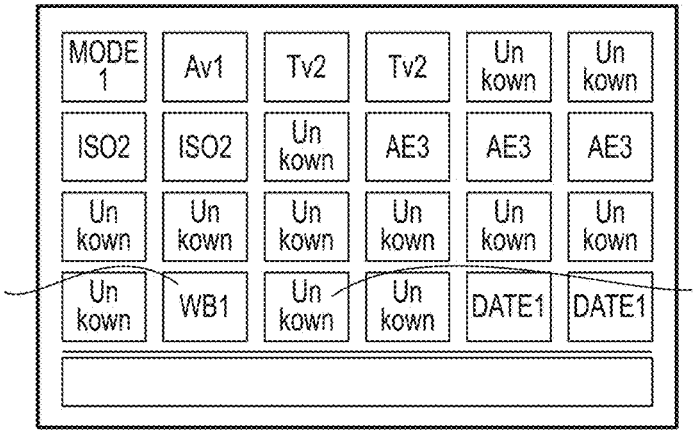

When the above-described processing is executed for all layout boxes within the display range of the object to be newly laid out, the process advances from step S1406 to step S1408, and the system control unit 50 lays out the currently held object at the current cursor position and adds an item ID. In the case of FIG. 15B, the item ID of the layout boxes 1511 and 1512 is first changed to "Unknown" (step S1405). After that, an item ID "WB1" is added to the layout box 1511 (step S1408). As a result, the item IDs are added to the layout boxes 1511 and 1512, as shown in FIG. 15C, and the layout is completed as shown in FIG. 13B. Note that each layout box with the item ID "Unknown" is released from the state with the object being laid out, and display of the object is deleted. In this way, when newly laying out an object, all existing objects that are going to share at least some of layout boxes to be used by the object to be newly laid out are deleted.

Concerning layout processing, a case in which the display size of the setting item to be newly laid out is 1×1 layout box has been described above with reference to the flowchart of FIG. 14. For a better understanding of the layout determination processing according to this embodiment, a case in which the layout of area/date/time display that is a setting item having a display size of 4×2 layout boxes is determined will be described with reference to FIGS. 16A, 16B, 17A, and 17B.

Figure 16A:
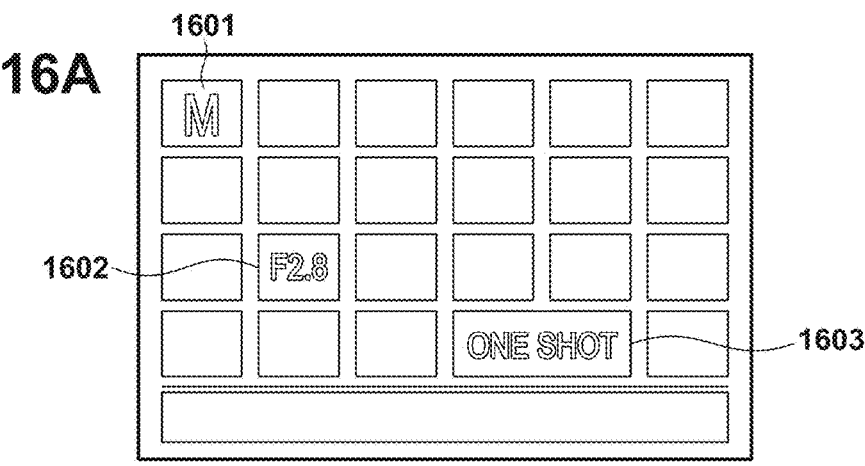
FIGS. 16A, 16B, and 16C are views for explaining another operation example of object layout processing.
Figure 16B:
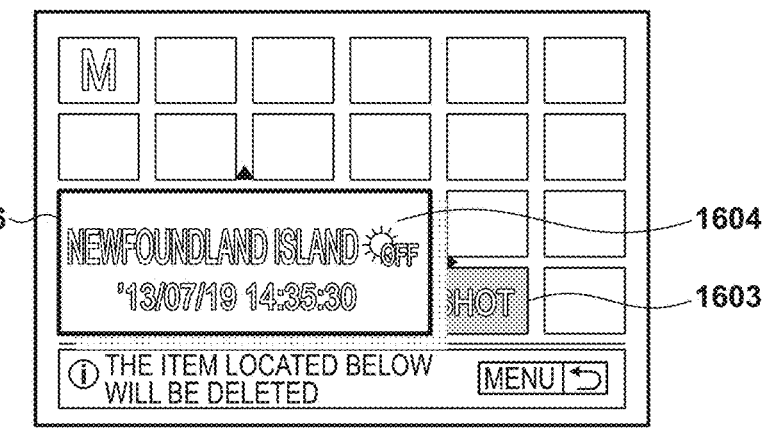

FIGS. 16A and 16B show examples of display on the display unit 28 when the items of f-number and AF operation are already laid out and overwritten with area/date/time display. FIG. 16A shows the layout states of objects already laid out on the screen of object layout processing. An object 1601 corresponds to the setting item of the shooting mode of the camera, an object 1602 corresponds to the setting item of the f-number, and an object 1603 corresponds to the setting item of AF operation.

FIG. 16B shows a display example in a state in which to newly lay out an object 1604 of area/date/time display, the layout position of the object 1604 is set in the object layout shown in FIG. 16A. In FIG. 16B, the object 1602 of f-number and the object 1603 of AF operation overlap the display range of the object 1604 to be newly laid out. That is, display of the existing object 1603 (AF operation) partially overlaps the object 1604, and the existing object 1602 (f-number) wholly overlaps the object 1604. Note that a cursor 1606 has direction indicators representing that it is holding the object 1604.

Figure 16C:
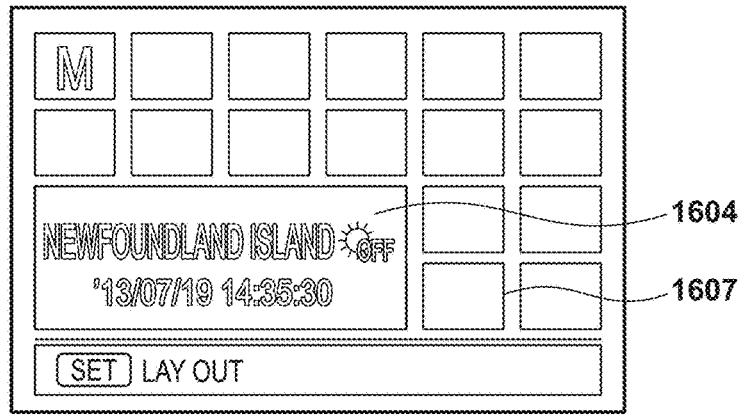

FIG. 16C shows a state after the object 1604 (area/date/time display) is laid out in the layout of setting items shown in FIG. 16A. FIG. 16C shows a state in which layout of the object 1604 is completed, and the cursor 1606 is deleted. In addition, when the object 1604 is laid out, display of the object 1603 (AF operation) is deleted, and a layout box 1607 is displayed.

FIGS. 17A to 17C are views in which item IDs representing the setting items of the objects laid out in the layout boxes are associated with the layout states of the objects shown in FIGS. 16A to 16C. FIG. 17A shows the item IDs of the layout boxes in the state shown in FIG. 16A. A display range 1701 of the object 1604 to be newly laid out indicates the overwrite range of the object 1604 to be newly laid out. In this example, the display size of the object 1604 is 4×2, and 4×2 layout boxes are included in the display range 1701.

In accordance with pressing of the SET button 75, the system control unit 50 selects one of the layout boxes (4×2 layout boxes) included in the display range 1701 (step S1401), and acquires the item ID (steps S1401 and S1402). For example, a layout box 1711 is selected. Since the item ID is "Unknown", the next layout box is immediately selected as the processing target (steps S1403, S1406, and S1407).

When a layout box 1712 is selected as the processing target in step S1401, "Av1" is acquired as the item ID. Hence, layout boxes with the item ID "Av1" are searched from all layout boxes in the editing screen, and the item ID of the found layout boxes is changed to "Unknown" (steps S1403, S1404, and S1405). In the example of FIG. 17A, the item ID of the layout box 1712 having the item ID "Av1" is changed to "Unknown".

When a layout box 1713 is selected as the processing target in step S1401, "Af Model" is acquired as the item ID. Hence, layout boxes with the item ID "Af Model" are searched from all layout boxes in the editing screen, and the item ID of the layout boxes is changed to "Unknown" (steps S1403, S1404, and S1405). In the illustrated example, the item ID of the layout boxes 1713 and 1714 is changed to "Unknown". Display of the objects 1602 and 1603 whose layout boxes are changed to "Unknown" are deleted.

When the above-described processing has ended for all layout boxes within the display range 1701 where overwrite is performed (step S1406), a state in which the item IDs are added to the layout boxes as shown in FIG. 17B is obtained. With the above-described processing, the item IDs of the layout boxes 1712 to 1714 are changed to "Unknown". After that, the system control unit 50 adds "Area Date1" that is the item ID of the object 1604 (area/date/time display) to all layout boxes within the display range 1701, and determines the layout of the object 1604. The system control unit 50 then cancels the blinking state of the object 1604, and completes overwrite and deletion (step S1408).

With the above-described processing, the item (FIG. 17B) that is the rest of display of the existing object 1603 can also be deleted as a deletion target by overwrite (FIG. 17C). That is, even if the user arbitrarily sets the size and layout position of an object already laid out and the size and layout position of an object to be additionally laid out, overwrite processing by the object to be additionally laid out can be performed without leaving unnecessary display.

Note that in the above-described processing, an existing object is overwritten with an object to be newly laid out and thus deleted. However, a specific object may be prohibited from being overwritten. For example, the shutter speed or exposure value may be set in advance as a specific object prohibited from being overwritten. Alternatively, the user may give an attribute to prohibit overwrite to a desired setting item and set a corresponding object as a specific object prohibited from being overwritten. The cursor that holds an object and moves may skip a layout box used by an object prohibited from being overwritten so the display range of the layout target object and that of the object prohibited from being overwritten do not overlap. This prohibits the operation target object from moving to a position where the specific object is overwritten and deleted. Otherwise, if the layout target object has moved to a position where the display range of the operation target object at least partially overlaps the display range of an object prohibited from being overwritten, a warning message for notifying that the layout cannot be determined may be displayed to prohibit layout determination processing from being executed.

Figure 18:
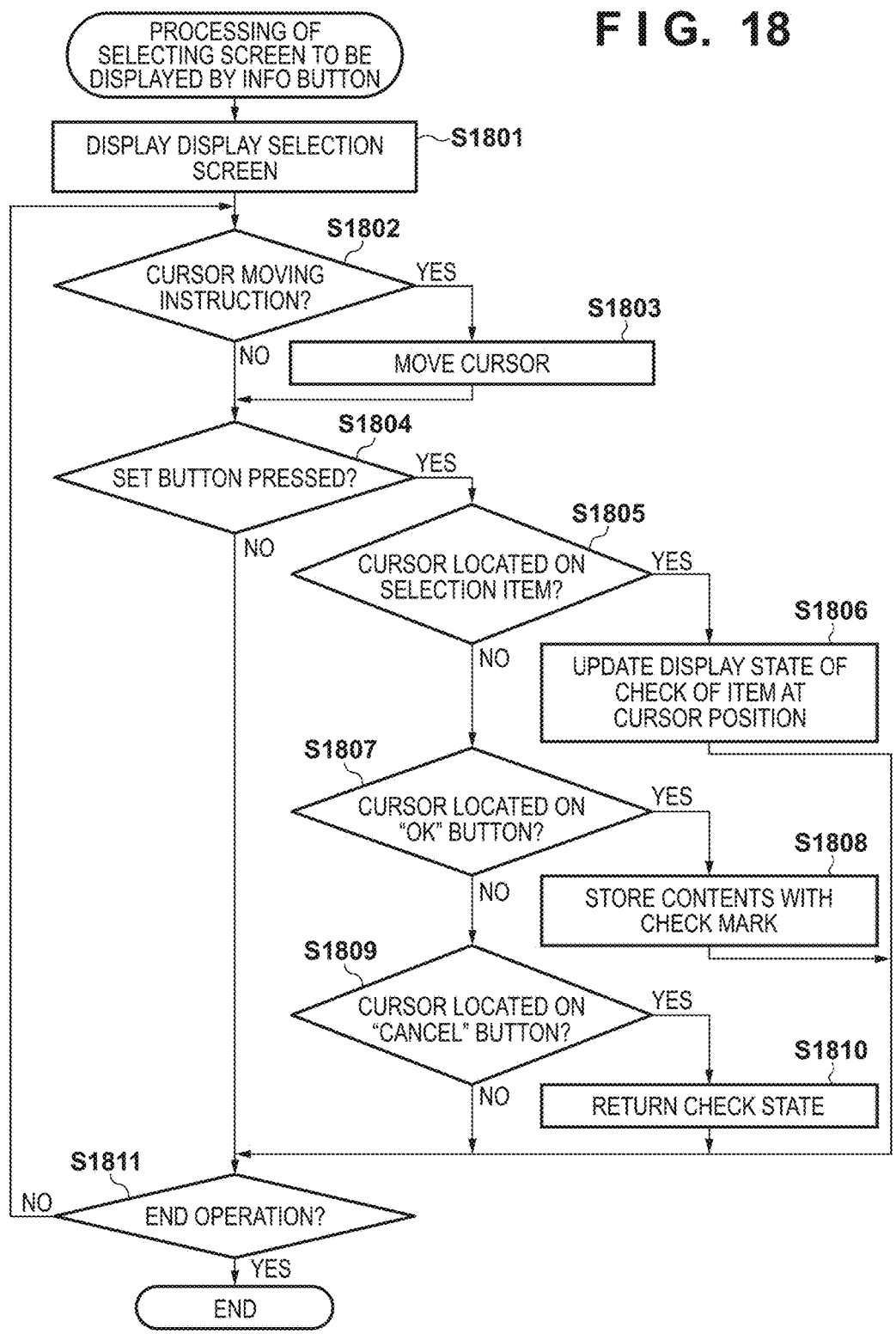
FIG. 18 is a flowchart showing selection processing of a screen to be displayed by an INFO button.

Processing of causing the user to set screens (including an existing shooting setting screen and the customizable setting screen 300) to be displayed upon screen display switching by the INFO button 83 will be described next with reference to the flowchart of FIG. 18. On the digital camera 100 according to this embodiment, when the INFO button 83 is pressed in the shooting standby state, the screen displayed on the display unit 28 is switched by each pressing operation. Using a display selection screen 1900 shown in FIG. 19, the user can select a screen to be included in the group of screens that are switched by operating the INFO button 83.

Figure 19:
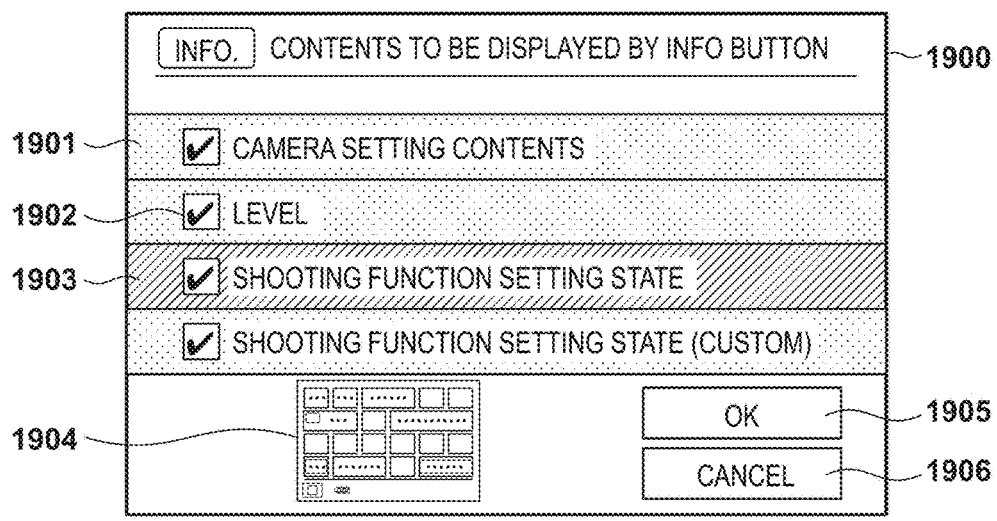
FIG. 19 is a view showing an example of a screen used to do display selection in screen selection processing.

In accordance with pressing of the MENU button 84, the system control unit 50 displays the menu screen 500 as shown in FIG. 5A on the display unit 28. When the user selects a menu item "contents to be displayed by the [INFO] button" by the cursor 511 on the menu screen 500, and presses the SET button 75 in this state, the system control unit 50 displays the display selection screen 1900 as shown in FIG. 19 (step S1801). By the display selection screen 1900, the user can select screens to be sequentially displayed on the display unit 28 by operating the INFO button 83.

As described above, the display selection screen 1900 shown in FIG. 19 is a screen that causes the user to select and set a screen that is switched and displayed every time the INFO button 83 is pressed in the shooting standby state. A selection item 1901 is an item representing one of screens displayable in the shooting standby state. The display screens displayable in the shooting standby state are camera setting content screen: a screen for displaying the setting contents of the camera level display screen: a screen for displaying a level shooting function setting screen: a shooting setting screen capable of displaying and changing the setting state of the shooting function shooting function setting screen (custom): a shooting setting screen (for example, the setting screen 300 shown in FIGS. 3A to 3C) capable of customizing setting items to be displayed and their display styles.

Referring to FIG. 19, a checkbox 1902 is provided for each selection item 1901, and indicates the selected state or unselected state of a corresponding item by the presence/absence of a check mark. A cursor 1903 moves in the vertical direction when the user operates the cross key 74 in the vertical direction. When the SET button 75 is pressed, the selection item 1901 at the cursor position of the cursor 1903 is switched between the selected state and the unselected state. A check mark is added to the checkbox 1902 corresponding to a selection item in the selected state. That is, the user can move the cursor 1903 to desired display and press the SET button 75, thereby adding a check mark to the corresponding checkbox. The screen indicated by the selection item with the check mark in the checkbox can be displayed by pressing the INFO button 83 to switch display in the shooting standby state. A screen example display 1904 displays the outline of the screen corresponding to the selection item at the position of the cursor 1903.

Upon receiving a cursor moving instruction by the vertical operation of the cross key 74 (step S1802), the system control unit 50 moves the cursor 1903 in the direction of the cursor moving instruction (step S1803). The cursor 1903 moves to each selection item 1901, an OK button 1905, and a cancel button 1906 in accordance with the cursor moving instruction.

Upon detecting pressing of the SET button 75 (step S1804), the system control unit 50 judges whether the cursor 1903 is located on one of the selection items (step S1805). If the cursor is located on a selection item, the display state of the check mark in the checkbox of the selection item is updated (an item without a check mark is updated to a checked state, and an item with a check mark is updated to an unchecked state) (step S1806). On the other hand, if the cursor 1903 is not located on a selection item, the system control unit 50 judges whether the cursor is located on the OK button 1905 (step S1807). If the cursor is located on the OK button 1905, the system control unit 50 stores the selection item whose checkbox 1902 has a check mark (that is, a selection item in the checked state) in the nonvolatile memory 56 as a selected screen (step S1808).

If the cursor 1903 is located on the cancel button 1906 (step S1809), the system control unit 50 updates the check state of the checkbox based on the contents stored in the nonvolatile memory 56 (step S1810). Hence, the user can place the cursor on the cancel button 1906 and press the SET button 75, thereby returning the check state of the checkbox 1902 to the state stored in the nonvolatile memory 56 latest.

For example, upon detecting ON of the first shutter switch 62 of the shutter button 61, the system control unit 50 judges that an instruction to end the display selection screen is issued (step S1811), returns the display on the display unit 28 to the menu screen 500 shown in FIG. 5A, and ends the processing. If the instruction to end the processing is not issued, the process returns to step S1802. Note that when the cursor is located on the OK button 1905, and the SET button 75 is pressed in this state, the processing may end after reflecting the check state of the checkbox. When the cursor is located on the cancel button 1906, and the SET button 75 is pressed in this state, the processing may end after returning the check state of the checkbox to the state before the start of the processing.

Figure 20:
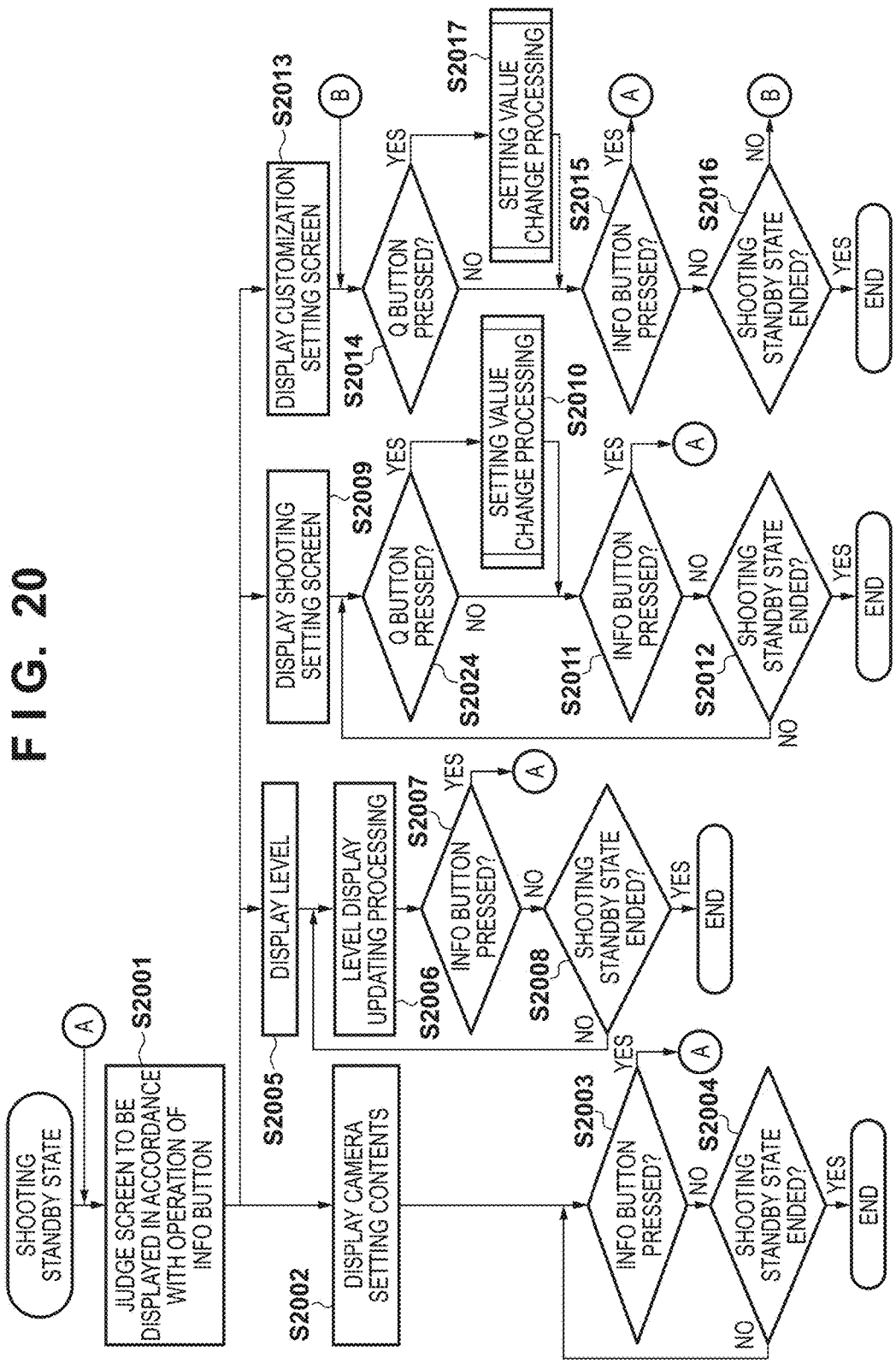
FIG. 20 is a flowchart for explaining screen display switching by the INFO button and the operation in each screen.

Screen switching in the shooting standby state and the operation on each screen will be described next with reference to the flowchart of FIG. 20. Screen switching is done between display screens selected by adding a check mark to a checkbox on the above-described display selection screen 1900 (FIG. 19) every time the INFO button 83 is pressed.

When the shooting standby state starts, in accordance with pressing of the INFO button 83, the system control unit 50 switches display to one of the display screens that are selected on the above-described display selection screen 1900 and stored in the nonvolatile memory 56 (step S2001). In this embodiment, the system control unit 50 displays a display screen selected from those displayed on the display selection screen 1900 as the choices of display screens in the shooting standby state in accordance with pressing of the INFO button 83 as a toggle. Display screens selectable on the display selection screen 1900 are the camera setting content screen, the level display screen, the shooting setting screen, and the shooting function screen (customized). Any screen other than these screens may be selectable as the switching display target of the INFO button 83, as a matter of course.

Upon judging to display the camera setting content screen in accordance with pressing of the INFO button 83 (step S2001), the system control unit 50 forms the display screen by referring to the setting values of the device to be displayed on the camera setting content screen and the screen composition in the nonvolatile memory 56 and displays the screen (step S2002). This screen is a screen corresponding to "contents of camera settings" on the display selection screen 1900. After that, the system control unit 50 judges whether the INFO button 83 is pressed (step S2003). Upon judging that the INFO button 83 is pressed, the process returns to step S2001 to judge the screen to be displayed next. If the INFO button 83 is not pressed, the system control unit 50 judges whether the shooting standby state has ended (step S2004). If the shooting standby state continues, the process returns to step S2003. On the other hand, if the shooting standby state has ended, the system control unit 50 ends the processing and makes a transition to another state of the device such as a photometry state, a shooting start state, a MENU display state, a screen reproduction state, or a power-off state (step S2004). For example, the end of the shooting standby state is instructed by turning on the first shutter switch 62, and the digital camera 100 shifts to the shooting start state. Alternatively, for example, when the MENU button 84 is turned on, the digital camera 100 ends the shooting standby state, and shifts to the MENU display state.

Upon judging to display the level screen in accordance with pressing of the INFO button 83 (step S2001), the system control unit 50 displays the level screen on the display unit 28 (step S2005). That is, the system control unit 50 acquires level data of the level of the device from the posture detection unit 55, forms the display screen by acquiring information for screen composition from the nonvolatile memory 56, and displays it on the display unit 28. This screen is a screen corresponding to "level" on the display selection screen 1900. After the level screen is displayed, the system control unit 50 periodically acquires level data from the posture detection unit 55 and updates the level display (step S2006). Upon judging that the INFO button 83 is pressed, the system control unit 50 returns the process to step S2001 to judge the screen to be displayed next (step S2007). If the INFO button 83 is not pressed, the system control unit 50 judges whether the shooting standby state has ended (step S2008). If the shooting standby state continues, the system control unit 50 returns the process to step S2006. Upon judging that the shooting standby state has ended, the system control unit 50 ends the shooting standby state and makes a transition to another state. Note that the processes of steps S2007 and S2008 are the same as in steps S2003 and S2004.

Upon judging to display the shooting setting screen in accordance with pressing of the INFO button 83 (step S2001), the system control unit 50 forms the display screen by referring to the setting values of the device to be displayed on the shooting setting screen and the screen composition in the nonvolatile memory 56 and displays the screen on the display unit (step S2009). This screen is a screen corresponding to "setting state of shooting function" on the display selection screen 1900. On the shooting setting screen, the setting values of the device at the time of shooting are displayed by referring to the nonvolatile memory 56. When the setting screen display processing is completed, the system control unit 50 judges whether the Q button 81 is pressed (step S2024). Upon judging that the Q button is pressed, the system control unit 50 starts setting value change processing of enabling to change a setting value using the screen corresponding to "setting state of shooting function" (step S2010). In setting value change processing, a setting value displayed on the shooting setting screen is changed in accordance with an instruction to the operation unit 70, and the changed setting value is saved in the nonvolatile memory 56 (step S2010). The setting value change processing will be described later with reference to the flowchart of FIG. 21. The shooting setting screen is a screen on which objects for shooting settings are laid out in the same form as the customizable setting screen as shown in FIGS. 3A to 3C. On the shooting setting screen, however, the setting items to be displayed and the sizes and positions of the objects are determined in advance and cannot be edited (customized).

The system control unit 50 judges whether the INFO button 83 is pressed (step S2011). Upon judging that the INFO button 83 is pressed, the process returns to step S2001 to judge the screen to be displayed next. If the INFO button 83 is not pressed, the system control unit 50 judges whether the shooting standby state has ended (step S2012). If the shooting standby state continues, the process returns to step S2024. Upon judging that the shooting standby state has ended, the shooting standby state is ended to transition to another state. The processes of steps S2011 and S2012 are the same as in steps S2003 and S2004.

Figure 22A:
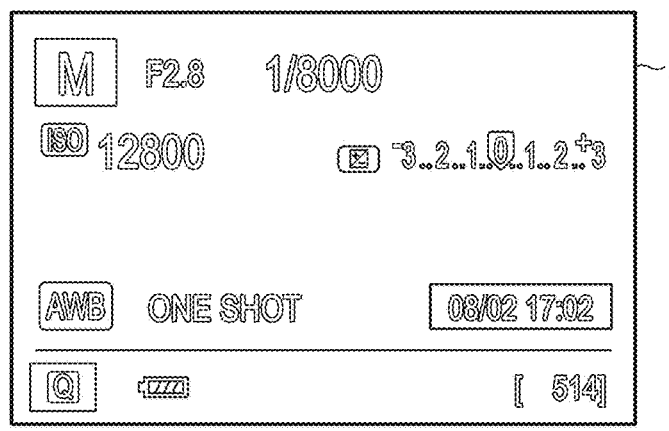
FIGS. 22A, 22B, and 22C are views showing examples of a setting screen and a setting change screen.

Upon judging in step S2001 to display the shooting setting screen (customized), the system control unit 50 acquires the screen composition of the customizable shooting setting screen and the setting values of the device from the nonvolatile memory 56, forms the display screen, and displays it on the display unit 28 (step S2013). This screen is a screen corresponding to "setting state (custom) of shooting function" on the display selection screen 1900. The screen displayed here is a customizable setting screen as described with reference to FIGS. 3A to 3C. The operation and processing on the setting screen will be described with reference to FIGS. 22A to 22C. FIG. 22A shows an example of a setting screen 2200 layout-edited by the customization setting function and displayed in step S2013. As described above, objects that form the customizable setting screen 2200 can arbitrarily be changed by the user. The user can also select the style used to display the objects of the setting items.

When the setting screen display processing is completed, the system control unit 50 judges whether the Q button 81 is pressed (step S2014). Upon judging that the Q button is pressed, the system control unit 50 starts setting value change processing of allowing the user to change a setting value using the setting screen 2200 (step S2017). Setting value change processing will be described later with reference to the flowchart of FIG. 21 and FIGS. 22B and 22C.

If pressing of the Q button is not detected in step S2014, the system control unit 50 judges whether the INFO button 83 is pressed (step S2015). Upon judging that the INFO button 83 is pressed, the process returns to step S2001 to judge the screen to be displayed next. If the INFO button 83 is not pressed, the system control unit 50 judges whether the shooting standby state has ended (step S2016). If the shooting standby state continues, the system control unit 50 returns the process to step S2014. Upon judging that the shooting standby state has ended, the shooting standby state is ended to transition to another state. Note that the processes of steps S2015 and S2016 are the same as in steps S2003 and S2004.

Figure 21:
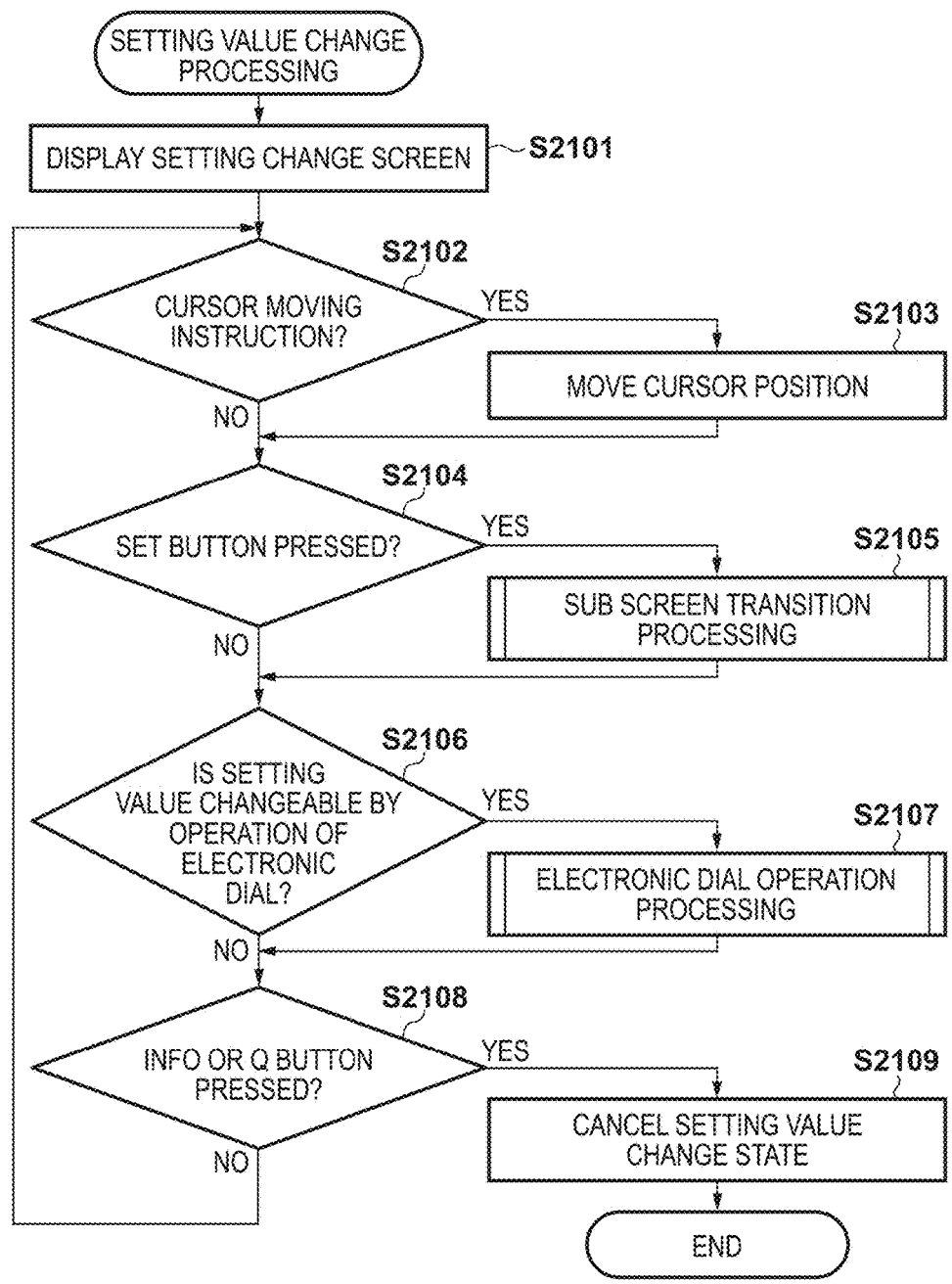
FIG. 21 is a flowchart for explaining setting value change processing using a setting screen.
Figure 22B:
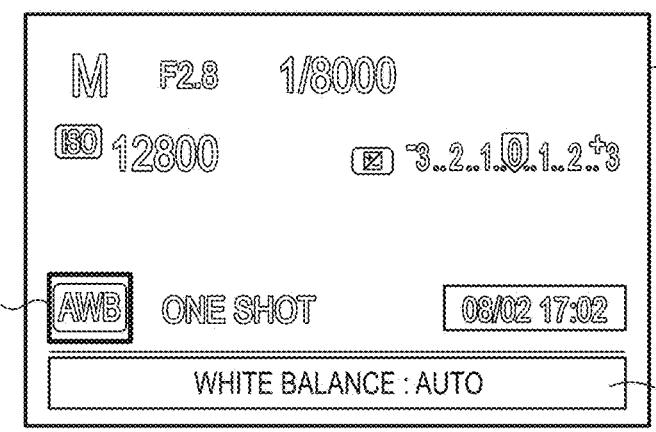

Setting value change processing in step S2017 will be described next. FIG. 21 is a flowchart for explaining setting value change processing. First, the system control unit 50 changes display of the setting screen 2200 to display of a screen (a setting change screen 2210 shown in FIG. 22B) that explicitly shows that the setting value of a setting item can be changed (step S2101). In this embodiment, as display representing that a setting value can be changed, as shown in FIG. 22B, a cursor 2211 used to designate a setting item as a setting change target is displayed, and the item name is displayed in a guidance area 2212. Note that not only the name but also the setting state of the setting item may be displayed in the guidance area 2212. For example, in the guidance area 2212, display representing that the setting state is "auto" is done in the guidance area 2212 shown in FIG. 22B in addition to the setting item name "white balance".

Next, the system control unit 50 judges whether a cursor moving instruction is issued (step S2102). Upon judging that a cursor moving instruction is issued, the system control unit 50 moves the cursor 2211 on the screen in the designated direction (step S2103). The cursor 2211 moves based on the above-described display size of each object as a unit, and skips a layout box without an object.

The system control unit 50 judges whether the SET button 75 is pressed (step S2104). Upon judging that the SET button 75 is pressed, the system control unit 50 executes sub screen transition processing (step S2105). On the sub screen, advanced settings can be done for the setting item of an object selected by the cursor 2211. Sub screen transition processing will be described later with reference to the flowchart of FIG. 23.

The system control unit 50 also judges whether the setting item corresponding to the object at the cursor position can be changed by the electronic dials (the main electronic dial 71 and the sub electronic dial 73) included in the operation unit 70 (step S2106). If the setting of the setting item can be changed by the electronic dials, the system control unit 50 executes electronic dial operation processing of changing the setting value in accordance with an electronic dial operation (step S2107). The processing contents of the electronic dial operation processing change depending on the setting item corresponding to the object at the cursor position, that is, the setting item to change the setting value. Electronic dial operation processing will be described later with reference to the flowcharts of FIGS. 25, 26, and the like. If the setting item corresponding to the object at the cursor position cannot be changed by the electronic dial operation, the system control unit 50 advances the process to step S2108 without executing electronic dial operation processing.

Next, the system control unit 50 judges whether the INFO button 83 or the Q button 81 is pressed (step S2108). If the INFO button 83 or the Q button 81 is pressed, the system control unit 50 cancels the setting value change state (step S2109), and ends the setting value change processing. The system control unit 50 deletes the cursor 2211 from the setting change screen 2210 in accordance with cancel of the setting value change state, updates display in the guidance area 2212, and returns it to the display state as shown in FIG. 22A. For example, for an object indicating a photometric value, setting value display is canceled, and the display is updated to an object indicating the photometric value. If pressing of the INFO button or Q button is not detected in step S2108, the process returns to step S2102.

Figure 23:
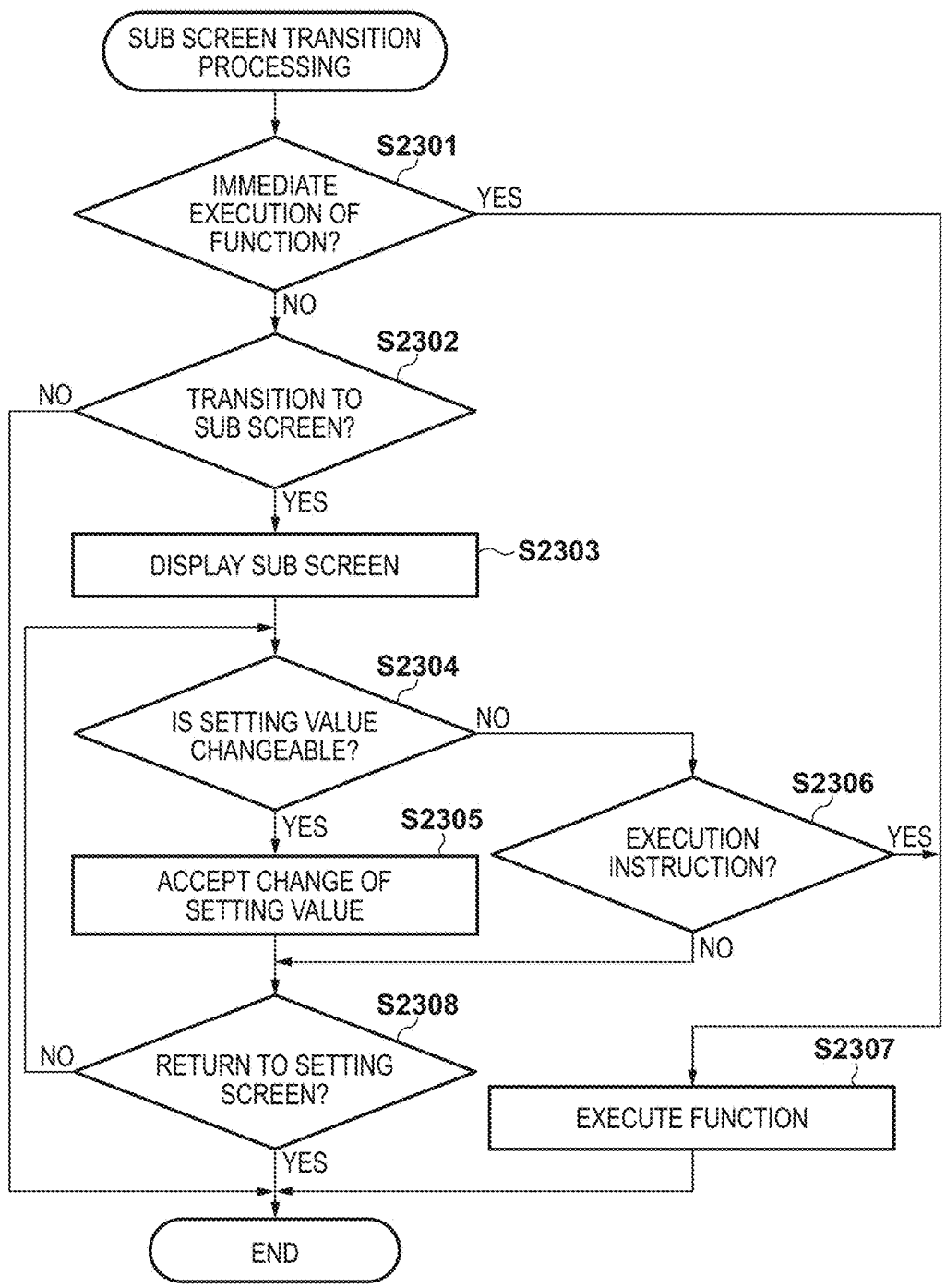
FIG. 23 is a flowchart showing sub screen transition processing.

Sub screen transition processing in step S2105 will be described next with reference to the flowchart of FIG. 23. For the setting item corresponding to the object at the cursor position when the SET button 75 is pressed in step S2104 of FIG. 21, the system control unit 50 judges whether to immediately execute the function without executing sub screen display (step S2301). Upon judging to immediately execute the function of the setting item, the system control unit 50 immediately executes the function (step S2307), and ends the sub screen transition processing. In the sub screen transition processing, a transition to a sub screen does not always occur. Depending on the setting item, the processing (function) of the setting item is immediately executed without making a transition to a sub screen. Note that an example of the setting item whose function is immediately executed without displaying a sub screen is a sensor cleaning function, which will be described later in detail.

Upon judging not to immediately execute the function of the setting item in step S2301, the system control unit 50 judges, concerning the setting item at the cursor position, whether to transition to a sub screen (step S2302). Whether to transition to a sub screen can be judged by, for example, judging for the target setting item whether "the setting item is in a setting change enable state" or "a sub screen is prepared". For example, when an aperture-priority automatic exposure mode is set, the shutter speed is automatically set in accordance with the set f-number. Hence, the setting of the shutter speed cannot be changed by a user operation. In this case, it is judged that the shutter speed is in a setting change disable state, and it is judged not to transition to a sub screen. For a setting item to set a shooting function, a sub screen used to set a desired state out of a plurality of choices or set a numerical value is prepared. Hence, for such a setting item, it is judged to transition to sub screen display. Upon judging to transition to a sub screen for the setting item corresponding to the object selected by the cursor 2211 at the time of pressing of the SET button 75, the system control unit 50 displays the sub screen of the setting item selected by the cursor 2211 (step S2303). The system control unit 50 accepts a setting operation of the user performed on the sub screen. Upon judging that a transition to a sub screen is impossible, the system control unit 50 ends the processing.

Next, the system control unit 50 judges whether the setting value can be changed on the sub screen displayed in step S2303 (step S2304). Setting value change is possible on a sub screen to be described later with reference to FIGS. 24A to 24C. However, on a sub screen for camera initialization to be described later with reference to FIGS. 31A to 31E, the user can select "cancel" or "OK (execute)" but cannot change the setting value. If setting value change is possible on the displayed sub screen, the system control unit 50 accepts a change of the setting value by the main electronic dial 71 or the sub electronic dial 73, and updates the setting value (step S2305).

Figure 24A:
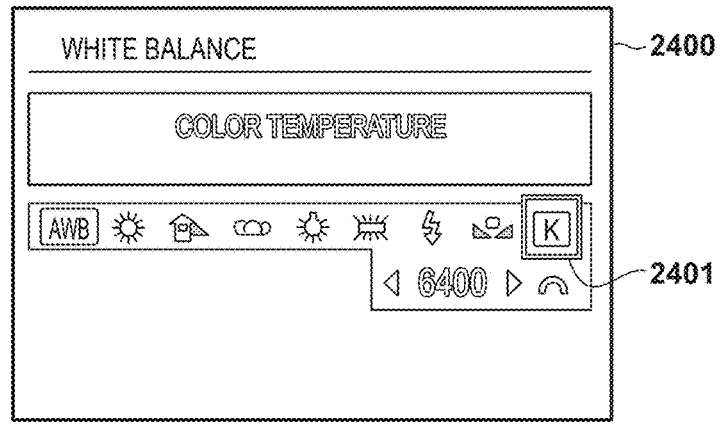
FIGS. 24A, 24B, and 24C are views showing examples of a sub screen.

FIG. 24A is a view showing an example of a sub screen 2400 displayed in step S2303 and capable of changing a setting value. On the sub screen 2400, a desired setting value can be selected and set out of a list of setting values changeable for the setting item at the cursor position. FIG. 24A shows the sub screen 2400 when the selected setting item is white balance. Types (to be referred to as first setting values hereinafter) of white balance such as auto, preset (fine, cloudy, lamp, or the like), and color temperature designation are arranged in one direction on the sub screen 2400. The system control unit 50 moves the position of a cursor 2401 in accordance with the operation of the sub electronic dial 73 by the user and selects a desired setting value (type). When the cursor 2401 is placed on color temperature ([K]), as shown in FIG. 24A, a Kelvin value that is a dependent setting value of color temperature (a setting value belonging to the first setting value is called a second setting) is displayed. When the main electronic dial 71 is operated in this state, the system control unit 50 changes (increases/decreases) the Kelvin value that is the dependent setting value of color temperature.

Figure 24B:
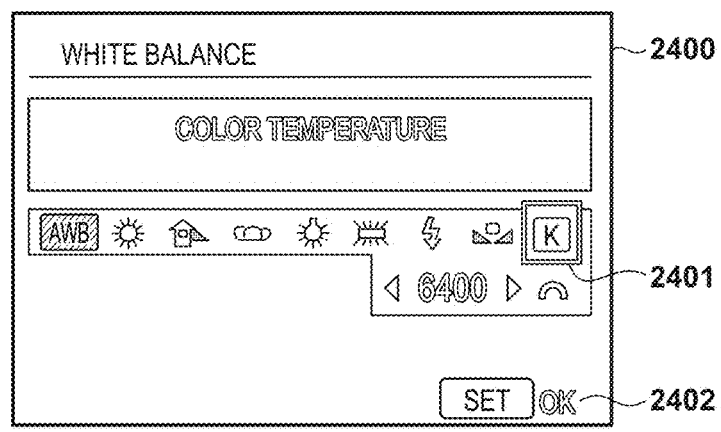

In FIG. 24A, the changed setting of white balance is stored in the nonvolatile memory 56 every time the cursor is moved, or the Kelvin value is changed. However, the present invention is not limited to this. Instead of storing the changed value in the nonvolatile memory 56 according to movement of the cursor 2401 or the Kelvin value change operation, the changed setting value may be stored in the nonvolatile memory 56 upon judging that the SET button 75 is pressed in the sub screen display state. In this case, for example, guidance display 2402 as shown in FIG. 24B may be done to explicitly indicate that the changed setting is stored in the nonvolatile memory 56 in accordance with pressing of the SET button 75.

Figure 24C:
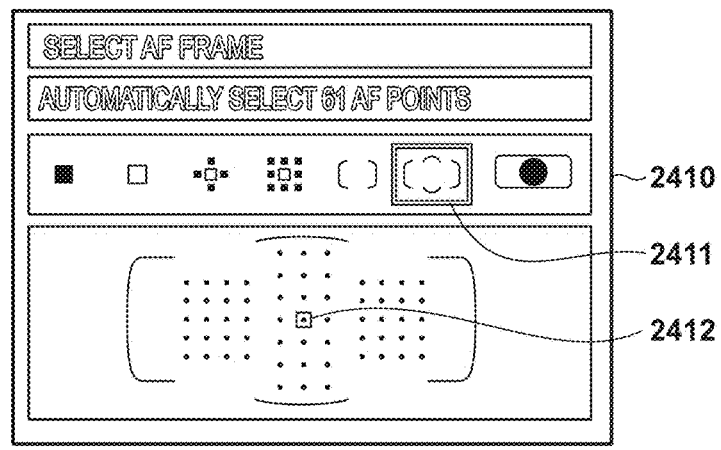

FIG. 24C shows a display example of a sub screen 2410 used to change the setting value of AF frame selection. In setting of AF frame selection, a first setting value (distance measuring area) and a second setting value (distance measuring point) can be set. In the composition of the sub screen 2410 shown in FIG. 24C, distance measuring area selection modes as the first setting values are arranged in one direction almost at the screen center. Distance measuring point selection as the second setting value is displayed on the lower half of the screen. Details of the distance measuring area selection mode as the first setting value of AF frame selection and distance measuring point selection as the second setting value will be described later.

Upon detecting an operation on the main electronic dial 71 during display of the sub screen 2410, the system control unit 50 moves a pattern display 2412 indicating a distance measuring point to be set in the horizontal direction to change the setting value of the distance measuring point selection. Upon detecting an operation on the sub electronic dial 73 during display of the sub screen 2410, the system control unit 50 moves the pattern display 2412 in the vertical direction to change the setting value of the distance measuring point selection. Upon detecting an operation on the multifunction button 85, the system control unit 50 moves a cursor 2411 to change the setting value of the distance measuring area selection mode. That is, on the sub screen for AF frame selection setting, the multifunction button 85 is used to change the first setting value (distance measuring area), and the main electronic dial 71 and the sub electronic dial 73 are used to change the second setting value (distance measuring point). The contents of the changed setting values are stored in the nonvolatile memory 56.

Note that the relationship between the operation members and the movement of the pattern display 2412 is not limited to that described above. For example, the pattern display may be moved in the vertical direction by the main electronic dial 71 and in the horizontal direction by the sub electronic dial 73. The pattern display may be moved in a single direction by any of the main electronic dial 71 and the sub electronic dial 73 (for example, the pattern display may be moved in the horizontal direction, and when reaching an end, moved by one point in the vertical direction). The pattern display may be moved in a specific direction to sequentially select the distance measuring point. The shape of the pattern display 2412 may be changed in accordance with the pattern selected in the distance measuring area selection mode. The shape of the pattern display 2412 may be changed in accordance with the distance measuring area selection mode and/or the display position. Note that although FIGS. 24A, 24B, and 24C show white balance and AF frame selection as setting items, these are merely examples. The sub screen display is configured to provide appropriate display and change operation for each setting item when changing the setting state of the setting item.

Referring back to FIG. 23, if the currently displayed sub screen is not a screen to do function setting (setting value change) but a sub screen to execute a function in accordance with pressing of the SET button, and an execution instruction is issued, the system control unit 50 executes the function (steps S2306 and S2307). The sub screen transition processing then ends. Note that if the cursor position is on the "OK" item when the system control unit 50 has judged that the SET button 75 is pressed, the function may be executed. If the cursor position is on the "cancel" item, the sub screen transition processing may be ended without executing the function.

Upon detecting an instruction to end the sub screen (an instruction to return to the setting screen) (step S2308), the system control unit 50 ends the sub screen transition processing. On the other hand, if the instruction to end the sub screen is not detected, the system control unit 50 returns the process to step S2304. The sub screen transition processing in step S2105 has been described above.

Figure 25:
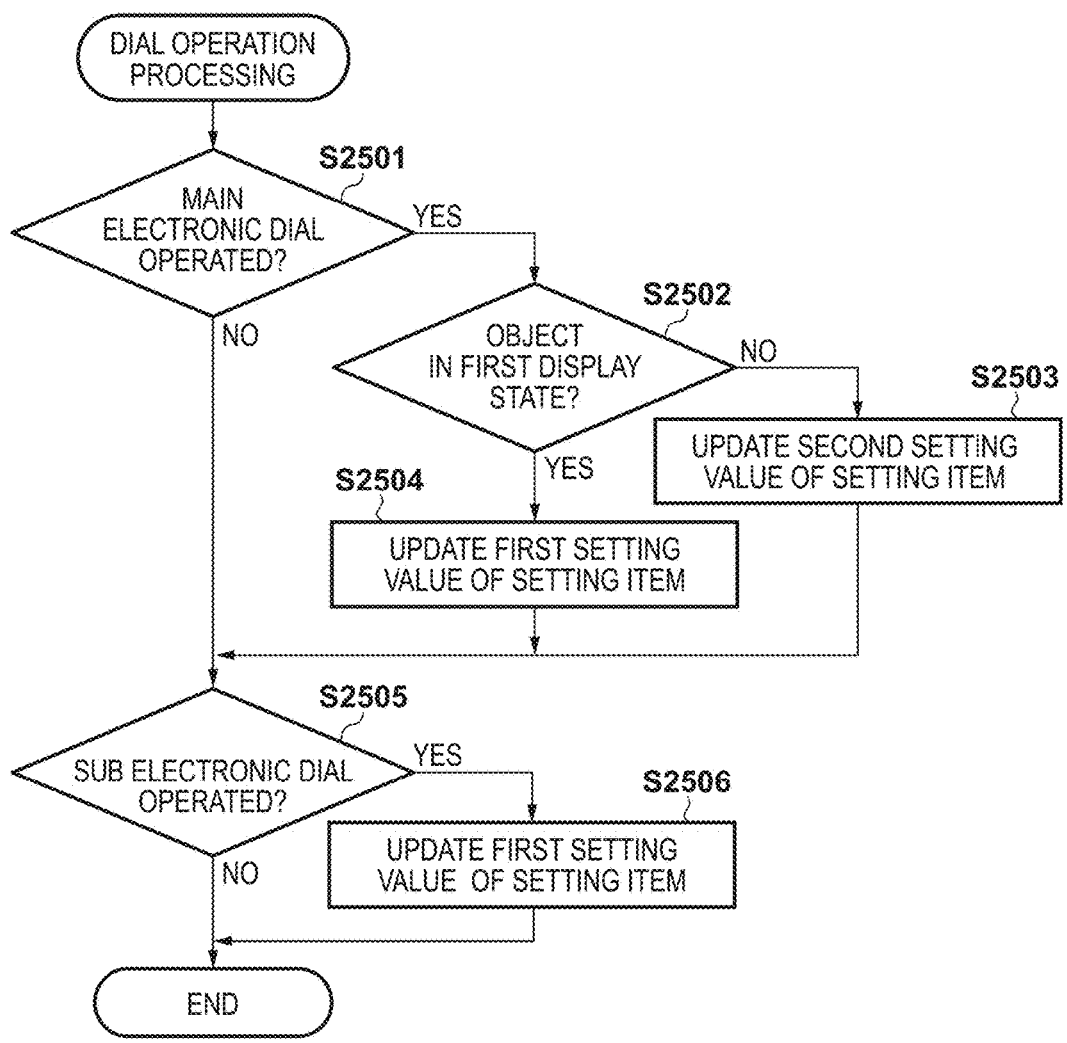
FIG. 25 is a flowchart showing dial operation processing.

Electronic dial operation processing in step S2107 of FIG. 21 will be described next with reference to FIGS. 25 to 28. In the electronic dial operation processing, the processing method changes depending on the setting item or display style of the object designated by the cursor 2211. As an example of electronic dial operation processing, FIG. 25 shows processing in a case in which the object selected by the cursor 2211 is the setting item of white balance. When electronic dial operation processing starts, the system control unit 50 judges whether an operation on the main electronic dial 71 has occurred (step S2501).

Upon judging that an operation on the main electronic dial 71 has occurred, the system control unit 50 judges whether the display state of the object at the cursor position is the first display state (step S2502). If the object at the cursor position is in the first display state, the system control unit 50 updates the first setting value of the setting item at the cursor position, and stores the updated setting value in the nonvolatile memory 56 (step S2504). On the other hand, if the setting item at the cursor position is not in the first display state, the system control unit 50 updates the second setting value of the setting item at the cursor position in accordance with the operation of the main electronic dial 71, and stores the updated setting value in the nonvolatile memory 56 (step S2503).

The first display state is a case in which the setting item of white balance is displayed using one (1×1) layout box, or a case in which the setting item is displayed using two (2×1) layout boxes in the horizontal direction, and the first setting value having no dependent setting value is displayed. Here, examples of the first setting value of white balance having no dependent setting value are "auto" and preset values such as "fine", "cloudy", and "lamp". If the setting value of white balance is "color temperature", a dependent setting value (Kelvin value) exists, and the setting item is not in the first display state. In addition, in a case in which the display size is 1×1, even when "color temperature" is selected by operating the sub electronic dial 73, the Kelvin value cannot be changed by operating the main electronic dial 71.

Figure 22C:
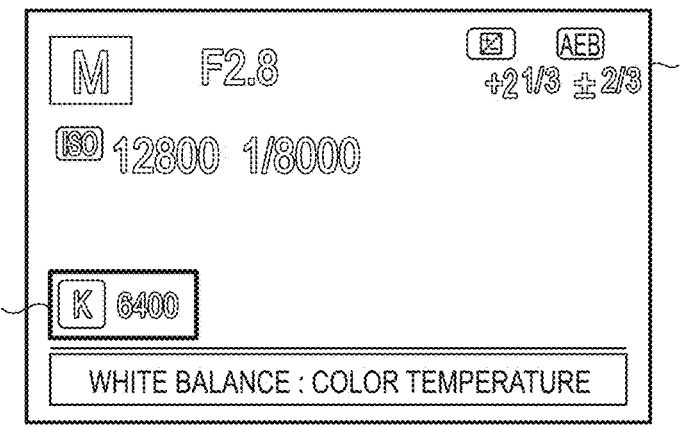

As described above, when the setting item is white balance, it is judged that the setting item is not in the first display state in a case in which the object is displayed in a display style using 2×1 layout boxes, and the first setting value (color temperature) and the second setting value (Kelvin value) are displayed (FIG. 22C). That is, it is judged that the setting item is in the second display state. If the object of white balance is not in the first display state, the system control unit 50 updates the second setting value (Kelvin value) in accordance with the operation on the main electronic dial 71, and stores the updating result in the nonvolatile memory 56 (step S2503).

Upon detecting an operation on the sub electronic dial 73 (step S2505), the system control unit 50 updates the first setting value of the setting item independently of whether the display style of the setting item at the cursor position is the first display state (step S2506). The system control unit 50 stores the updated setting value in the nonvolatile memory 56. As described above, in this embodiment, when an object that displays first and second setting values is selected as the setting target, it is possible to set the first setting value by the sub electronic dial 73 and set the second setting value by the main electronic dial 71. If an object that displays only the first setting value is selected, it is possible to change the first setting value by the sub electronic dial 73 and the main electronic dial 71.

Note that the classification of the first display state and the second display state is not limited to that described above. For example, the first display state may be defined as a case in which the display size is 1×1, and the second display state may be defined as a case in which the display size is other than 1×1. In this case, for example, an object with a display size of 2×1 is handled as the second display state independently of the display contents. Hence, for example, if a preset value (a setting value other than a color temperature) of white balance is set, there exists no setting value to be changed by the main electronic dial 71 for the corresponding object having the display size 2×1.

Dial operation processing in step S2107 in a case in which the setting item at the cursor position is AF frame selection will be described next with reference to the flowchart of FIG. 26. Setting values in AF frame selection will be described first. AF frame selection uses two types of setting values, that is, distance measuring area selection and distance measuring point selection. In distance measuring area selection, a pattern of a distance measuring area is selected. Setting values settable in distance measuring area selection are spot AF (arbitrarily selected), single-point AF (arbitrarily selected), AF area expansion (arbitrarily selected cross), AF area expansion (arbitrarily selected periphery), zone AF (arbitrarily selected zone), automatic AF selection, and the like.

In single-point AF (arbitrarily selected), one distance measuring point to be used for distance measurement control is selected, and distance measurement control is performed. In spot AF (arbitrarily selected), one distance measuring point to be used for distance measurement control is selected, and distance measurement control is performed using a narrower portion of the selected distance measuring point. In AF area expansion (arbitrarily selected cross), one distance measuring point is selected, and distance measurement control is performed using the selected distance measuring point and adjacent distance measuring points on the upper, lower, left, and right sides. In AF area expansion (arbitrarily selected periphery), one distance measuring point is selected, and distance measurement control is performed using the selected distance measuring point and adjacent distance measuring points on the periphery. In zone AF (arbitrarily selected zone), one of distance measuring zones formed by dividing the distance measuring points into nine groups is selected, and distance measurement control is performed using the distance measuring points in the selected distance measuring zone. In automatic AF selection, distance measurement control is performed using all distance measuring points. When automatic AF selection is selected, the processing of selecting a distance measuring point is not performed. In AI servo AF, however, a distance measurement control starting distance measuring point is selected. AI servo AF is an AF operation characteristic to continuously perform distance measurement control for an object captured at the distance measurement control starting distance measuring point during a half stroke for the shutter 101.

Distance measuring point selection is a mode to cause the user to select the position of the pattern selected in distance measuring area selection. For example, if single-point AF is selected as the distance measuring area, the pattern of the distance measuring area is one distance measuring point. Hence, in distance measuring point selection, the user is caused to select the position of one distance measuring point. If zone AF is selected in distance measuring area selection, the pattern of the distance measuring area is a distance measuring zone including a plurality of distance measuring points. Hence, in distance measuring point selection, the user is caused to select the position of the distance measuring zone.

Figure 27A:
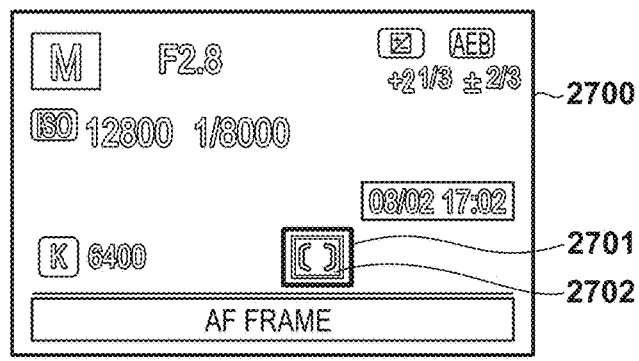
FIGS. 27A to 27D are views for explaining dial operation processing.

FIGS. 27A to 27D show cases in which the setting item at the cursor position is AF frame selection when the customization setting screen is set in the setting value change state. In such a screen display state, the user can update the setting value of AF frame selection. Referring to FIG. 27A, an object 2702 selected by a cursor 2701 on a setting screen 2700 corresponds to the setting item of AF frame selection, and indicates a setting value by distance measuring area selection. The object 2702 is displayed in the first display state. When the main electronic dial 71 or the sub electronic dial 73 is operated in this state, the distance measuring area that is the first setting value can be changed (steps S2604 and S2606).

Figure 27B:
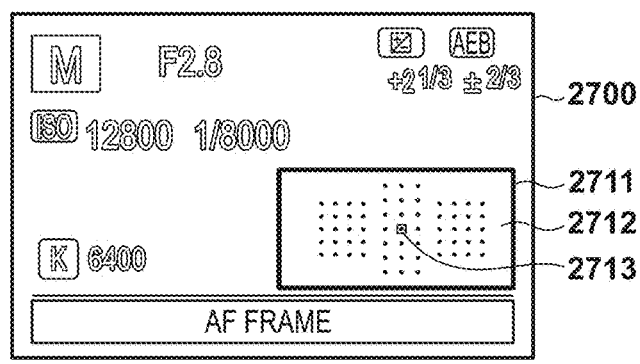
Figure 27C:
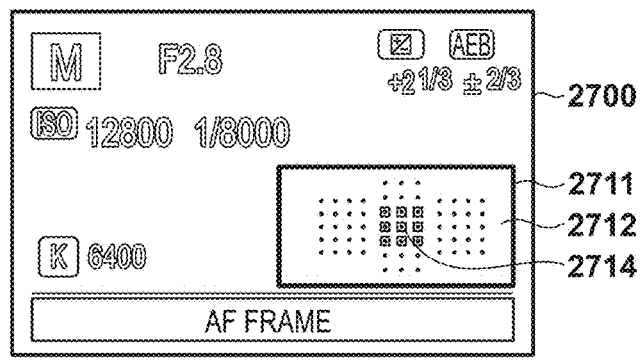
Figure 27D:
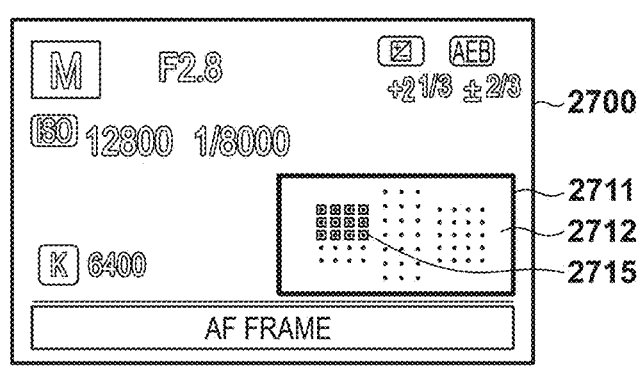

In FIGS. 27B to 27D, an object 2712 selected by a cursor 2711 on the setting screen 2700 corresponds to AF frame selection displayed in the second display state, and information of a setting value by distance measuring point selection is displayed. Referring to FIGS. 27B to 27D, pattern displays 2713, 2714, and 2715 are pattern displays of distance measuring point selection. The shape of the pattern display changes depending on the setting value selected by distance measuring area selection. In some distance measuring areas, the shape of the pattern display may change depending on the display position.

The pattern display 2713 is a pattern display when the setting value of distance measuring area selection is spot AF, single-point AF, or automatic AF selection with AI servo AF setting. The pattern has a shape corresponding to one distance measuring point. The pattern display 2714 is a pattern display when the setting value of distance measuring area selection is AF area expansion (arbitrarily selected periphery). The pattern has a shape including one distance measuring point and adjacent distance measuring points on the periphery. In a case of AF area expansion (arbitrarily selected cross), the pattern has a shape including one distance measuring point and adjacent distance measuring points on the upper, lower, left, and right sides. The pattern display 2715 is a pattern display when the setting value of distance measuring area selection is zone AF. The pattern shown in FIG. 27D has a shape including 12 distance measuring points.

Figure 26:
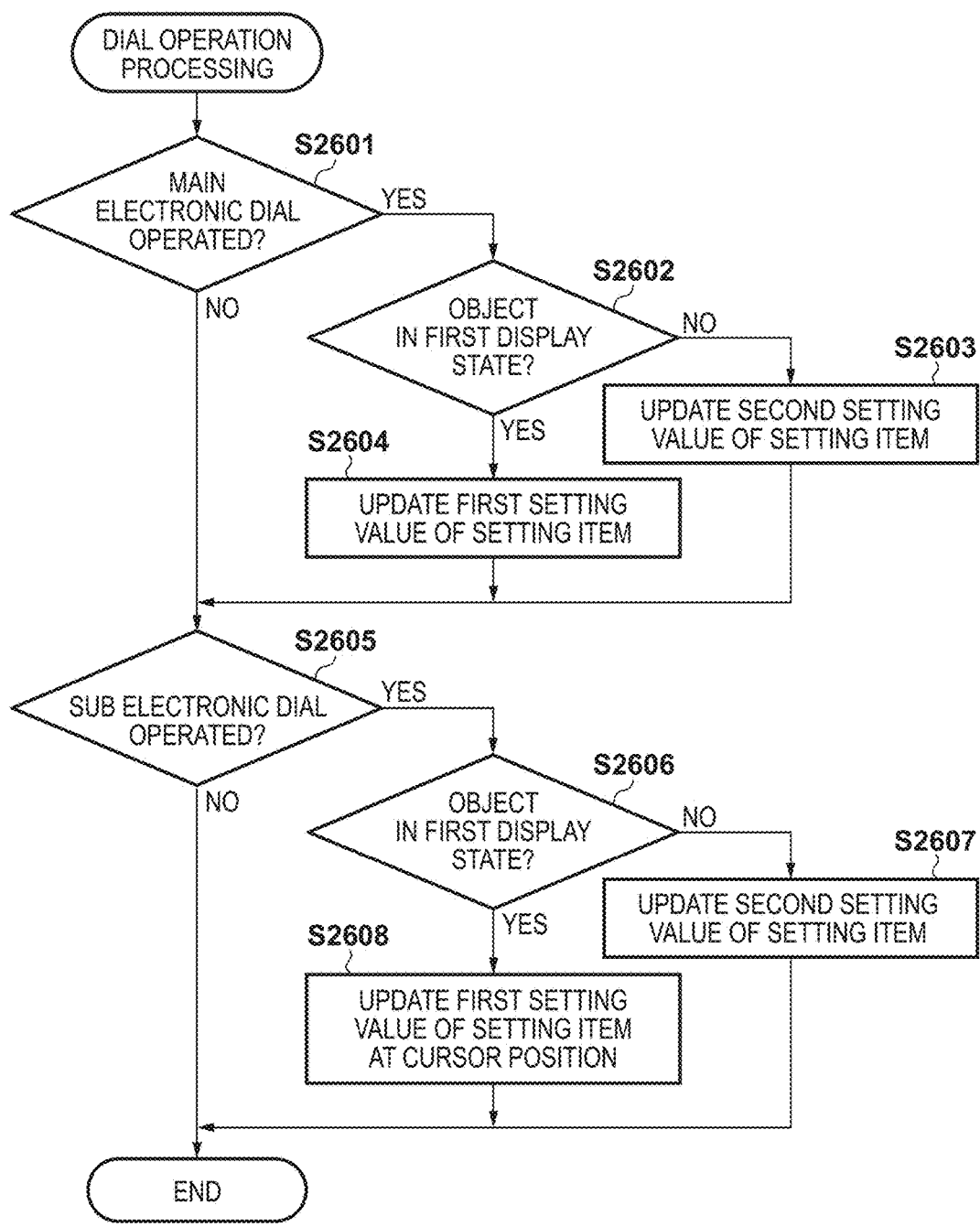
FIG. 26 is a flowchart showing dial operation processing.

Referring to FIG. 26, upon detecting the operation of the main electronic dial 71 (step S2601), the system control unit 50 judges the display state of the setting item (object) at the cursor position (step S2602). If the object at the cursor position is in the first display state, the system control unit 50 updates the first setting value of the setting item represented by the object at the cursor position, and stores the setting value in the nonvolatile memory 56 (step S2604). On the other hand, upon judging that the setting item at the cursor position is not in the first display state, the system control unit 50 updates the second setting value of the setting item represented by the object at the cursor position, and stores the setting value in the nonvolatile memory 56 (step S2603).

Upon detecting an operation on the sub electronic dial 73 (step S2605), the system control unit 50 judges the display state of the setting item (object) at the cursor position (step S2606). If the object at the cursor position is in the first display state, the system control unit 50 updates the first setting value of the setting item represented by the object, and stores the setting value in the nonvolatile memory 56 (step S2608). On the other hand, upon judging that the setting item at the cursor position is not in the first display state, the system control unit 50 updates the second setting value of the setting item represented by the object at the cursor position, and stores the setting value in the nonvolatile memory 56 (step S2607).

The processing shown in FIG. 26 will be described in more detail concerning a case in which the setting item at the cursor position is AF frame selection. It is judged in steps S2602 and S2606 that the object is in the first display state when the display area of the object is small (in this example, when the size is 1×1 layout box). In steps S2604 and S2608, the system control unit 50 updates the distance measuring area as the first setting value, and stores the updating result in the nonvolatile memory 56. As described above, when the object corresponding to AF frame selection is in the first display state, change of the first setting value (distance measuring area selection) is performed in accordance with the operation of the main electronic dial 71 or the sub electronic dial 73.

The object is not in the first display state when the display area of the object is large (in this example, when the display style is 3×2, as shown in FIGS. 27B to 27D). In a case of this display style, the system control unit 50 updates the setting value of the distance measuring point in accordance with the operation of the main electronic dial 71, and stores the updated setting value of the distance measuring point in the nonvolatile memory 56 (steps S2603 and S2607). The pattern display 2713 or 2714 shown in FIG. 27B or 27C moves in the horizontal direction in accordance with the operation of the main electronic dial 71 (step S2603) and moves in the vertical direction in accordance with the operation of the sub electronic dial 73 (step S2607), thereby updating the second setting value (distance measuring point).

When the distance measuring area selection mode is zone AF (FIG. 27D), the setting value is updated such that the pattern display 2715 sequentially selects each distance measuring zone in accordance with the operation of the main electronic dial 71 or the sub electronic dial 73. The moving direction of the pattern display described concerning steps S2603 and S2607 is not limited to that described above. The pattern display may move in a single direction, or the vertical and horizontal directions may be replaced with each other. That is, the pattern display may be moved in the vertical direction by the main electronic dial 71 and in the horizontal direction by the sub electronic dial 73. The pattern display may be moved in a single direction by any of the main electronic dial 71 and the sub electronic dial 73 (for example, the pattern display may be moved in the horizontal direction, and when reaching an end, moved by one point in the vertical direction).

As described above, in the case of AF frame selection, a distance measuring area can be selected for an object in the first display state (an object having a size of 1×1), and a distance measuring point can be selected for an object in the second display state (an object having a size of 3×2). That is, the settable item is switched depending on the display size. For example, in the first display state, the operation target of the main electronic dial 71 or the sub electronic dial 73 is the first setting value, and in the second display state, the operation target is the second setting value. When such an object is introduced, operability of AF frame selection on the customized setting screen 300 improves.

As a setting value display method when numerical value display and scale display exist as the display styles of a setting item and a setting method using the main electronic dial 71 and the sub electronic dial 73 will be described with reference to the flowcharts of FIGS. 28A and 28B and object display examples shown in FIGS. 29A and 29B.

FIG. 29A is a view showing objects of an exposure compensation value and an auto bracketing compensation value (to be referred to as an AEB compensation value or simply as a bracketing value hereinafter) as examples of setting items with numerical value display and scale display. FIG. 29B is a view showing an object of the light control compensation value of a flash used at the time of shooting as an example of a setting item with numerical value display and scale display. The objects are laid out in layout boxes of a customizable setting screen and displayed, as described above.

Referring to FIG. 29A, an object 2901 displays an exposure compensation value and an AEB compensation value in a size of 1×1 layout box (1 box×1 box in the vertical and horizontal directions). This display is defined as the first display state of the exposure compensation value and the AEB compensation value. An item 2902 indicates exposure compensation display and is always displayed in the area of the object 2901. An item 2903 is an object indicating the presence of an AEB compensation value, and is displayed in the object 2901 to show the presence of an AEB compensation value when the AEB compensation value is not 0. An exposure compensation value 2904 indicates the exposure compensation value by a signed numerical value.

An object 2911 displays an exposure compensation value and an AEB compensation value in a size of 2×1 layout boxes (2 boxes×1 box in the vertical and horizontal directions). This display is defined as the second display state of the exposure compensation value and the AEB compensation value. An item 2913 indicates an AEB compensation value. An AEB compensation value 2915 indicates the AEB compensation value by a numerical value. The sign represents the operation of the AEB function. Simultaneous displaying plus and minus signs indicates that a plus AEB compensation value and a minus AEB compensation value are applied to the exposure compensation value.

An object 2921 displays an exposure compensation value and an AEB compensation value in a size of 3×1 layout boxes (3 boxes×1 box in the vertical and horizontal directions). When the object has the display size of 3×1, the compensation value and AEB are displayed using a scale. This display is defined as the third display state of the exposure compensation value and the AEB compensation value. A dot indicator 2924 indicates an exposure compensation value. A numerical value on the scale immediately above indicates the set exposure compensation value. A dot indicator 2925 indicates an AEB compensation value. The difference from the dot indicator 2924 indicating the exposure compensation value on the scale to the dot indicator 2925 represents the AEB compensation value. A numerical value on the scale immediately above the dot indicator 2925 indicates the exposure compensation value considering the AEB compensation. Note that if the AEB compensation value is 0, the dot indicator 2925 is not displayed. A dot indicator 2926 indicates an AEB compensation value, like the dot indicator 2925. The dot indicator 2926 indicates that a plus AEB compensation value is applied to the exposure compensation value. The dot indicator 2925 indicates that a minus compensation value is applied.

Referring to FIG. 29B, the object 2931 displays a light control compensation value in a size of 1×1 layout box (1 box×1 box in the vertical and horizontal directions). This display is defined as the first display state of the light control compensation value. An item 2932 indicates light control compensation display and is always displayed in the object 2931. The item 2933 indicates that the light control compensation value is adapted to an external flash, and is displayed when the external flash is connected. A light control compensation value 2934 indicates the light control compensation value by a signed numerical value.

An object 2941 of the light control compensation value is displayed in a size of 2×1 layout boxes (2 boxes×1 box in the vertical and horizontal directions). This display is defined as the second display state of the light control compensation value. The object 2941 can display the light control compensation value larger than the display of the object 2931, and therefore has higher visibility than the display of the object 2931.

An object 2951 of the light control compensation value is displayed in a size of 3×1 layout boxes (3 boxes×1 box in the vertical and horizontal directions). In this size, the object displays the light control compensation value using a scale. This display is defined as the third display state of the light control compensation value. A dot indicator 2955 is a dot indicator indicating a light control compensation value. A numerical value on the scale immediately above the dot indicator indicates the light control compensation value. Note that these displays may display the compensation state upon shooting on a shooting information display screen.

Figure 28A:
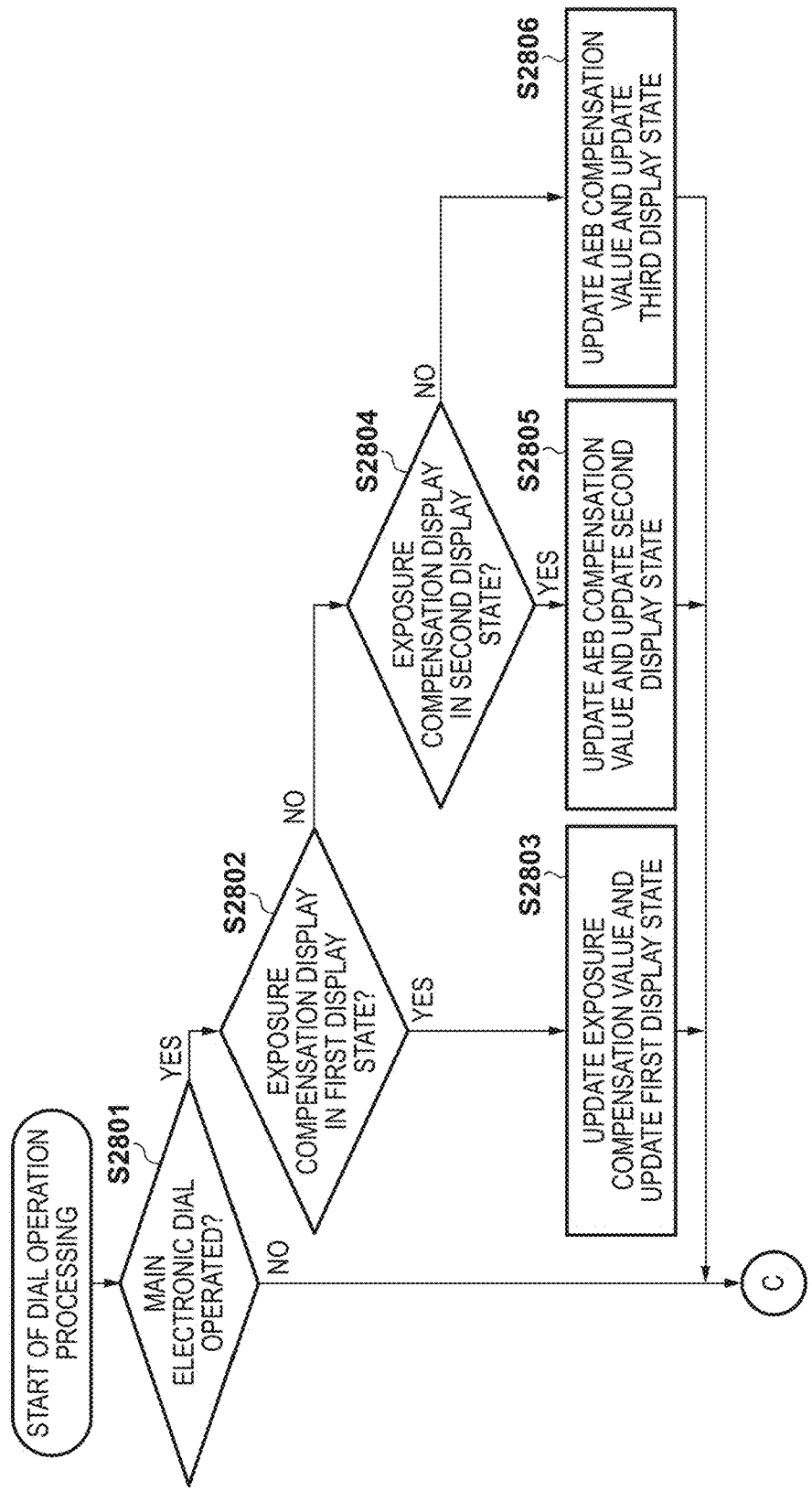
FIGS. 28A and 28B are flowcharts showing dial operation processing.
Figure 28B:
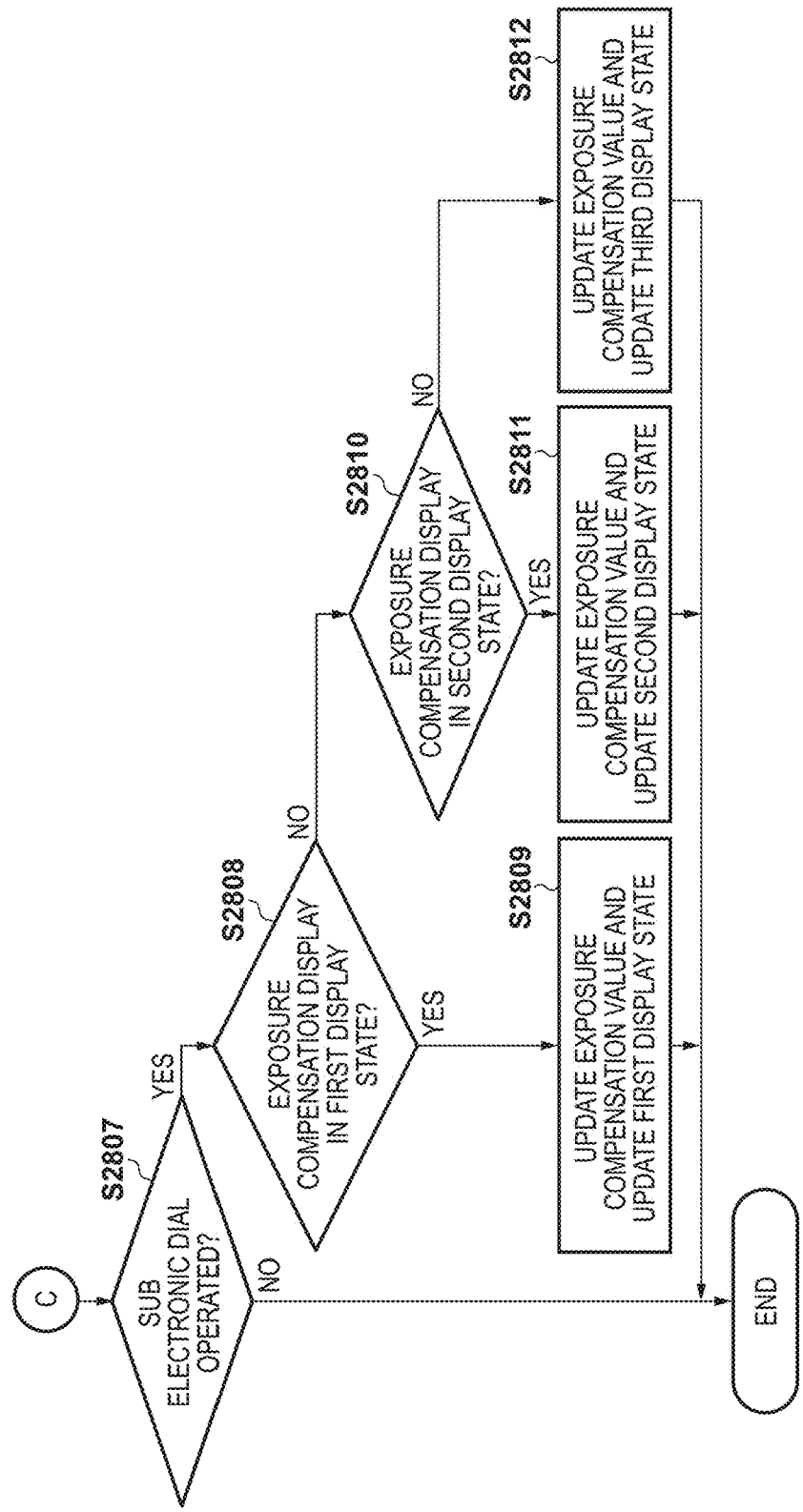

The flowcharts of FIGS. 28A and 28B explain a method of setting a setting item with an object using the above-described numerical value display or scale display concerning electronic dial operation processing of step S2108. The processing shown in FIGS. 28A and 28B is processing performed when the setting item at the cursor position indicates an exposure compensation value and an AEB compensation value.

When the dial operation processing starts, the system control unit 50 judges whether an operation on the main electronic dial 71 has occurred (step S2801). Upon judging that an operation on the main electronic dial 71 has occurred, the system control unit 50 judges whether the object (In this case, display of the exposure compensation value and the AEB compensation value) at the cursor position has the first display state (step S2802). If the object has the first display state, the system control unit 50 updates the exposure compensation value by the amount of the operation of the main electronic dial 71, and stores the updated exposure compensation value in the nonvolatile memory 56 (step S2803). At this time, the system control unit 50 changes the numerical value of the exposure compensation value represented by the exposure compensation value 2904 that is a constituent element of the object 2901 in the first display state to the updated value.

If the object (display of the exposure compensation value and the AEB compensation value) at the cursor position does not have the first display state, the system control unit 50 judges whether the object has the second display state (step S2804). If the object has the second display state, the system control unit 50 updates the AEB compensation value by the operation amount of the main electronic dial 71, and stores the updated value in the nonvolatile memory 56 (step S2805). The system control unit 50 also changes the numerical value of the AEB compensation value represented by the AEB compensation value 2915 that is a constituent element of the object 2911 displayed in the second display state to the updated value.

If the object (display of the exposure compensation value and the AEB compensation value) at the cursor position does not have the second display state, either, the object is judged to have the third display state. In this case, the system control unit 50 updates the AEB compensation value by the amount of the operation of the main electronic dial 71, and stores the updated value in the nonvolatile memory 56 (step S2806). In addition, the system control unit 50 changes the dot indicators 2925 and 2926 of the object 2921 in the third display state to the position of the updated AEB compensation value based on the current exposure compensation value as a reference.

Upon detecting occurrence of an operation on the sub electronic dial 73 (step S2807), the system control unit 50 judges whether the object (In this example, display of the exposure compensation value and the AEB compensation value) at the cursor position has the first display state (step S2808). If the object has the first display state, the system control unit 50 updates the exposure compensation value by the amount of the operation of the sub electronic dial 73, and stores the updated exposure compensation value in the nonvolatile memory 56 (step S2809). The system control unit 50 also changes the numerical value of the exposure compensation value 2904 that is a constituent element of the object 2901 to the updated value. In the first display state (object 2901), the exposure compensation value is displayed, and the AEB compensation value is not displayed. Hence, the exposure compensation value is changed by operating any of the main electronic dial 71 and the sub electronic dial 73 (steps S2803 and S2809).

If the object at the cursor position does not have the first display state, the system control unit 50 judges whether the object has the second display state (step S2810). Upon judging that the object has the second display state, the system control unit 50 updates the exposure compensation value by the amount of the operation of the sub electronic dial 73, and stores the updated value in the nonvolatile memory 56 (step S2811). The system control unit 50 also changes the numerical value of the exposure compensation value 2904 that is a constituent element of the object 2911 in the second display state to the updated value.

If the setting item at the cursor position does not have the second display state, either, the setting item is judged to have the third display state. In this case, the system control unit 50 updates the exposure compensation value by the amount of the operation of the sub electronic dial 73, and stores the updated value in the nonvolatile memory 56 (step S2812). In addition, the system control unit 50 moves the position of the dot indicator 2924 that is a constituent element of the object 2921 such that the value of scale display immediately above becomes the same value as the updated exposure compensation value, and displays the dot indicator again. If the AEB compensation value has a setting value other than 0, the dot indicators 2925 and 2926 are laid out again based on the updated exposure compensation value as a reference. Note that if the setting item at the cursor position is light control compensation as shown in FIG. 29B, all setting value change processes (change of the exposure compensation value and the AEB compensation value) in the flowcharts of FIGS. 28A and 28B are changed to light control compensation value change to cope with this case. Note that the object 2911, the object 2921, and the objects 2931 to 2951 have the same provided information amount and operation contents. However, the visibility of the display contents changes depending on the display size. Hence, the user can select an object of a desired display size in consideration of the balance between the visibility of the object and the occupied area on the setting screen.

Processing of selecting and executing processing concerning the customization setting function of a setting item at the time of shooting will be described next. As described above with reference to FIGS. 5A to 5C, the customization setting function is activated by pressing the MENU button 84 to display the menu screen 500 (FIG. 5A), moving the cursor 511 to "quick setting customization", and pressing the SET button 75. When the customization setting function is activated, the menu screen 520 as shown in FIG. 5B is displayed first. On the menu screen 520, execution of one of start layout editing: screen transition to layout editing processing for the customizable shooting setting screen return to initial layout state: initialization of setting items on the customized shooting setting screen delete all items: deletion of all setting items laid out on the customized shooting setting screen can be selected.

The user can select a desired setting item by vertically moving the cursor 511 on the menu screen 520 shown in FIG. 5B, and execute the desired item by pressing the SET button 75. A case in which the menu item "start layout editing" is selected has been described above with reference to the flowchart of FIG. 6.

Figure 30A:
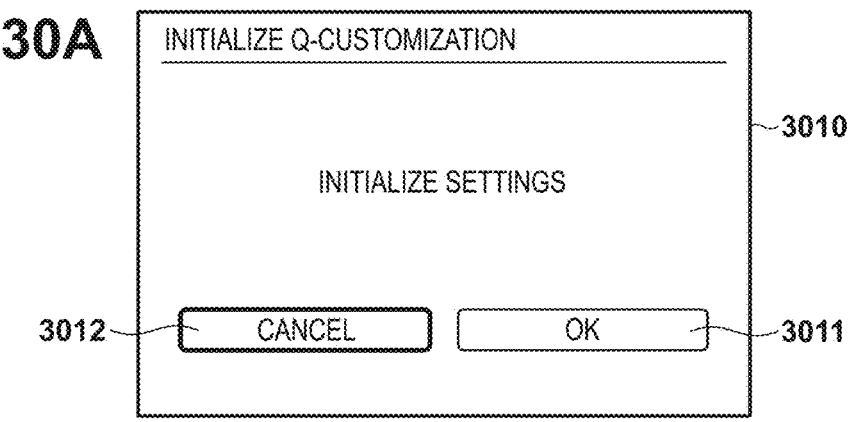
FIGS. 30A, 30B, and 30C are views showing examples of screens concerning initialization and all deletion of the setting screen by the customization setting function.

When the menu item "return to initial layout state" is selected on the menu screen 520, and the SET button is pressed, a confirmation screen 3010 for the start of initialization, as shown in FIG. 30A, is displayed. Processing of returning to the initial layout state will be referred to as initialization hereinafter. An OK button 3011 is a button configured to execute initialization of objects (setting items) laid out on the customizable setting screen. A cancel button 3012 is a button configured to end processing without executing the initialization. The user can execute initialization processing of the customizable setting screen by selecting the OK button 3011 and pressing the SET button 75. In the initialization, all objects (setting items) laid out on the customized setting screen are deleted, and a customizable setting screen is set in accordance with the object layout stored in the nonvolatile memory 56 of the digital camera 100 in advance.

Figure 30B:
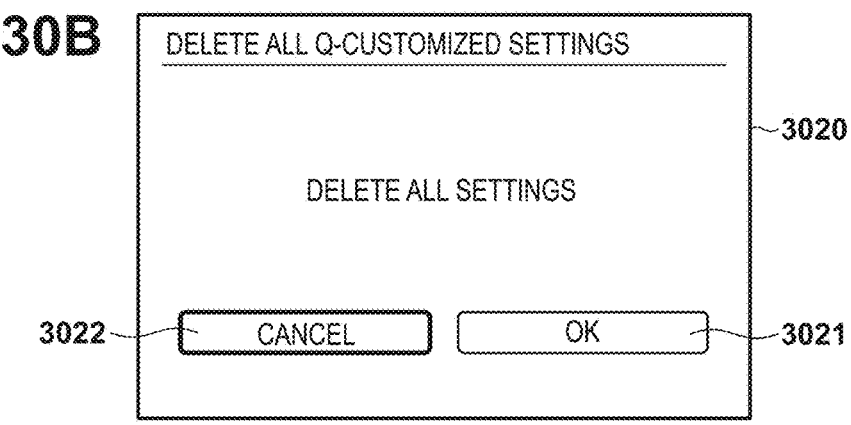
Figure 30C:
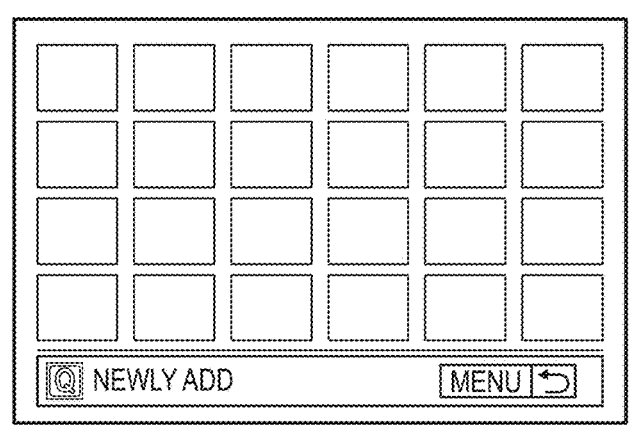

FIG. 30B shows a confirmation screen 3020 displayed when the menu item "delete all items" on the menu screen 520 (FIG. 5B) is selected, and the SET button 75 is pressed in this state. An OK button 3021 is a button configured to execute deletion of all setting items laid out on the customized setting screen. A cancel button 3022 is a button configured to end processing without executing the deletion of all items. The user can execute deletion of all objects on the setting screen by selecting the OK button 3021 and pressing the SET button 75. FIG. 30C shows an editing screen corresponding to the customizable setting screen after execution of deletion of all items. Since deletion of all items is executed, no object is laid out on the customizable setting screen. The editing screen only has display of layout boxes, as shown in FIG. 30C.

Note that when the menu screen 520 shown in FIG. 5B is displayed, the display contents may be changed depending on whether the customizable setting screen is selected as a screen to be displayed by the INFO button 83 (that is, in accordance with the setting contents described with reference to FIG. 19). For example, if the customizable setting screen is not selected as a screen to be displayed by the INFO button 83, a menu item indicating transition to "display selection processing (FIG. 18)" may be added to the menu items on the menu screen 520. Alternatively, in addition to or in place of such a menu item, a note representing that the customizable setting screen is not set as a screen to be displayed by the INFO button 83 may be displayed. This can prevent a situation in which the setting screen is edited using the quick setting customization function but not displayed in the shooting standby state.

Figure 31A:
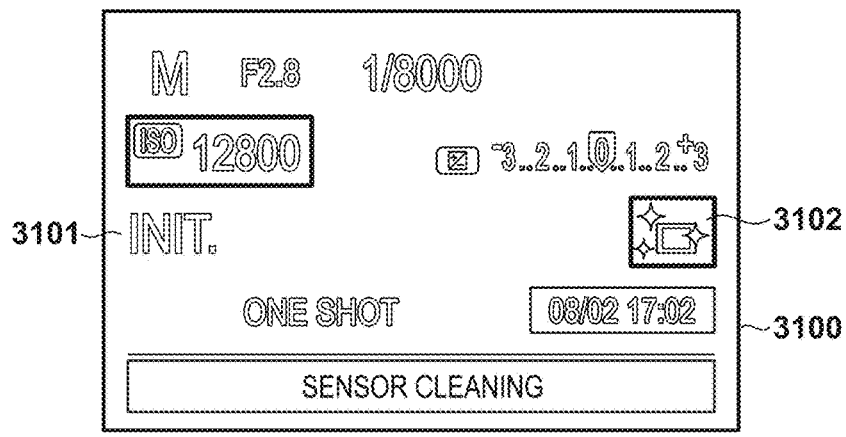
FIGS. 31A to 31E are views showing examples of screens when executing sensor cleaning and camera setting initialization.
Figure 31B:
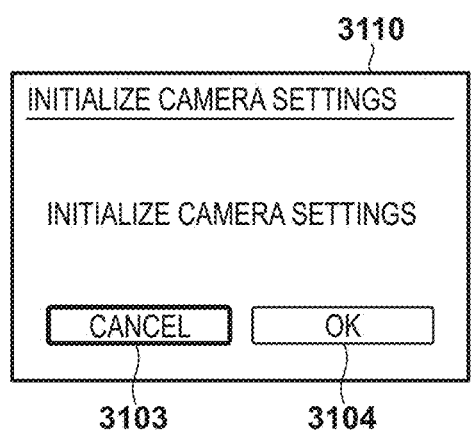
Figure 31D:
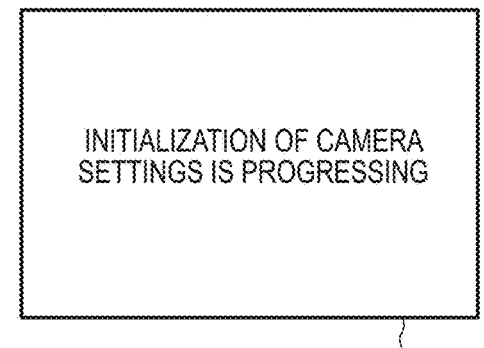
Figure 31C:
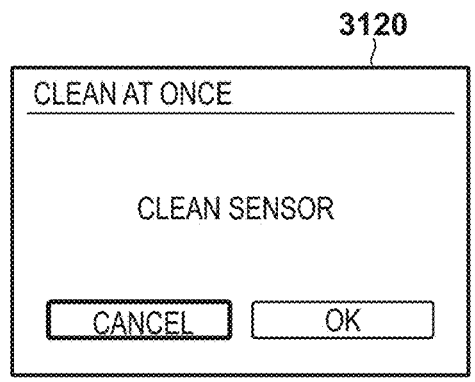
Figure 31E:
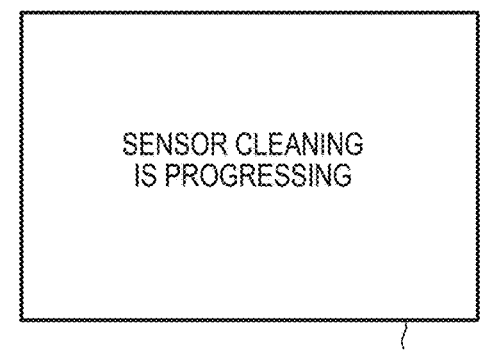

A case in which processing or the function of a setting item is immediately executed without causing a transition to a sub screen in sub screen transition processing (FIG. 23) executed in step S2105 of FIG. 21 will be described next with reference to FIGS. 31A to 31E. Assume that the setting screen has a state as shown in FIG. 31A when the system control unit 50 detects pressing of the SET button. For the setting item located at the cursor position upon judging that the SET button 75 is pressed, the system control unit 50 judges whether to immediately execute the function without displaying a sub screen (step S2301).

A description will be made here using a camera setting initialization function as a function that needs sub screen display and a sensor cleaning function as a function that does not need sub screen display. The camera setting initialization function is a function of returning the shooting function or settings done on the menu screen to the initial state. When executing the camera setting initialization function from the menu screen, a sub screen 3110 (FIG. 31B) is displayed for the sake of safety, and execution is confirmed. The sensor cleaning function is a function of removing dust applied to the front surface of the image sensor. When executing the sensor cleaning function from the menu screen, a sub screen 3120 (FIG. 31C) is displayed to confirm execution. However, if the sensor cleaning function is selected from a customizable setting screen 3100, the function is immediately executed. Since the user sufficiently grasps the function that the user has selected from the customized setting screen, the function can be executed immediately without a problem. In addition, a high operability can be obtained by executing the function by a single operation.

When the setting screen has the state shown in FIG. 31A upon detecting pressing of the SET button 75 in step S2104, an object 3102 located at the cursor position is the sensor cleaning function. In this case, the system control unit 50 judges that the setting item at the cursor position corresponds to a function to be immediately executed (step S2301). The system control unit 50 then displays a function execution screen 3140 (FIG. 31E) without displaying the sub screen 3120, immediately executes the sensor cleaning function (step S2307), and ends the processing.

On the other hand, if the setting item located at the cursor position upon detecting pressing of the SET button 75 in step S2104 is camera setting initialization (object 3101), the system control unit 50 judges that the setting item is not a setting item whose function is to be immediately executed (step S2301). Upon judging that the setting item is not a setting item whose function is to be immediately executed, the system control unit 50 judges whether to execute transition to a sub screen (step S2302). Upon judging to transition to a sub screen, the system control unit 50 displays the sub screen 3110 (FIG. 22B) (step S2303), and confirms with the user about execution of the processing. Since the sub screen 3110 is not a screen to change a setting value, the system control unit 50 judges whether an execution instruction is issued (step S2306). Here, the process advances to step S2307 in accordance with pressing of the SET button 75. Upon judging that the SET button 75 is pressed (step S2306), if the cursor is located on an OK button 3104, the system control unit 50 displays a function execution screen 3130 (FIG. 31D), and executes the function (camera initialization) (step S2307). After that, the processing ends. On the other hand, if the cursor is located on a cancel button 3103 when the SET button 75 is pressed in a state in which the sub screen 3110 is displayed, the transition processing ends without executing camera initialization processing.

Note that camera setting initialization has been exemplified as a setting item whose function is executed after displaying a sub screen. However, the present invention is not limited to this, as a matter of course. For example, a function that loses data upon execution, a function that loses settings upon execution, a function that takes time to process, and a function that increases current consumption are functions that need sub screen display. In addition, sensor cleaning has been exemplified as a function to be executed immediately without displaying a sub screen. However, the present invention is not limited to this, as a matter of course. For example, functions other than the above-described functions that need sub screen display may be set as the functions to be executed immediately without performing confirmation processing by sub screen display.

Whether to execute a function via a sub screen may be set from a style selection screen as shown in FIG. 9B or the like. For example, when the object of sensor cleaning is selected on the setting screen, and the SET button 75 is pressed in this state, this allows the user to set whether to immediately execute sensor cleaning or execute sensor cleaning via a sub screen.

If a plurality of objects can be displayed on the setting screen for one setting item, item ID information to be added to a layout box may be changed even if the setting item is the same. This enables a plurality of objects of the same setting item to be laid out.

As described above, according to the above embodiment, an object to be displayed on the setting screen can be selected in consideration of the display size and the information amount to be displayed. This enables a setting screen to be provided according to the taste of the user.

According to the above embodiment, it is possible to display more preferable setting contents according to the display size of a setting item.

According to the above embodiment, it is possible to reduce the number of operations until execution of a function that the user knows well.

According to the above embodiment, it is possible to display an item concerning focus in a size suitable for the contents of information desired by the user and facilitate confirmation of a setting concerning focus.

Note that in the above embodiment, the cross key or SET button is used to, for example, select an item displayed on the screen. However, the present invention is not limited to this. A touch panel may be provided on the display unit 28 to enable a direct instruction for a button or the like on the screen by a touch operation.

Note that control of the system control unit 50 may be done by one piece of hardware, or a plurality of pieces of hardware may share the processing to control the entire device. The present invention has been described above in detail based on the preferred embodiments. However, the present invention is not limited to these specific embodiments and can incorporate various forms without departing from the scope of the present invention. The above-described embodiments are merely examples of the present invention and can also be combined as needed.

In the above-described embodiment, an example in which the present invention is applied to a digital camera has been described. However, the present invention is not limited to this example and is applicable to any electronic device capable of customizing the objects of setting items to be displayed on the screen. That is, the present invention is applicable to a personal computer, a PDA, a portable telephone terminal, a portable image viewer, a printer apparatus including a display, a digital photo frame, a music player, a game machine, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-020609, filed Feb. 4, 2015, Japanese Patent Application No. 2015-020610, filed Feb. 4, 2015, Japanese Patent Application No. 2015-020636, filed Feb. 4, 2015, Japanese Patent Application No. 2015-020637, filed Feb. 4, 2015, Japanese Patent Application No. 2015-020638, filed Feb. 4, 2015, Japanese Patent Application No. 2015-020639, filed Feb. 4, 2015, which are hereby incorporated by reference herein in their entirety.

What is claimed is:

1. An imaging control apparatus
   a display control unit configured to display a setting screen on a display unit, wherein an object corresponding to a setting item of the imaging control apparatus is laid out on the setting screen;
   a setting unit configured to accordance with a user operation, an object corresponding to a specific function to be displayed on the setting screen from a plurality of objects including a first object and a second object, wherein display size of the second object is larger than display size of the first object, a first setting item concerning the specific function is included both in the first, object and the second object, and when the specific function is set to the specific setting, a second setting item concerning the specific function is included in the second object but is not included in the first setting item, and
   a change unit configured to, in a case in which the first object is set and displayed on the setting screen, change a setting state of the first setting item in accordance with an operation on either a first operation member or a second operation member, and in a case in which the second object is set and displayed on the setting screen, change the setting state of the first setting item accordance with the operation on the first operation member and change a setting state of the second setting item in accordance with the operation on the second operation member.

2. The imaging control apparatus according to claim 1, wherein the number of types of operable setting values relating to the second object is larger than the number of types of operable setting values relating to the first object.

3. The imaging control apparatus according to claim 2, wherein in accordance with a predetermined operation on the first object, the display control unit displays, on the display unit, a sub screen in which the number of types of operable setting values increases.

4. The imaging control apparatus according to claim 1, wherein the first object displays the setting state of the first setting item, and
   the second object displays the setting state of the second setting item together with the setting state of the first setting item.

5. The imaging control apparatus according to claim 4, wherein the second setting item is a setting item belonging to the first setting item.

6. The imaging control apparatus according to claim 1, wherein when the second object displays a first setting item that does not have a belonging second setting item, the change unit changes the setting state of the first setting item in accordance with the operation on one of the first operation member and the second operation member.

7. The imaging control apparatus according to claim 6, wherein the first operation member comprises a first electronic dial, and the second operation member comprises a second electronic dial different from the first electronic dial.

8. The imaging control apparatus according to claim 1, wherein the setting item to be changed in accordance with the operation on the same operation member changes between a case in which the first object is selected and displayed on the setting screen and a case in which the second object is selected and displayed on the setting screen.

9. The imaging control apparatus according to claim 1, wherein in accordance with a predetermined operation on the first object, the display control unit displays, on the display unit, a sub screen capable of changing the first setting item and the second setting item.

10. The imaging control apparatus according to claim 1, wherein the specific setting item is white balance,
    the first setting item is a type of white balance, and
    the second setting item a value of color temperature in a case in which the first setting item is a color temperature.

11. The imaging control apparatus according to claim 1, wherein, in a case where the second object is displayed, the change unit controls to display the second setting item when the specific setting is made to the first setting item and controls not to display the second setting item when the specific setting is not made to the first setting item.

12. A control method of an imaging control apparatus, comprising:
    displaying setting screen on a display unit, wherein an object corresponding to a setting item of the imaging control apparatus is laid out on the setting screen;
    setting, in accordance with a user operation, an object corresponding to a specific function to be displayed on the setting screen, from a plurality of objects including a first object and a second object, wherein display size of the second object is larger than display size of the first object, a first setting item concerning the specific function is included both in the first object and the second object, and when the specific function is set to a specific setting, a second setting item concerning the specific function is included in the second object but is not included in the first setting item, and
    in a case in which the first object is set and displayed on the setting screen, changing a setting state of the first setting item in accordance with an operation on either a first operation member or a second operation member, and in a case in which the second object is set and displayed on the setting screen, changing the setting state of the first setting item in accordance with the operation on the first operation member and changing a setting state of the second setting item in accordance with the operation on the second operation member.

13. A non-transitory computer-readable storage medium storing a program for causing a computer to execute a control method of imaging control apparatus, comprising:
    displaying a setting, screen on a display unit, wherein an object corresponding to a setting item of the imaging control apparatus is laid out on the setting screen;
    setting, in accordance with a user operation, an object corresponding to a specific function to be displayed on the setting screen from a plurality of objects including a first object and a second object, wherein display size of the second object is larger than display size of the first object, a first setting item concerning the specific function is included both in the first object and the second object, and when the specific function is set to a specific setting, a second setting item concerning the specific function is included in the second object but is not included in the first setting item, and in a case in which the first object is d displayed on the setting screen, changing a setting state of the first setting item in accordance with an operation on either a first operation member or a second operation member, and in a case in which the second object is set and displayed on the setting screen, changing the setting state of the first setting item in accordance with the operation on the first operation member and changing a setting state of the second setting item in accordance with the operation on the second operation member.

\* \* \* \* \*